(12) United States Patent
Oka et al.

(10) Patent No.: US 9,992,851 B2
(45) Date of Patent: Jun. 5, 2018

(54) INFORMATION PROCESSING APPARATUS, AND METHOD

(71) Applicant: Sony Corporation, Tokyo (JP)

(72) Inventors: Takeshi Oka, Kanagawa (JP); Yoshihiro Nakanishi, Tokyo (JP); Yohei Fukuma, Chiba (JP); Kazunori Hamada, Tokyo (JP); Kenji Kawaguchi, Fukushima (JP); Hidetoshi Kawauchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 205 days.

(21) Appl. No.: 14/364,311

(22) PCT Filed: Dec. 13, 2012

(86) PCT No.: PCT/JP2012/082375
§ 371 (c)(1),
(2) Date: Jun. 11, 2014

(87) PCT Pub. No.: WO2013/099629
PCT Pub. Date: Jul. 4, 2013

(65) Prior Publication Data
US 2014/0333211 A1 Nov. 13, 2014

(30) Foreign Application Priority Data
Dec. 27, 2011 (JP) ................................ 2011-286520

(51) Int. Cl.
*H05B 37/02* (2006.01)
*H04M 1/725* (2006.01)
(Continued)

(52) U.S. Cl.
CPC ..... *H05B 37/0272* (2013.01); *F21V 33/0008* (2013.01); *G06F 3/014* (2013.01);
(Continued)

(58) Field of Classification Search
None
See application file for complete search history.

(56) References Cited

U.S. PATENT DOCUMENTS 7,080,322 B2 * 7/2006 Abbott .................... G06F 1/163
706/45
7,327,277 B2 * 2/2008 Nunokawa ............ G06F 1/1626
340/691.1

(Continued)

FOREIGN PATENT DOCUMENTS

| CN | 1545692 A | 11/2004 |
|---|---|---|
| JP | 2002-280189 A | 9/2002 |

(Continued)

OTHER PUBLICATIONS

Japanese Office Action dated Oct. 22, 2015 in patent application No. 2013551599.

(Continued)

*Primary Examiner* — Tung X Le
*Assistant Examiner* — Raymond R Chai
(74) *Attorney, Agent, or Firm* — Chip Law Group

(57) ABSTRACT

The present technique relates to an information processing apparatus and a method capable of realizing a communication tool of a new mode.
An LED emits light according to a light emission pattern identified based on a set of light emission parameters indicating characteristics of light emission. An action control unit controls the light emission pattern of the LED based on a relationship between the self apparatus and a group to which the self apparatus and at least one other information processing apparatus including the LED belong, or a relationship between the other information processing apparatus and the self apparatus belonging to the group. The present (Continued)

technique may be applied to an information processing apparatus used as a communication tool.

19 Claims, 40 Drawing Sheets

(51) Int. Cl.
    *G06F 3/01*         (2006.01)
    *G06F 3/038*       (2013.01)
    *F21V 33/00*       (2006.01)
    *H04B 7/26*        (2006.01)
    *G06F 3/0346*     (2013.01)

(52) U.S. Cl.
    CPC ............ *G06F 3/038* (2013.01); *G06F 3/0346* (2013.01); *H04B 7/26* (2013.01); *H04M 1/72527* (2013.01); *H05B 37/0227* (2013.01)

(56) References Cited

U.S. PATENT DOCUMENTS

| | | | |
|---|---|---|---|
| 7,788,271 B2* | 8/2010 | Soma | G06F 21/10 |
| | | | 705/75 |
| 8,190,434 B2* | 5/2012 | Kameyama | A61B 5/16 |
| | | | 704/270 |
| 8,228,202 B2* | 7/2012 | Buchner | G06F 1/163 |
| | | | 340/573.1 |
| 8,416,184 B2* | 4/2013 | Morotomi | G06F 1/1624 |
| | | | 345/156 |
| 9,127,831 B2* | 9/2015 | Watanabe | F21L 13/06 |
| 9,133,024 B2* | 9/2015 | Phan | B01L 3/502738 |
| 9,205,277 B2* | 12/2015 | Feng | A61N 5/0618 |
| 9,396,627 B2* | 7/2016 | Fukuma | G09G 3/14 |
| 2001/0043232 A1 | 11/2001 | Abbott et al. | |
| 2004/0243324 A1 | 12/2004 | Nunokawa et al. | |
| 2005/0106713 A1 | 5/2005 | Phan et al. | |
| 2014/0247132 A1* | 9/2014 | Fukuma | G09G 3/14 |
| | | | 340/815.45 |

FOREIGN PATENT DOCUMENTS

| | | |
|---|---|---|
| JP | 2004-039415 A | 2/2004 |
| JP | 2005251443 A | 9/2005 |
| JP | 2007115412 A | 5/2007 |
| JP | 2007-221355 A | 8/2007 |
| JP | 3168514 | 5/2011 |
| WO | 2013084742 A1 | 3/2013 |
| WO | 2013073437 A1 | 5/2013 |

OTHER PUBLICATIONS

Office Action received for Chinese Patent Application No. 201280063730.5, dated Apr. 5, 2016, 20 pages of Office Action Including 12 pages of English translation.

* cited by examiner

FIG. 26

| SEAT NUMBER | GPS INFORMATION |
|---|---|
| AROUND SEAT A15 | LATITUDE = +34.44.36.02<br>LONGITUDE = +135.26.44.35 |
| AROUND SEAT B37 | LATITUDE = +34.44.36.11<br>LONGITUDE = +135.26.44.36 |
| AROUND SEAT C22 | LATITUDE = +34.44.36.22<br>LONGITUDE = +135.26.44.33 |
| ... | ... |

FIG. 27

| UMID | TIME CODE | IMAGE CAPTURING TARGET |
|---|---|---|
| X | 00:01:00:05 | AROUND SEAT A15 |
| | 00:20:30:20 | AROUND SEAT B37 |
| | 01:10:00:17 | AROUND SEAT C22 |
| Y | 01:01:01:15 | AROUND SEAT Z33 |
| | 01:02:20:21 | AROUND SEAT Y21 |
| | 01:10:01:12 | AROUND SEAT X56 |

FIG. 33

| TAG INFORMATION | TIMESTAMP | GPS INFORMATION | SNS ACCOUNT |
|---|---|---|---|
| XYZ1234 | 2011/10/15 19:15:23 | LATITUDE = +34.44.36.02 LONGITUDE = +135.26.44.35 | Mr.X, Mr.G, Ms.K, ... |
| ABC3456 | 2011/10/15 20:30:07 | LATITUDE = +34.44.36.11 LONGITUDE = +135.26.44.36 | Ms.A, Mr.D, Mr.L, ... |
| ZXCV8765 | 2011/10/15 20:33:17 | LATITUDE = +34.44.36.12 LONGITUDE = +135.26.44.33 | Mr.Z, Ms.J, ... |
| QWER7890 | 2011/10/15 20:45:49 | LATITUDE = +34.44.36.07 LONGITUDE = +135.26.44.31 | Ms.W, Mr.P, ... |

FIG. 34

| UMID | TIME CODE | IMAGE CAPTURING TARGET | TAG INFORMATION |
|---|---|---|---|
| X | 00:01:00:05 | AROUND SEAT A15 | XYZ1234 |
|  | 00:20:30:20 | AROUND SEAT B37 | ABC3456 |
|  | 01:10:00:17 | AROUND SEAT C22 | NONE |
| Y | 01:01:01:15 | AROUND SEAT Z33 | NONE |
|  | 01:02:20:21 | AROUND SEAT Y21 | ZXCV8765 |
|  | 01:10:01:12 | AROUND SEAT X56 | QWER7890 |

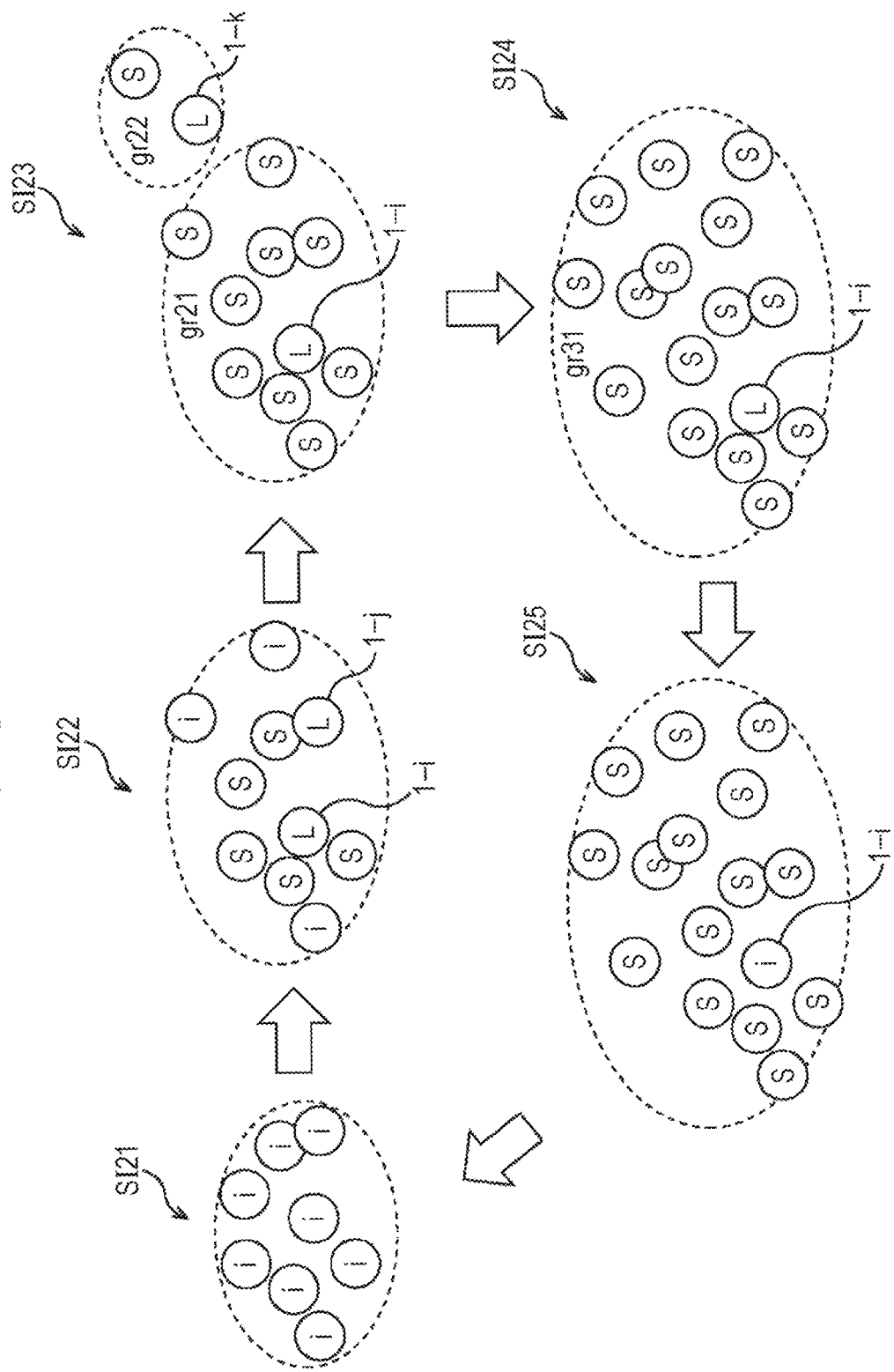

INFORMATION PROCESSING APPARATUS, AND METHOD

CROSS REFERENCES TO RELATED APPLICATIONS

The present application claims the benefit under 35 U.S.C. § 371 as a U.S. National Stage entry of International Patent Application Serial No. PCT/JP2012/082375, filed Dec. 13, 2012, which claims priority to Japanese Patent Application No. 2011-286520, filed in the Japanese Patent Office on Dec. 27, 2011.

TECHNICAL FIELD

The present technique relates to an information processing apparatus and a method, and particularly, to an information processing apparatus and a method capable of realizing a communication tool of a new mode.

BACKGROUND ART

No person can live without coexisting with others. Thus, a person feels a sense of security when forming a group with others and actually feeling that he/she belongs to the group, and desires to feel empathy and a sense of unity with the others belonging to the group.

Accordingly, to obtain the feeling of belonging to a group, or to feel empathy or a sense of unity with others belonging to the group, communication unique to the group may be performed in many cases. A communication tool is used in many cases for this purpose.

In recent years, due to the significant development in the information communication technology, highly sophisticated and multifunctional communication tools, such as mobile phones and smartphones, are becoming widespread (for example, see Patent Document 1).

CITATION LIST

Patent Document

Patent Document 1: JP 2007-221355 A

SUMMARY OF THE INVENTION

Problems to be Solved by the Invention

However, even if a mobile phone or a smartphone itself is highly sophisticated and multifunctional, a member of a predetermined group does not necessarily feel that he/she belongs to the group or feel empathy or a sense of unity with others belonging to the group when using the mobile phone, the smartphone or the like in communication among the group.

For example, a mobile phone, a smartphone or the like requires an operation that uses a part of the body, such as manual input or the like, and such an operation gets in the way when making the same movement in the group to achieve a sense of unity.

Accordingly, a communication tool of a new mode which is suitable for the purpose of allowing one to actually feel that he/she belongs to a group, or to feel empathy or a sense of unity with others belonging to the group is desired.

The present technique is achieved under such a circumstance, and is capable of realizing such a communication tool of a new mode.

Solutions to Problems

An information processing apparatus according to an aspect of the present technique includes a light emission unit for emitting light according to a light emission pattern identified based on a set of light emission parameters indicating characteristics of light emission, and a control unit for controlling the light emission pattern of the light emission unit based on a relationship between the self apparatus and a group to which the self apparatus and at least one other information processing apparatus including the light emission unit belong, or a relationship between the other information apparatus and the self apparatus belonging to the group.

There may be further included a communication control unit for controlling wireless communication with the at least one other information processing apparatus, wherein the control unit may control the light emission pattern of the light emission unit based on the relationship identified based on a result of control by the communication control unit.

There may be further included a vibration unit for vibrating according to a vibration pattern identified based on a set of vibration parameters indicating characteristics of vibration, wherein the control unit may control the vibration pattern of the vibration unit based on the relationship.

The control unit may control the light emission pattern of the light emission unit, further taking into account an influence of an external object other than the group.

There may be further included a distance calculation unit for calculating, as the external object, in a course of a plurality of users wearing the information processing apparatus and the at least one information processing apparatus belonging to the group gathering at a predetermined location, a distance between the predetermined location and an existing location of the information processing apparatus, wherein the communication control unit may identify, as the relationship, the number of the information processing apparatuses present within a specific range, based on position information of the other information processing apparatus, and wherein the control unit may control the light emission pattern of the light emission unit to change with the distance calculated by the distance calculation unit and the number identified by the communication control unit as parameters.

The communication control unit may control wireless communication with the external object while taking another apparatus not belonging to the group as the external object, and the control unit may control the light emission pattern of the light emission unit based on a result of the wireless communication with the external object based on control by the communication control unit.

There may be further included a sensor unit for detecting a change in a physical quantity caused by a motion of a user, and an excitement determination unit for determining a degree of excitement of the user based on a detection result of the sensor unit, wherein the communication control unit may perform control so as to transmit the degree of excitement to the at least one other information processing apparatus, and to receive the degree of excitement of at least one user of the at least one other information processing apparatus, and wherein the control unit may control the light emission pattern of the light emission unit based on the relationship indicated by the degree of excitement of at least one of the self apparatus and the at least one other information processing apparatus.

The external object may be another information processing apparatus not belonging to the group, including at least the light emission unit and the sensor unit, and the control unit may take a condition that the group to which the self apparatus belongs is made a target by the external object based on a detection result of the sensor unit of the external object, as a condition for the influence of the external object, and control the light emission pattern of the light emission unit by determining whether the condition for the influence of the external object and a condition regarding the relationship are satisfied.

The condition regarding the relationship may be a condition that the degree of excitement of the self apparatus is highest among the group.

The external object may be an imaging apparatus for capturing a plurality of users of the self apparatus and the at least one other information processing apparatus belonging to the group, and, in a case where the degree of excitement determined by the excitement determination unit is at or above a threshold, the communication control unit may transmit a request for start of image capturing to the imaging apparatus such that image capturing by the imaging apparatus taking a user of the self apparatus as an image capturing target is started.

The communication control unit may receive information indicating that image capturing is started by the imaging apparatus according to the request for start of image capturing from the self apparatus, and the control unit may control the light emission pattern of the light emission unit based on the information received by the communication control unit.

The excitement determination unit may determine the degree of excitement based on information, generated based on a detection result of the sensor unit, indicating a degree of relatedness or a degree of difference regarding synchronicity of motions of bodies or parts of bodies of a plurality of users.

The external object may be an imaging apparatus for capturing a location where a group exists, and an external apparatus for acquiring an image capturing result showing a user of the information processing apparatus or of the at least one other information processing apparatus belonging to the group in a predetermined time slot, from image capturing results of the imaging apparatus, and the communication control unit may transmit, to the external apparatus, a time when the degree of excitement determined by the excitement determination unit has reached or exceeded a threshold as information for acquisition to be used at a time of acquiring an image capturing result showing a user of the self apparatus in a time slot including the time.

The communication control unit may also transmit a position of the self apparatus to the external apparatus as the information for acquisition.

The communication control unit may also transmit an ID of the self apparatus to the external apparatus as the information for acquisition.

The communication control unit may receive information enabling identification of the light emission pattern of the light emission unit of the other information processing apparatus belonging to the group, and the control unit may control the light emission pattern of the light emission unit based on the light emission pattern identified by the information enabling identification of the light emission pattern received by the communication control unit.

The information processing apparatus may include a ring-shaped portion wearable on an arm of the user, and the portion may be provided with a joining portion for releasing or connecting a part of the portion.

The joining portion may include a magnet and an attraction plate for connecting the part of the portion.

The joining portion may connect the part of the portion by elastic deformation of material.

An information processing method according to a first aspect of the present technique is a method corresponding to the information processing apparatus according to the first aspect of the present technique described above.

According to the information processing apparatus and the method according to the first aspect of the present technique, the light emission unit emits light according to a light emission pattern identified based on a set of light emission patterns indicating characteristics of light emission, and the light emission pattern of the light emission unit is controlled based on a relationship between the self apparatus and a group to which the self apparatus and at least one other information processing apparatus including the light emission unit belong, or a relationship between the other information apparatus and the self apparatus belonging to the group.

Effects of the Invention

As described above, according to the present technique, a communication tool of a new mode may be realized.

BRIEF DESCRIPTION OF DRAWINGS

FIG. 26 is a diagram showing a structure of a list of image capturing location information.

FIG. 27 is a diagram showing management information of image data.

FIG. 33 shows an example of a structure of a list of management information.

FIG. 34 shows an example of a structure of a list of management information.

FIG. 41 is a diagram showing state transition until cancellation of a group.

MODES FOR CARRYING OUT THE INVENTION

[Outline of Present Technique]

First, an outline of the present technique will be described so as to facilitate understanding of the present technique.

An information processing apparatus to which the present technique is to be applied is a ring-shaped device (hereinafter abbreviated as a ring) having a diameter suitable for being worn on the arm of a user, such as a wrist band or a bracelet, in which various types of sensors, a wireless module, a light emitting device, a vibrating body, and the like are built in, and is to be worn on the arm of a user. The basic functions of the ring are light emission and vibration, and there are many (substantially innumerable) patterns of light emission and vibration, and selective switching according to various types of information such as information obtained by a built-in sensor or information obtained from outside by communication is possible.

According to the present technique, in the case a plurality of users wearing such a ring get together or plan to get together for a predetermined shared purpose, control is performed for a group of a plurality of rings worn on the arms of the respective users using at least one or some of the plurality of rings. Hereinafter, such control will be referred to as group control. For example, control of light emission or vibration of each of the plurality of rings in the group, and control of a target object other than the ring (an information processing apparatus such as a camera) based on light emission or vibration of each of the plurality of rings are the examples of group control.

For example, in the group control, light emission or vibration of each of the plurality of rings is controlled based on the relationship between a ring and the group to which the ring and at least one other ring belong, or the relationship between the ring and predetermined another ring belonging to the group. Also, for example, in the group control, light emission or vibration of each of the plurality of rings is controlled based on the result of communication with a target object, other than a ring, not belonging to the group.

First, the structure of an individual ring for realizing such group control will be described with reference to FIGS. 1 to 5.

[Schematic Structure of Ring]

Figure 1:
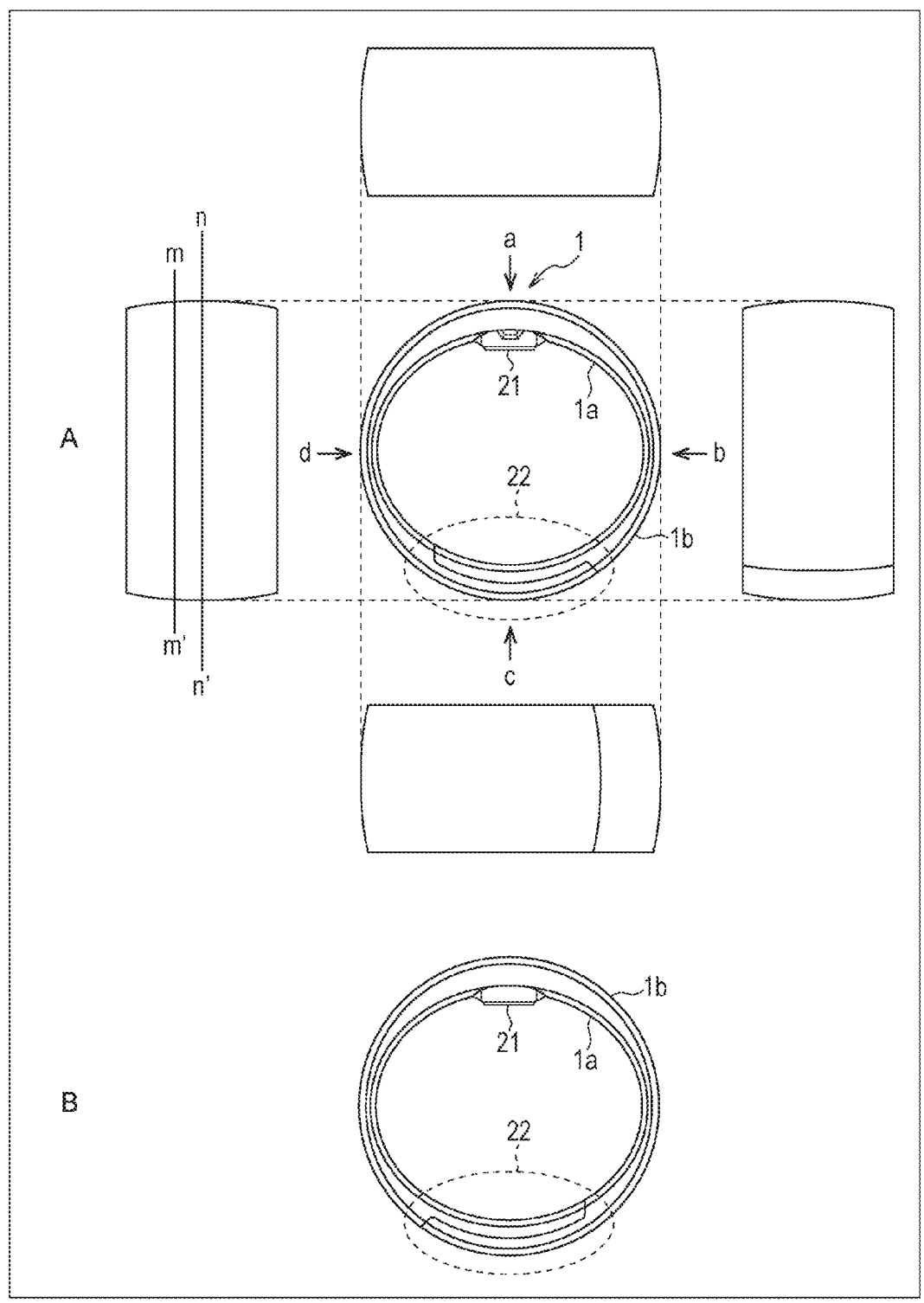
FIG. 1 is a diagram showing a schematic structure of a ring.

FIG. 1 is a diagram showing a schematic structure of a ring 1 as an embodiment of the information processing apparatus to which the present technique is applied. The drawing in the middle of A of FIG. 1 is a front view of the ring 1. Here, the front is the surface in a case where the arm wearing the ring 1 is seen from the side of the hand. The upper drawing of A of FIG. 1 is the top view of the ring 1 where the ring 1 is seen from the direction of the arrow a. The right-hand drawing of A of FIG. 1 is the right side view of the ring 1 where the ring 1 is seen from the direction of the arrow b. The lower drawing of A of FIG. 1 is the bottom view of the ring 1 where the ring 1 is seen from the direction of the arrow c. The left-hand drawing of A of FIG. 1 is the left side view of the ring 1 where the ring 1 is seen from the direction of the arrow d. Also, B of FIG. 1 is the rear view of the ring 1.

As shown in FIG. 1, a substrate 21 is embedded in an inner circumferential portion 1a of the ring-shaped ring 1. Details will be given below with reference to FIG. 3, but various types of sensors, a wireless module, a light emitting device, a vibration mechanism, and the like are mounted on the substrate 21. Also, a joining portion 22 is provided at a position facing the substrate 21. Details will be given below, but the joining portion 22 releases or connects end portions of a circumferential portion forming the side surface of the ring 1. That is, a user may put his/her arm through the ring 1 or remove the ring 1 from the arm by releasing the end portions at the joining portion 22, and may wear the ring 1 by joining the end portions at the joining portion 22.

When seen from the front or from the back, the inner circumferential portion 1a of the ring 1 is oval-shaped, whereas an outer circumferential portion 1b is round. The outer circumferential portion 1b of the ring 1 is round so that light from a light emitting device mounted on the substrate 21 is uniformly guided. The inner circumferential portion 1a of the ring 1 is oval-shaped so that the shape fits the shape of the arm of a user, and the wearability of the ring 1 is increased.

[Perspective View of Ring]

Figure 2:
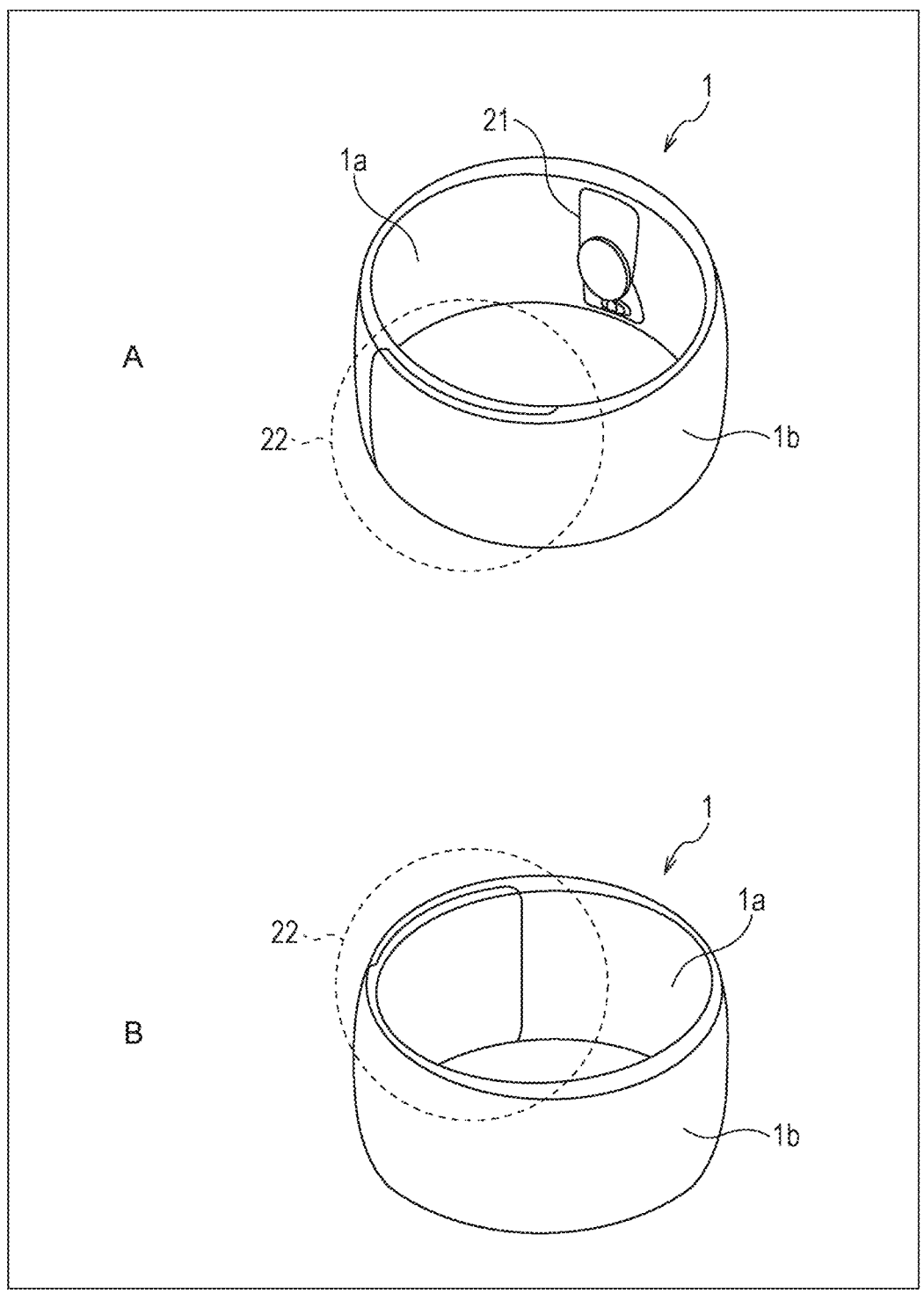
FIG. 2 is a perspective view of the ring.

FIG. 2 is a perspective view of the ring 1. The perspective view of the ring 1 seen from the direction that allows viewing of the substrate 21 is shown in A of FIG. 2. The perspective view of the ring 1 seen from the direction that allows viewing of the joining portion 22 is shown in B of FIG. 2. As shown in FIG. 2, end portions of the circumferential portion of the ring 1 are joined at the joining portion 22.

[Schematic Structure of Substrate]

Figure 3:
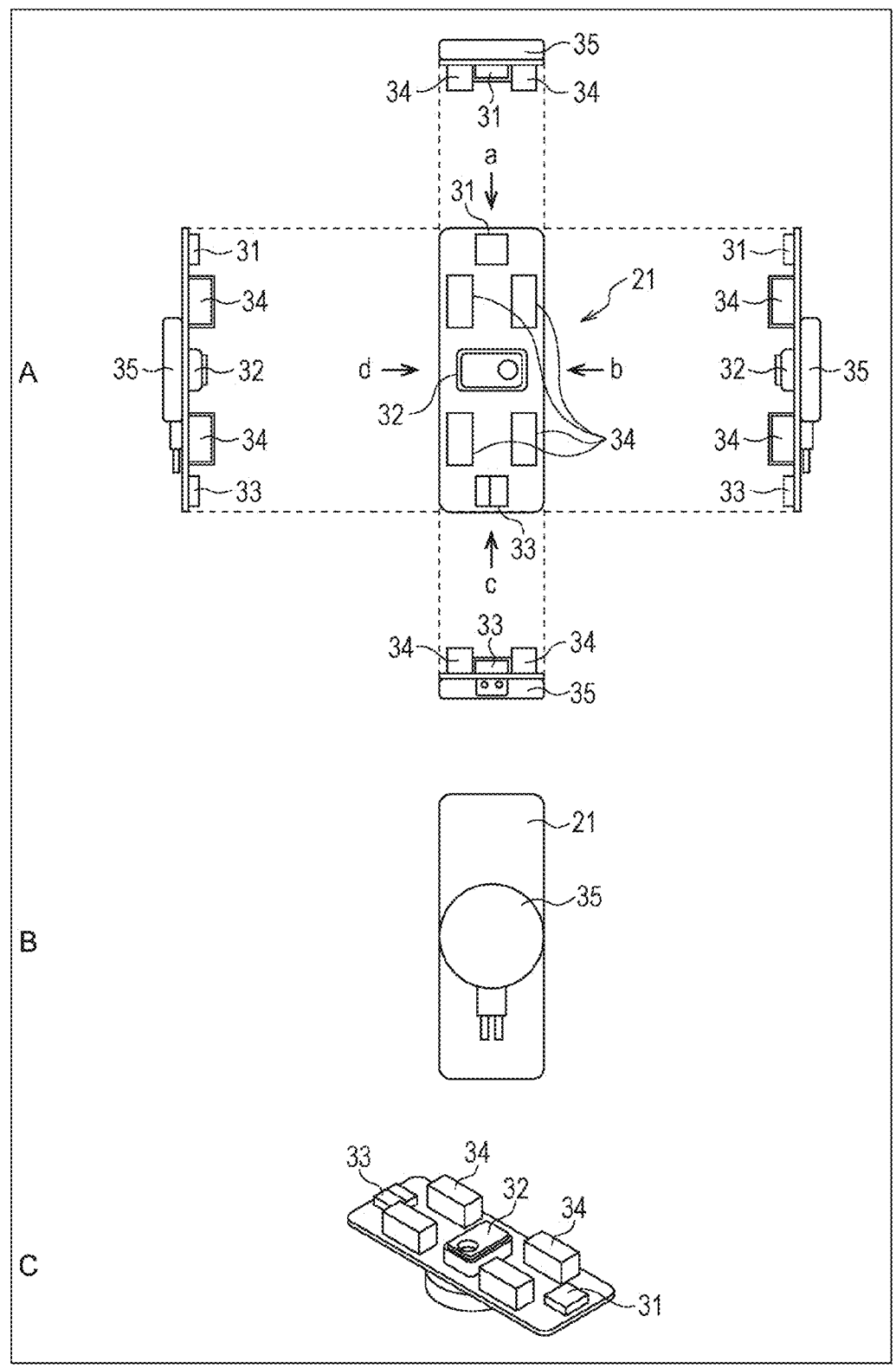
FIG. 3 is a diagram showing a schematic structure of a substrate.

FIG. 3 is a diagram showing a schematic structure of the substrate 21 mounted on the ring 1. The drawing in the middle of A of FIG. 3 is a front view of the substrate 21. Here, the front is the surface where various types of sensors, a wireless module, a light emitting device, a vibration mechanism, and the like are mounted. The upper drawing of A of FIG. 3 is the top view of the substrate 21 where the substrate 21 is seen from the direction of the arrow a. The right-hand drawing of A of FIG. 3 is the right side view of the substrate 21 where the substrate 21 is seen from the direction of the arrow b. The lower drawing of A of FIG. 3 is the bottom view of the substrate 21 where the substrate 21 is seen from the direction of the arrow c. The left-hand drawing of A of FIG. 3 is the left side view of the substrate 21 where the substrate 21 is seen from the direction of the arrow d. Also, B of FIG. 3 is the rear view of the substrate 21. Furthermore, C of FIG. 3 is the perspective view of the substrate 21.

As shown in A of FIG. 3, a CPU (Central Processing Unit) 31, a wireless module 32, a 3-axis accelerometer 33, and an LED (Light Emitting Diode) 34 are mounted on the front of the substrate 21. Specifically, on the front of the substrate 21, the wireless module 32 is arranged substantially at the center, and four LEDs 34 are arranged, one near each of the four corners of the wireless module 32. Also, the CPU 31 is arranged at one end portion of the end portions of the substrate 21 in the longitudinal direction, and the 3-axis accelerometer 33 is arranged at the other end portion.

The CPU 31 performs various processes according to programs and the like recorded in a built-in memory (a storage unit 88 in FIG. 1 described below). The built-in memory also stores, as necessary, data and the like necessary for execution of various processes by the CPU 31.

The wireless module 32 exchanges various types of information with another information processing apparatus or another ring 1 by wireless communication.

The 3-axis accelerometer 33 detects acceleration in three axes substantially orthogonal to one another, and supplies sensor information indicating the detection result to the CPU 31. That is, the 3-axis accelerometer 33 detects the physical quantity caused by a motion of the user, that is, a change in the acceleration.

The LED 34 emits light in a plurality of patterns under the control of the CPU 31. The pattern of light emission is identified by a set of light emission parameters indicating the characteristics of light emission, that is, a set of one or more elements among a plurality of elements including the amount of light, the color of emitted light, the interval of light emission, and the duration of light emission, for example.

Additionally, although not shown, the substrate 21 may also include sensors for acquiring biological information, such as a heartbeat sensor, a blood pressure sensor, a body temperature sensor, and the like. Moreover, the substrate 21 may also include sensors for acquiring environmental information, such as a geomagnetic sensor, a pressure sensor, temperature sensor, a humidity sensor, a sound sensor, an image sensor, an ultraviolet sensor, a radiation sensor, and the like.

As shown in B of FIG. 3, a vibration mechanism 35 is mounted on the rear surface of the substrate 21. The vibration mechanism 35 vibrates in a plurality of patterns under the control of the CPU 31. The pattern of vibration is identified by a set of vibration parameters indicating the characteristics of vibration, that is, a set of one or more elements among a plurality of elements including the number of times of vibration, the interval of vibration, and the duration of vibration.

Additionally, the size of the substrate 21 is such that the substrate 21 may be hidden by a logo or a mark drawn on the surface of the ring 1 so that even if the main body of the ring 1 is transparent or semitransparent, the external appearance is not impaired.

[Cross-Sectional Diagram of Ring]

Figure 4:
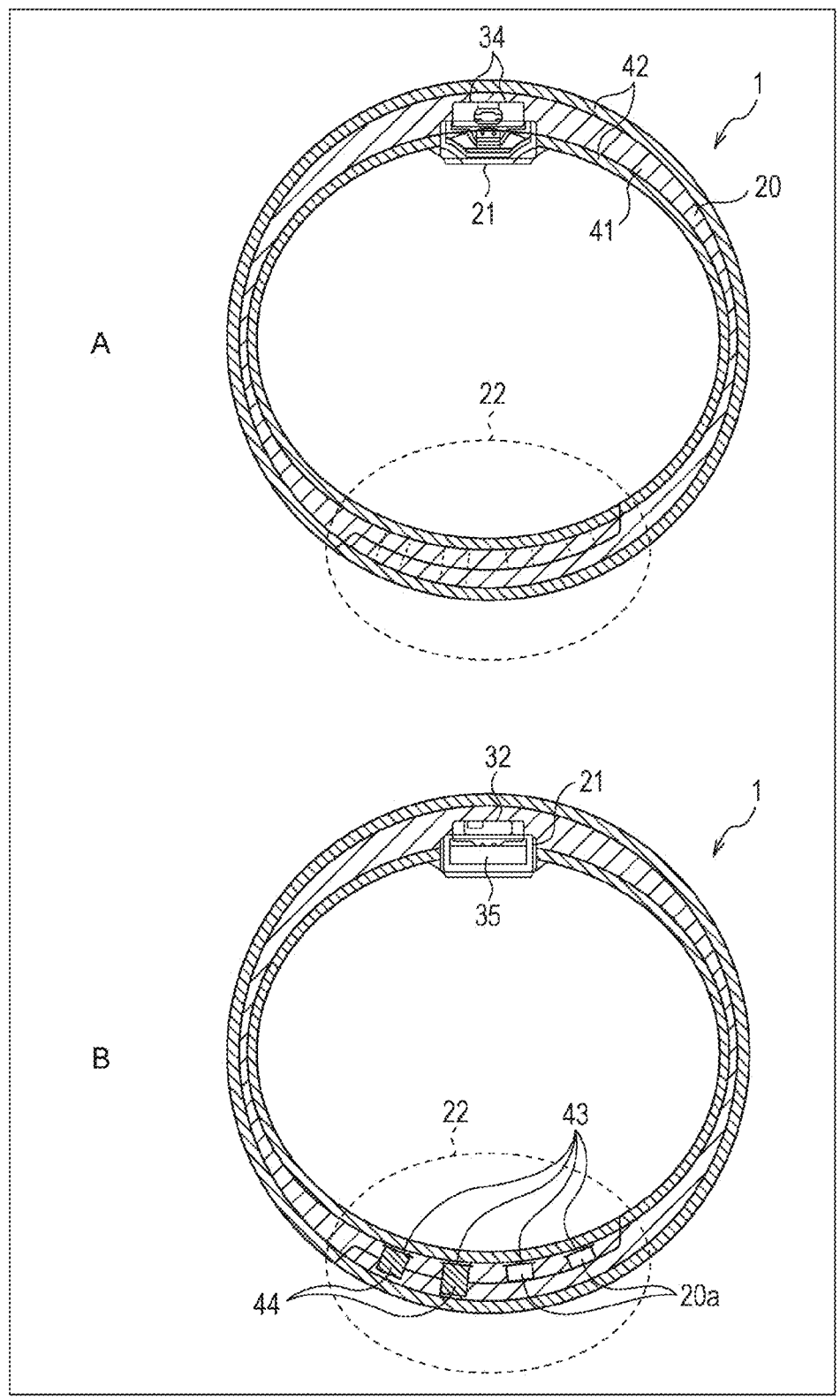
FIG. 4 is a cross-sectional diagram of the ring.

FIG. 4 is a cross-sectional diagram of the ring 1. The cross-sectional diagram of the ring 1 at the line m-m' in the left-hand drawing of A of FIG. 1 is shown in A of FIG. 4. The cross-sectional diagram of the ring 1 at the line n-n' in the left-hand drawing of A of FIG. 1 is shown in B of FIG. 4.

As shown in A of FIG. 4, a main body 20 of the ring 1 has a three-layer structure of a light guiding layer 41 on the inside, and reflection/diffusion layers 42 sandwiching the light guiding layer 41 from the inner circumferential side and the outer circumferential side.

The light guiding layer 41 guides the light emitted from the LED 34 of the substrate 21 to the entire ring 1 in the same manner as an optical fiber cable.

The reflection/diffusion layers 42 reflect and diffuse the light guided by the light guiding layer 41 of the substrate 21 to outside the ring 1.

As shown in A of FIG. 4, a plurality of LEDs 34 are arranged at axisymmetric positions with no shielding object in between. Light emitted from the LEDs 34 arranged in this manner is guided to the entire main body 20 of the ring 1 by the light guiding layer 41, and is diffused outside the ring 1 by the reflection/diffusion layers 42.

As shown in B of FIG. 4, a groove 20a is formed on the inside of the joining portion 22 of the ring 1, and a plurality (four in the example in FIG. 4) of attraction plates 43, such as iron, to be attracted to a magnet are provided at the bottom portion of the groove 20a. Also, a fewer number (two in the example in FIG. 4) of magnets 44 than the attraction plates 43 are provided on the outside of the joining portion 22 of the ring 1, the magnets having a size and a shape for being fitted into the groove 20a provided on the inner side of the joining portion 22. The end portions of the circumferential portion of the ring 1 are joined by the attraction force of the magnets 44 attracting the attraction plates 43 at the joining portion 22. The end portions are separated when a force greater than the attraction force is applied.

Such a structure of the joining portion 22 allows the ring 1 to be worn on arms of various sizes from a little arm to a big arm. Also, since fasteners or the like are not provided to the joining portion 22, the wearability is good for the user and attachment and detachment are facilitated, and also, light from the LED 34 is guided and diffused without being shielded. Moreover, the amount of light is reduced at each of the end portions of the ring 1, but the end portions are made to overlap each other at the joining portion 22, and the amounts of light are added up, and to a user's eyes, the light is uniformly diffused over the entire ring 1, and the external appearance is enhanced.

Also, as shown in FIG. 4, the vibration mechanism 35 provided to the substrate 21 is provided in a manner protruding from the inner circumferential portion of the ring 1. Accordingly, the vibration mechanism 35 is in contact with the arm of the user, and the vibration of the vibration mechanism 35 is easily transferred to the arm of the user.

As the material of the main body 20 of the ring 1, synthetic resin such as polyurethane elastomer (RU-842A-CLR) may be used, for example. Both the inside and the outside of the joining portion 22 are transparent or semitransparent, and diffusion agent for diffusing light is contained on the outside in an amount of 5 percent, for example.

As the material of the attraction plate 43, SUS430 may be used, for example. Also, as the material of the magnet 44, neodymium may be used, for example.

Additionally, although not shown, the substrate 21 may be covered by a cover. As the material of the cover in this case, aluminium may be used, for example. Also, although not shown, a spacer may be installed between the cover and the vibration mechanism 35, and as the material of the spacer, PET may be used, for example.

[Another Schematic Structure of Ring]

Figure 5:
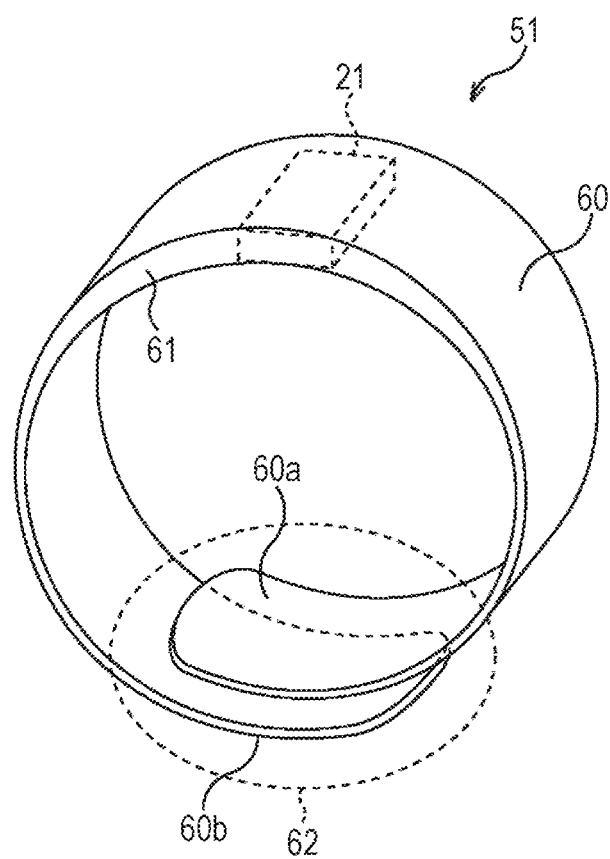
FIG. 5 is a diagram showing another schematic structure of the ring.

FIG. 5 is a diagram showing a schematic structure of a ring 51 having a structure different from that of the ring 1.

The basic structure of the ring 51 shown in FIG. 5 is the same as that of the ring 1. Accordingly, in the following, the ring 51 will be described with regard to only the differences to the ring 1 while omitting description of overlapping aspects.

Whereas the ring 1 has a three-layer structure of the light guiding layer 41 and the reflection/diffusion layers 42, the ring 51 has a one-layer structure of only a light guide layer 61.

Whereas the joining portion 22 of the ring 1 is provided with the magnets 44 and the attraction plates 43, nothing is provided to a joining portion 62 of the ring 51. The joining portion 62 is processed such that, when no force is applied to a main body 60 of the ring 51, an end portion 60a on the inside and an end portion 60b on the outside overlap each other while being in contact with each other. When the ring 51 is to be worn on the arm, the main body 60 is elastically deformed with the diameter of the circle of the main body 60 being enlarged. When the arm is inserted through the circle, and the force on the main body 60 is released, the main body 60 is returned to its original position by the elastic force. That is, end portions of the joining portion 62 are joined by the elastic deformation of the material of the ring 51. As the material of the main body 60, polyurethane elastomer may be used as in the case of the main body 20.

According to such a structure of the joining portion 62, the ring 51 is enabled to be worn on arms of various sizes. Also, since fasteners or the like are not provided to the joining portion 62, the wearability is good for the user and attachment and detachment are facilitated, and also, light from the LED 34 is guided without being shielded. Moreover, the amount of light is reduced at each of the end portions of the ring 51, but the end portions are made to overlap each other at the joining portion 62, and the amounts of light are added up, and to a user's eyes, the light shines on the entire ring 51, and the external appearance is enhanced. Furthermore, since the attraction plates 43, the magnets 44, fasteners, and the like are not provided to the joining portion 62, the manufacturing cost may be kept low.

Additionally, the main body 60 of the ring 51 may have a three-layer structure in the same manner as the ring 1. Similarly, the main body 20 of the ring 1 described above may have a one-layer structure in the same manner as the main body 60 of the ring 51. Also, a description is given below with respect to the ring 1, but the same thing can, of course, be said with respect to the ring 51.

[Example Functional Structure of Substrate 21]

Figure 6:
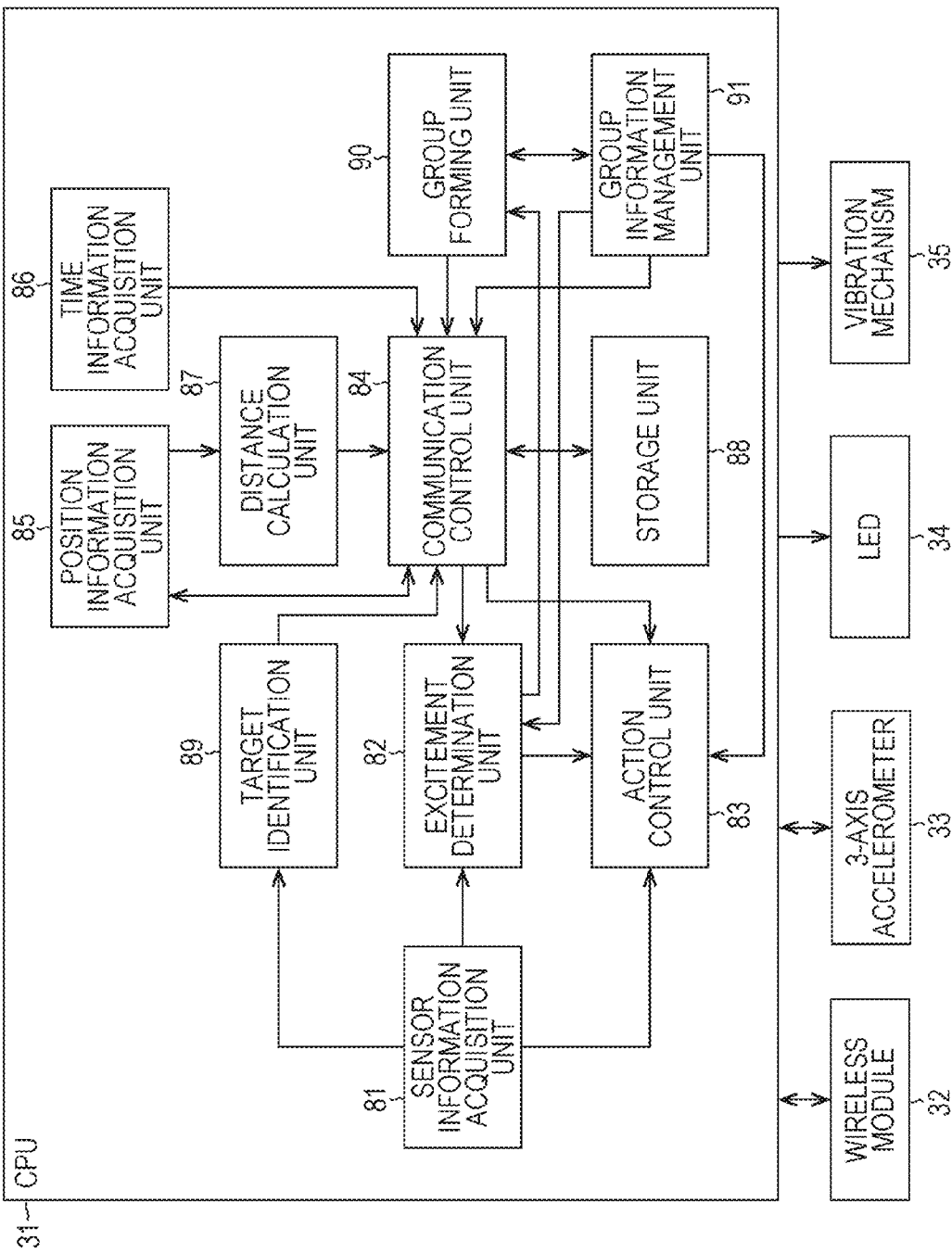
FIG. 6 is a functional block diagram showing a functional structure of the substrate.

FIG. 6 is a functional block diagram showing a functional structure of the substrate 21 in FIG. 3.

The substrate 21 includes the CPU 31, the wireless module 32, the 3-axis accelerometer 33, the LED 34, and the vibration mechanism 35.

The wireless module 32, the 3-axis accelerometer 33, the LED 34, and the vibration mechanism 35 are described above with reference to FIG. 3, and a description thereof is omitted. Additionally, as described above, the substrate 21 may include another sensor that is not shown. In this case, a sensor information acquisition unit 81 described below acquires detected information from the other sensor that is not shown.

Functionally, the CPU 31 includes a sensor information acquisition unit 81, an excitement determination unit 82, an action control unit 83, a communication control unit 84, a position information acquisition unit 85, a time information acquisition unit 86, a distance calculation unit 87, a storage unit 88, a target identification unit 89, a group forming unit 90, and a group information management unit 91.

Each of these functions will be described in detail together with first to fifth examples of group control using the ring 1 to which the present technique is applied, with reference to FIGS. 7 to 37.

[First Example of Group Control]

First, a first example of group control using the ring 1 to which the present technique is applied will be described with reference to FIGS. 7 and 8.

Figure 7:
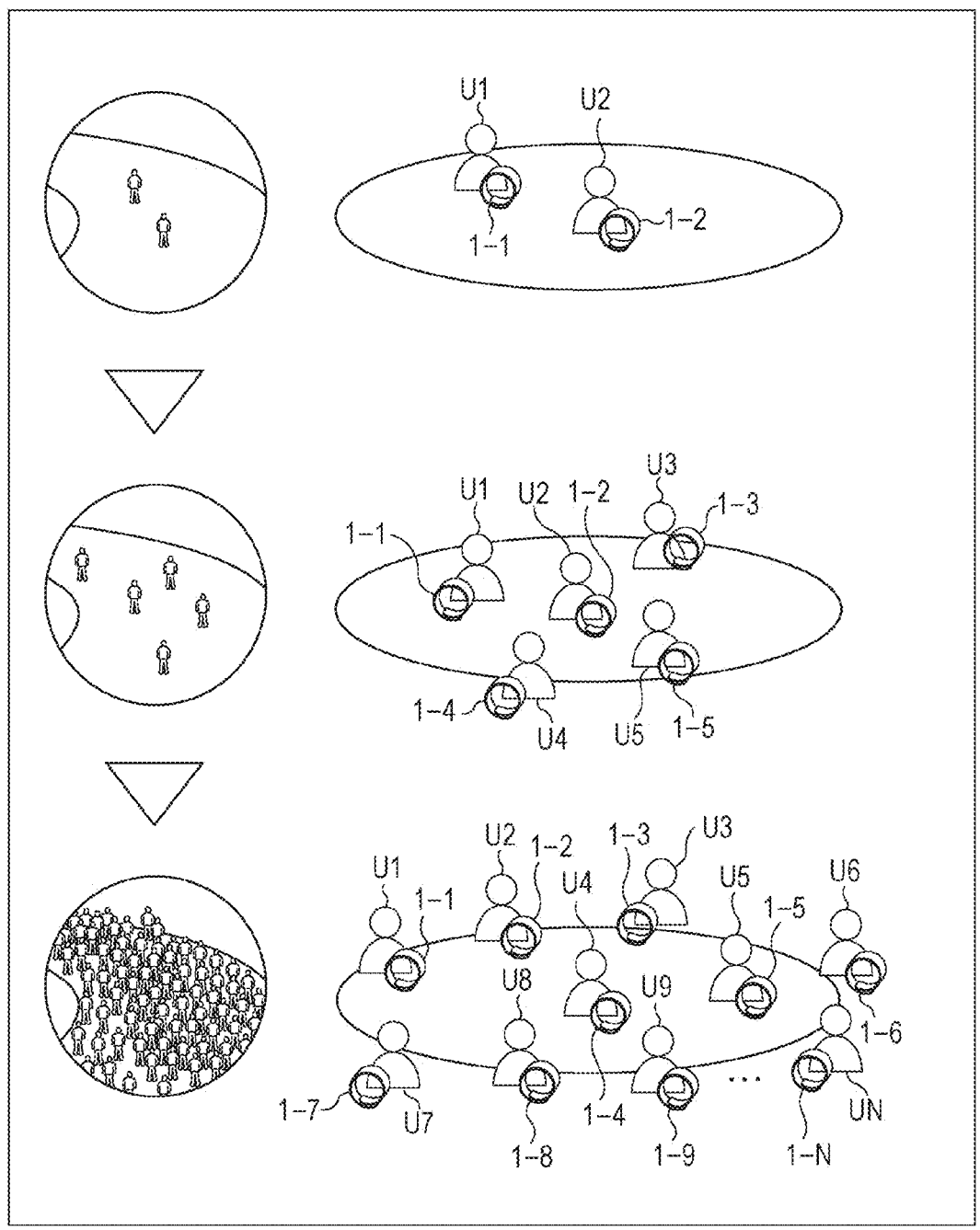
FIG. 7 is a diagram for describing a first example of group control.

FIG. 7 is a diagram for describing the first example of group control.

As the first example of group control in FIG. 7, control is performed, until a plurality of users gathering at a predetermined venue for the purpose of attending a predetermined event held at the predetermined venue have gathered, with respect to light emission or vibration of each of the rings worn on the arms of the plurality of users. Additionally, in the first example, the plurality of rings 1 heading to the predetermined venue are assumed to form a group.

In the case group control of the first example in FIG. 7 is to be performed, the action control unit 83, the communication control unit 84, the position information acquisition unit 85, the distance calculation unit 87, and the storage unit 88 are to function, among the functional structures of the CPU 31 in FIG. 6.

For example, it is assumed that a user Uk wearing a ring 1-$k$ ($k$ is an arbitrary integer of one or more) is heading to the venue where the predetermined event is to be held. In this case, generally, the number of other users participating in the predetermined event, that is, the number of other rings 1 worn on the arms of other users, increases as the user Uk gets nearer to the venue. Thus, in the first example in FIG. 7, group control of changing the pattern of light emission or vibration of the ring 1-$k$ according to the number of other rings 1 is performed. Additionally, it is assumed that the storage unit 88 of the ring 1-$k$ acquires, in advance and by an arbitrary method, action information defining the action of each pattern of light emission and vibration, and information including position information of the predetermined venue (hereinafter referred to as event information), and stores the pieces of information.

Specifically, in the upper drawing in FIG. 7, it is assumed that a user U1 wearing a ring 1-1 has arrived at a point within a predetermined distance, for example, 1 km, of the venue. That is, the position information acquisition unit 85 of the ring 1-1 acquires the current position information of the ring 1-1 by using a GPS (Global Positioning System). Then, the distance calculation unit 87 calculates the distance to be venue based on the current position information of the ring 1-1 acquired by the position information acquisition unit 85 and the position information of the predetermined venue stored in the storage unit 88. In this case, the distance between the ring 1-1 and the venue is calculated by the distance calculation unit 87 to be within preset 1 km.

Then, the communication control unit 84 of the ring 1-1 starts acquisition of position information of other rings 1 by the wireless module 32, and detects the number of other rings 1 present within a predetermined range. In the upper drawing of FIG. 7, the communication control unit 84 of the ring 1-1 detects that the number of other rings 1 present within the predetermined range is one, based on the acquired position information of another ring 1-2 present within the predetermined range. Then, the action control unit 83 of the ring 1-1 emits light and vibrates according to a predetermined pattern according to the action information stored in the storage unit 88, for example, a first pattern that is defined for a case where the number of other rings 1 present within the predetermined range is five or less.

As shown in the drawing second from the top in FIG. 7, it is assumed that the user U1 wearing the ring 1-1 has got nearer to the venue, and has reached a point within 500 meters of the venue, for example. In this case, since the number of users increases as it gets nearer to the venue, the number of other rings 1 detected by the communication control unit 84 of the ring 1-1 also increases. Thus, the action control unit 83 of the ring 1-1 changes the pattern of light emission and vibration from the first pattern for the upper drawing of FIG. 7 to a second pattern that is defined for a case where the number of other rings 1 present within the predetermined range is 50 or less, for example. Then, the ring 1-1 emits light and vibrates according to the second pattern. The second pattern of light emission and vibration in this case is set such that the amount of light emission and the intensity of vibration are increased than in the first pattern.

As shown in the lower drawing of FIG. 7, it is assumed that the user U1 wearing the ring 1-1 has reached the venue, that is, the user has reached a point that is 0 meters from the venue. In this case, since there are many users at the venue, the number of other rings 1 detected by the ring 1-1 is increased. Accordingly, the action control unit 83 of the ring 1-1 changes the pattern of light emission and vibration from the second pattern for the drawing second from the top in FIG. 7 to a third pattern that is defined for a case where the number of other rings 1 present within the predetermined range is 100 or more, for example. Then, the ring 1-1 emits light and vibrates according to the third pattern. The third pattern of light emission and vibration in this case is set such that the amount of light emission and the intensity of vibration are increased than in the second pattern.

[Action Control Process]

Next, of processes to be performed by the ring 1 in the first example of group control, the flow of a process of controlling an action that changes according to the distance to a predetermined venue and the number of other rings 1 (hereinafter referred to as an action control process) will described.

Figure 8:
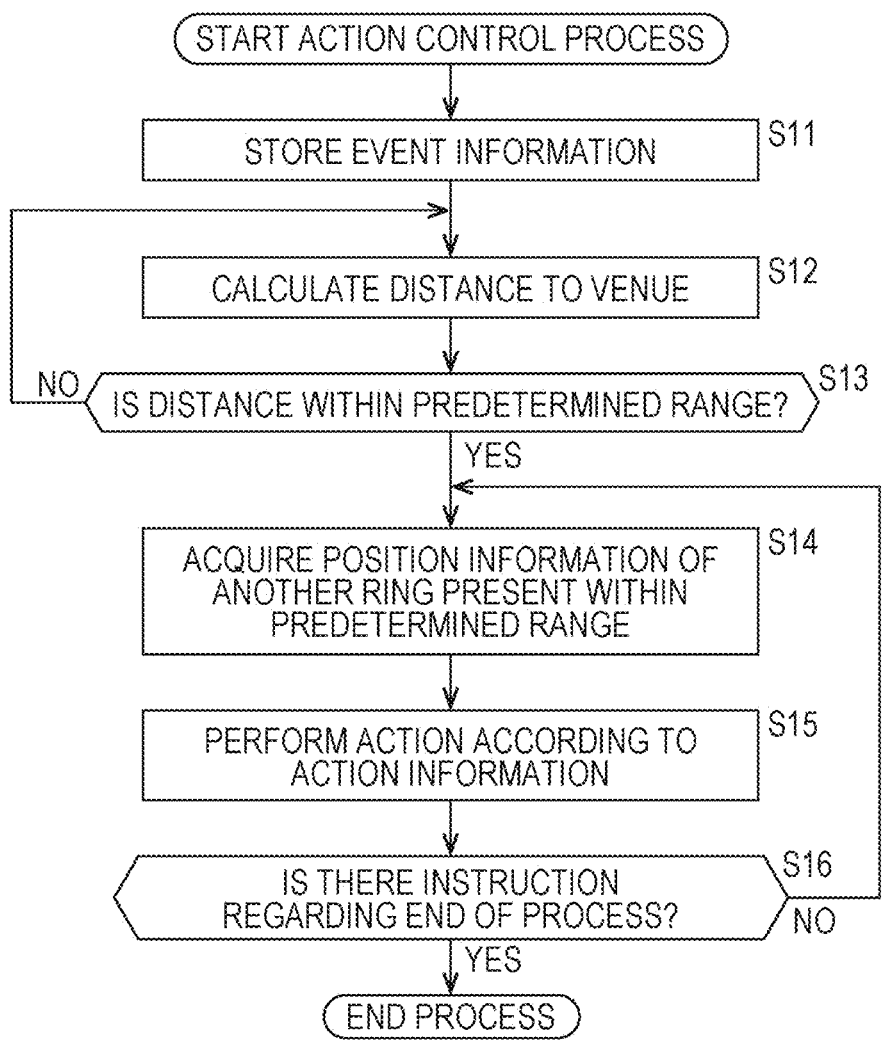
FIG. 8 is a flowchart for describing a flow of an action control process.

FIG. 8 is a flowchart for describing a flow of the action control process.

In step S11, the storage unit 88 stores event information. As described above, the event information includes the action information and the position information of a predetermined venue. The event information may be stored in the storage unit 88 of the ring 1 in advance, or may be provided by the host of the event by arbitrary provision means.

In step S12, the distance calculation unit 87 calculates the distance to the predetermined venue. That is, the distance calculation unit 87 calculates the distance to the venue based on the current position information of the ring 1 acquired by the position information acquisition unit 85 and the position information of the predetermined venue stored in the storage unit 88.

In step S13, the distance calculation unit 87 determines whether or not the distance from the current position of the ring 1 to the predetermined venue is within a predetermined range. For example, whether or not the distance from the current position of the ring 1 to the predetermined venue is within 1 km that is set in advance is determined.

In the case the distance is not within the predetermined range, NO is determined in step S13, and the process is returned to step S12 to be repeated therefrom. That is, the loop process of step S12 and step S13 is repeated until the distance is within the predetermined range.

Then, when the user wearing the ring 1 gets nearer to the predetermined venue, and the distance to the venue is within the predetermined range, YES is determined in step S13, and the process proceeds to step S14.

In step S14, the communication control unit 84 acquires the position information of another ring 1 present within the predetermined range. That is, the communication control unit 84 starts acquisition of the position information of another ring 1 by the wireless module 32, and detects the number of other rings 1 present within the predetermined range.

In step S15, the action control unit 83 performs an action according to the action information stored in the storage unit 88. Patterns of light emission and vibration that change according to the number of other rings 1 present within the predetermined range are defined by the action information. Patterns of the amount of light and the intensity of vibration defined by the action information are set to be stronger as the number of other rings 1 present within the predetermined range is larger.

In step S16, the action control unit 83 determines whether or not an instruction for the end of the process is issued. Here, the instruction for the end of the process is not particularly restricted, and a predetermined operation for instructing the process to be ended may be performed by the user wearing the ring 1. Alternatively, predetermined information instructing the process to be ended may be transmitted to the ring 1 by the host of the event, for example.

In the case the instruction for the end of the process is not issued, NO is determined in step S16, and the process is returned to step S14 to be repeated therefrom. That is, the loop process from step S14 to S16 is performed until the instruction for the end of the process is issued.

Then, when the instruction for the end of the process is issued, YES is determined in step S16, and the action control process is ended.

In this manner, the pattern of the amount of light emission and the intensity of vibration changes with the distance to a venue and the number of rings 1 present within a predetermined range as the parameters. That is, the amount of light emission and the intensity of vibration of the ring 1 increase as one gets nearer to the venue, and the anticipation for the event and the thrilling sensation of participating in the event gradually build up in the user. Also, the user wearing the ring 1 may feel empathy and a sense of unity with other users around by seeing the rings 1 of other users around emitting light and vibrating in the same manner. Moreover, the user of the ring 1 may feel a sense of superiority over other users not wearing the ring 1.

[Second Example of Group Control]

Next, a second example of group control using the ring 1 to which the present technique is applied will be described with reference to FIGS. 9 to 14.

Figure 9:
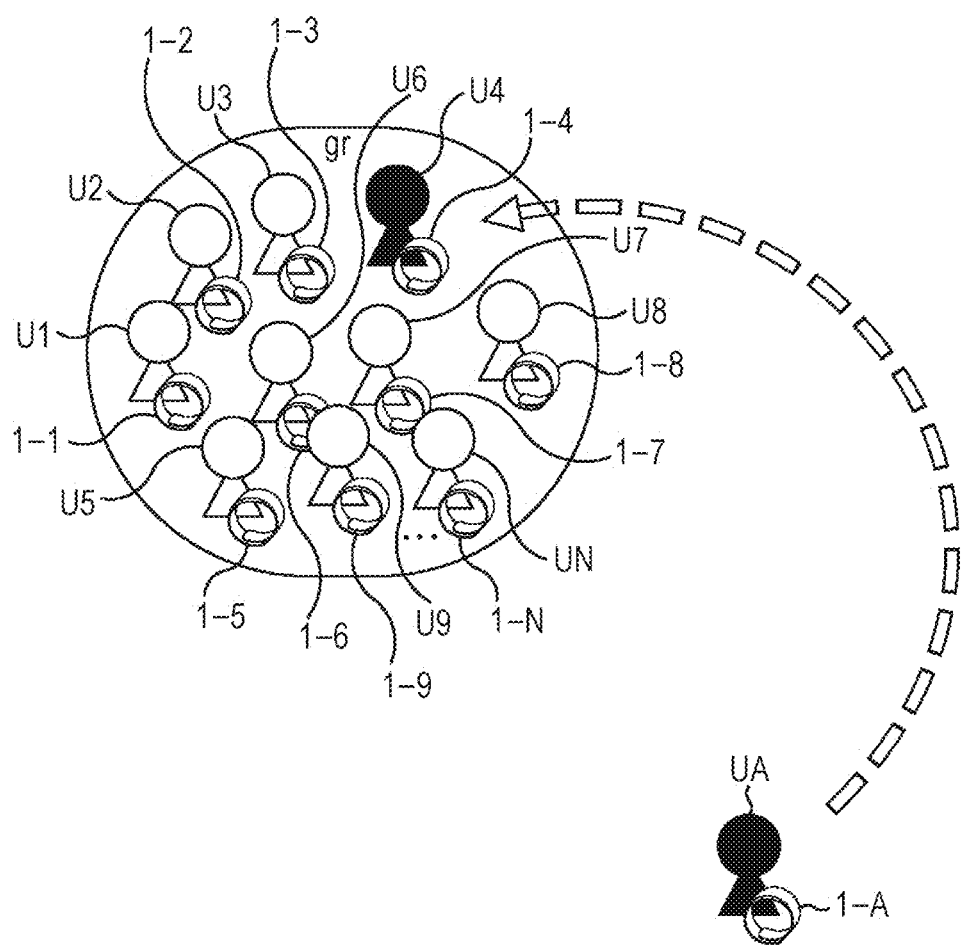
FIG. 9 is a diagram for describing a second example of group control.

FIG. 9 is a diagram for describing the second example of group control.

As the second example of group control in FIG. 9, first, control is performed, for example, at a venue where an event of a predetermined artist is held, to form a group of a plurality of rings 1 worn on the arms of a plurality of users, where a leader is to be selected from the plurality of rings 1. Next, as the second example of group control, control is performed in such a way that, when the group is appointed as a target by the artist wearing the ring 1 not belonging to a group, only the leader reacts by emitting light and vibrating.

The method of selecting a leader is not particularly restricted, but in the present embodiment, a method of detecting, by each of the plurality of rings 1 in the group, a behavior capable of representing the thrilling sensation, that is, the excitement, felt by the user for the event, and selecting the leader based on the detection results is used. Specifically, in the second example in FIG. 9, the group forming unit 90 of the ring 1-k worn by the user Uk compares the degree of excitement of the user Uk and the degree of excitement of another user within a specific range, and a group having the ring 1 worn by the user whose degree of excitement is the highest as the leader is formed.

In the case group control of the second example in FIG. 9 is to be performed, the sensor information acquisition unit 81, the excitement determination unit 82, the action control unit 83, the communication control unit 84, the position information acquisition unit 85, the storage unit 88, the target identification unit 89, the group forming unit 90, and the group information management unit 91 are to function, among the functional structures of the CPU 31 in FIG. 6.

In the second example in FIG. 9, as a predetermined behavior capable of representing the degree of excitement, waving of the arm of the user Uk wearing the ring 1-k is used. In this case, the sensor information acquisition unit 81 of the ring 1-k detects information indicating a change in the physical quantity caused by the waving movement of the arm (hereinafter referred to as movement information) by the 3-axis accelerometer 33. The excitement determination unit 82 of the ring 1-k perceives the number of times the arm wearing the ring 1-k is waved based on the movement information, and determines that the degree of excitement is higher as the number of times is greater. The group forming unit 90 forms a group gr where a leader is present, by repeatedly comparing the degrees of excitement of other rings 1 received by the communication control unit 84 and the degree of excitement of itself. Additionally, the method of forming the group gr will be described below in detail.

Specifically, as shown in FIG. 9, a group gr including rings 1-1 to 1-N is formed. Then, because a user U4 wearing a ring 1-4 among the rings performed a behavior capable of representing the excitement the most (for example, the arm was waved most enthusiastically), the degree of excitement of the ring 1-4 is the highest, and the ring 1-4 is selected as the leader.

Also, an artist UA wearing a ring 1-A on the arm appoints, as a target, a predetermined group gr at the venue by a predetermined movement. In the second example in FIG. 9, as the predetermined movement, the artist UA waves the arm on which the ring 1-A is worn and points to the predetermined group gr as the target. When the artist UA appoints the predetermined group gr as the target, the target identification unit 89 of the ring 1-A identifies the coordinate values of the group gr which has been made the target. Additionally, details regarding the identification of the coordinate values of a target by the target identification unit 89 will be described below in detail with reference to FIGS. 11 to 13.

Then, appointment information including the coordinate values of the target and the action information are transmitted to the plurality of rings 1 present at the venue by the communication control unit 84 of the ring 1-A. The action control unit 83 of the ring 1 which has received the appointment information reacts only in the case it is the leader of the group gr which has been made the target, and controls light emission and vibration in a pattern defined by the action information.

Specifically, as shown in FIG. 9, when the artist UA wearing the ring 1-A on the arm appoints the group gr as the target, only the ring 1-4, which is the leader, among the rings 1-1 to 1-N, reacts, and emits light and vibrates.

[System Structure Diagram]

Figure 10:
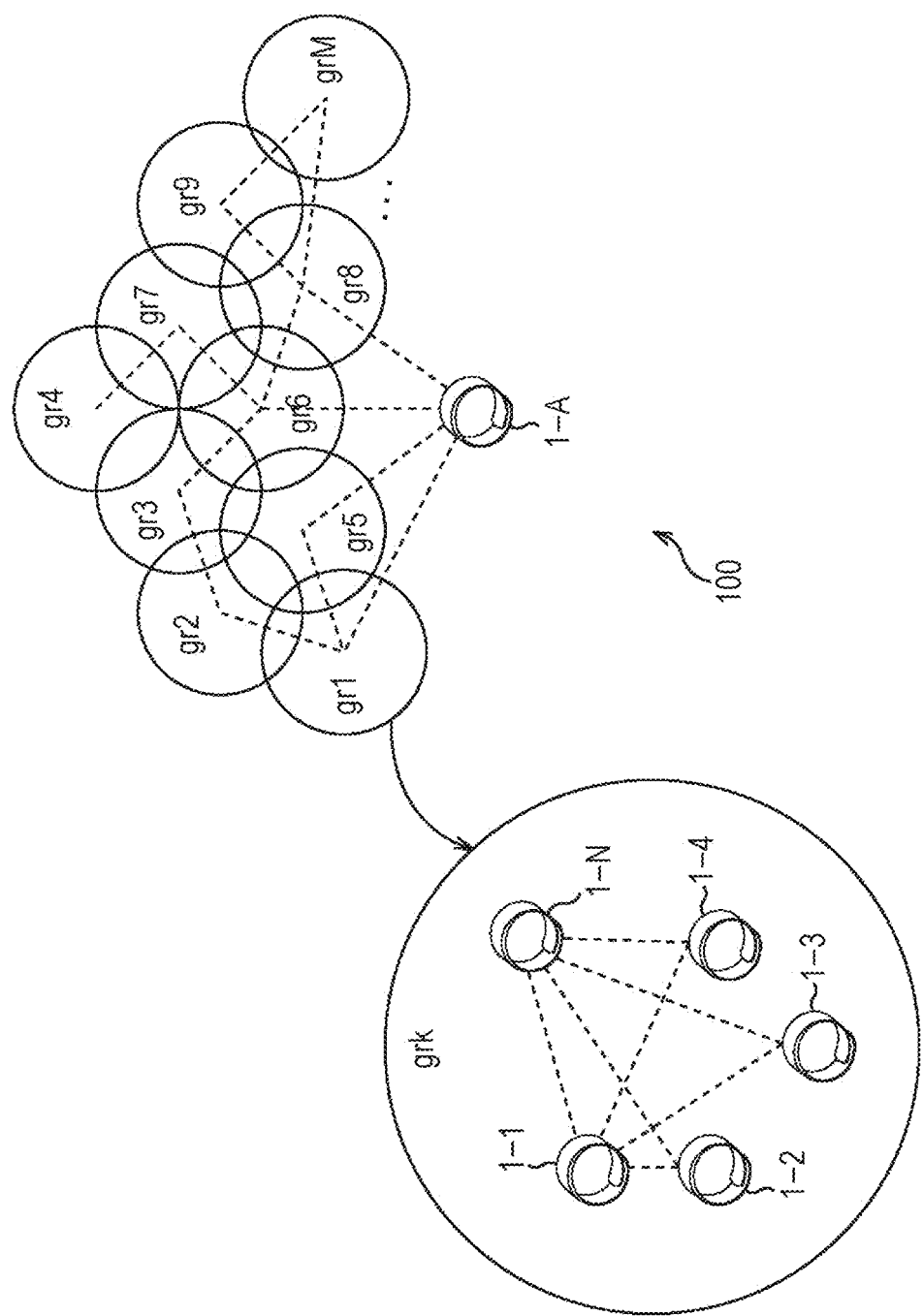
FIG. 10 is a structure diagram of an information processing system according to the second example of group control.

FIG. 10 is a structure diagram of an information processing system according to the second example of group control.

An information processing system 100 is structured from the ring 1-A, and a plurality of rings belonging to each of groups gr1 to grM (M is an integer of one or more). As shown in the bottom left in FIG. 10, a group grk (k is an arbitrary integer between 1 and M) is formed of a plurality of rings 1-1 to 1-N present within a specific range. Additionally, in the following, in the case it is not necessary to distinguish among the groups gr1 to grM, or among the rings 1-1 to 1-N, they are collectively referred to as group(s) gr or ring(s) 1. Also, the ring 1-A does not belong to any group gr.

The ring 1-A and a plurality of rings 1 included in a group gr are interconnected by a multi-hop wireless LAN (Local Area Network) mesh network specified by IEEE 802.11S, for example.

[Relative Positions of Rings]

Figure 11:
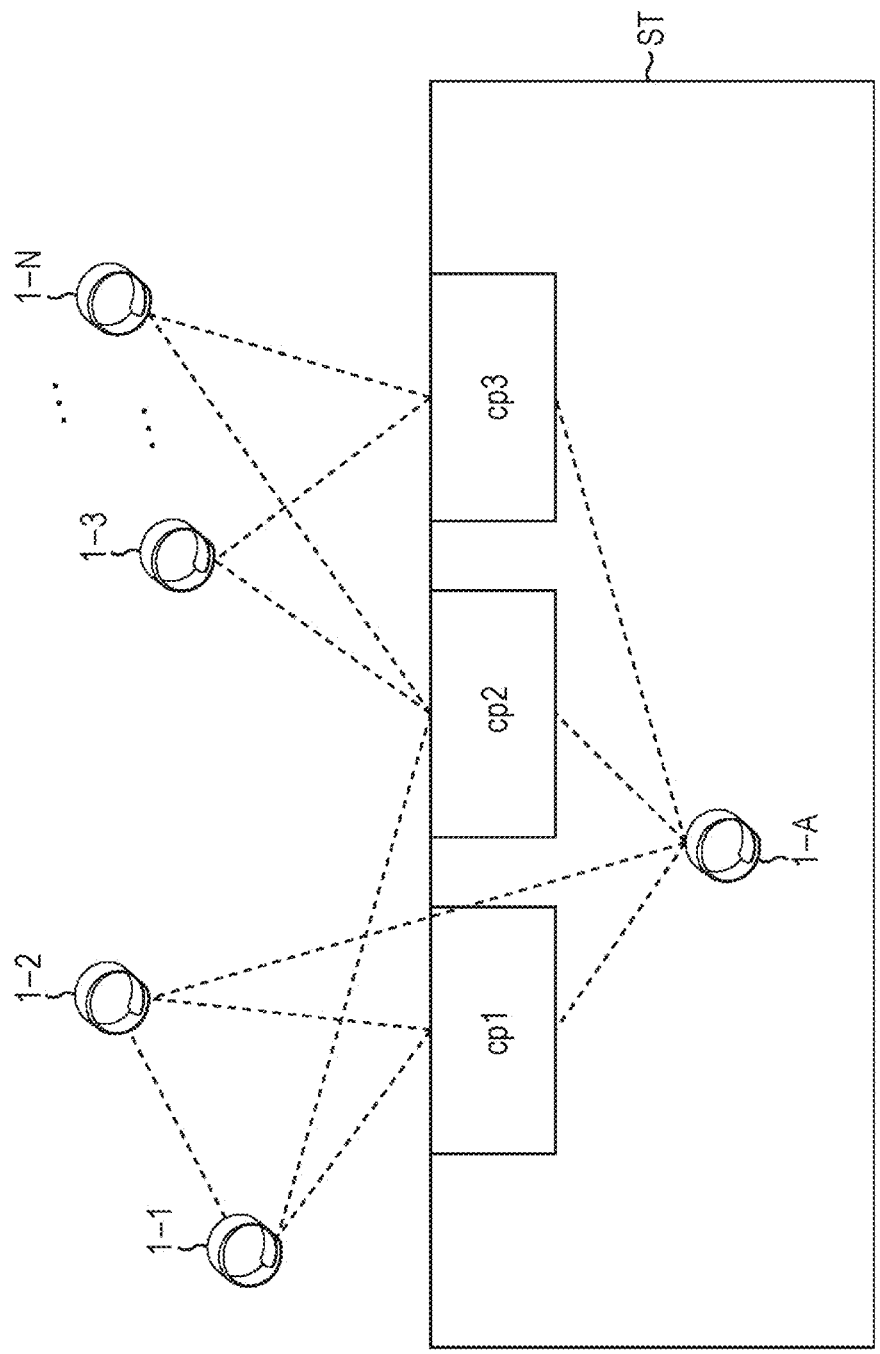
FIG. 11 is a diagram showing a fixed terminal apparatus for calculating relative positions of rings.

The relative positions of the ring 1-A and the plurality of rings 1 included in the group gr are calculated in advance by using a fixed terminal apparatus shown in FIG. 11, for example.

FIG. 11 is a diagram showing a fixed terminal apparatus for calculating the relative positions of the rings 1.

As shown in FIG. 11, fixed terminal apparatuses cp1 to cp3 are arranged, being separated from one another, on a stage ST installed at the venue. Additionally, in the case it is not necessary to distinguish between the fixed terminal apparatuses cp1 to cp3, they are collectively referred to as fixed terminal apparatus(es) cp. The fixed terminal apparatuses cp are fixed at predetermined positions on the stage ST, and their position information is known in advance. Also, the fixed terminal apparatuses cp are connected to the multi-hop wireless LAN mesh network to which the ring 1-A and the plurality of rings 1 are connected.

The position information acquisition unit 85 of the ring 1-A calculates the coordinates of the relative positions of the ring 1-A and the plurality of rings 1 by using pieces of information obtained in wireless communication by the communication control unit 84 with the plurality of rings 1 and the fixed terminal apparatuses cp on the wireless LAN mesh network including the fixed terminal apparatuses cp. That is, the position information acquisition unit 85 calculates the coordinates of the relative positions of the ring 1-A and the plurality of rings 1 by performing trilateration based on the positions of the fixed terminal apparatuses cp based on information about the electric field intensity, the delay time or the like obtained by the wireless communication by the communication control unit 84 with the fixed terminal apparatuses cp. The coordinates of the relative positions of the ring 1-A and the plurality of rings 1 which have been calculated are stored in the storage unit 88 of the ring 1-A.

Similarly, the position information acquisition units 85 of the plurality of rings 1 included in the group gr also calculate the coordinates of the relative positions of the ring 1-A and others of the plurality of rings 1, and store the coordinates in the storage units 88.

Next, details of the method of forming the group gr of the second example will be given.

The group forming unit 90 of the ring 1 forms a group gr formed of a plurality of rings 1 present within a specific range. The group forming unit 90 of the ring 1 stores the coordinate values of the group gr which has been formed in the group information management unit 91 as the coordinate values of itself. The coordinate values of the group gr are defined by the coordinate values of the center position of the group gr (the position of the ring 1 existing at the center, among the plurality of rings 1 in the group gr) and the range of the group gr (the distance from the center position to the farthest ring 1 in the group gr). The method of forming the group gr is not particularly restricted, but the group gr is formed in the following manner, for example.

The group forming unit 90 of the ring 1 stores the coordinate values of itself acquired by the position information acquisition unit 85 by communication using the fixed terminal apparatus cp, in the group information management unit 91 as the initial values of the coordinate values of the group gr.

Also, the group forming unit 90 stores a flag indicating belonging or not belonging to the group gr (hereinafter referred to as a belong flag) in the group information management unit 91. Additionally, the initial value of the belong flag is "do not belong". Furthermore, the group forming unit 90 stores a flag indicating being or not being the leader of the group gr (hereinafter referred to as a leader flag) in the group information management unit 91. Additionally, the initial value of the leader flag is "not leader".

The communication control unit 84 of the ring 1 searches for another ring 1 with which pairing is possible, that is, another ring 1 with which wireless communication may be established. Then, the group forming unit 90 of the ring 1 performs a process of changing the flag and the coordinate values of itself (that is, the coordinate values of the group gr) with the other ring 1 with which pairing is possible.

In the case the belong flag of itself and the belong flag of the other ring 1 match each other, both being "do not belong", the group forming unit 90 of the ring 1 compares the degrees of excitement of the two by using the determination results of the excitement determination units 82. In this case, the degree of excitement is determined to be higher as the number of times the arm wearing the ring 1 is waved is greater.

As a result of comparing the degrees of excitement, the group forming unit 90 of the ring 1 with the higher degree of excitement changes the leader flag of itself to "leader". On the other hand, the group forming unit 90 of the ring 1 with the lower degree of excitement changes the leader flag of itself to "not leader". Furthermore, the group forming unit 90 of the ring 1 with the lower degree of excitement changes the coordinate values of itself to the coordinate values of the group gr, that is, the coordinate values of the ring 1 with the higher degree of excitement. Then, the group forming units 90 of both rings 1 change the belong flag to "belong".

Also, in the case the belong flag of itself and the belong flag of another ring 1 match each other, both being "belong", the group forming unit 90 of the ring 1 compares the coordinate values of the two. In the case the ranges of the groups gr overlap each other, according to the result of comparison of the coordinate values, the degrees of excitement are compared, and the same process as described above is performed. That is, the leader flag of one with the higher degree of excitement is changed to "leader", and the coordinate values of the group gr remain to be the coordinate values of itself. The leader flag of one with the smaller degree is changed to "not leader", and its coordinate values are changed to the coordinate values of the other (that is, the coordinate values of the group gr of the other). On the other hand, in the case the ranges of the groups gr do not overlap each other, according to the result of comparison of the coordinate values of the groups gr, neither of the group forming units 90 of the two rings 1 performs the process.

Also, in the case the belong flags of the ring 1 and another ring 1 are different with one being "belong" and the other being "do not belong", the group forming unit 90 of the ring 1 whose belong flag is "do not belong" changes its coordinate values (that is, the coordinate values of the group gr) to the coordinate values of the other ring 1, and changes the belong flag to "belong".

Such a process is repeated among a plurality of rings 1 present within a specific range, and a group gr where a ring 1 as a leader is present is formed.

[Identification of Target]

The artist UA appoints a predetermined group gr, among a plurality of groups gr formed at the venue in the above manner, as a target. In this case, the target identification unit 89 of the ring 1-A worn on the arm of the artist UA calculates the direction of the group gr which is made the target, and the distance between the ring 1-A and the group gr, and identifies the coordinate values of the group gr which is made the target based on the calculation result.

Figure 12:
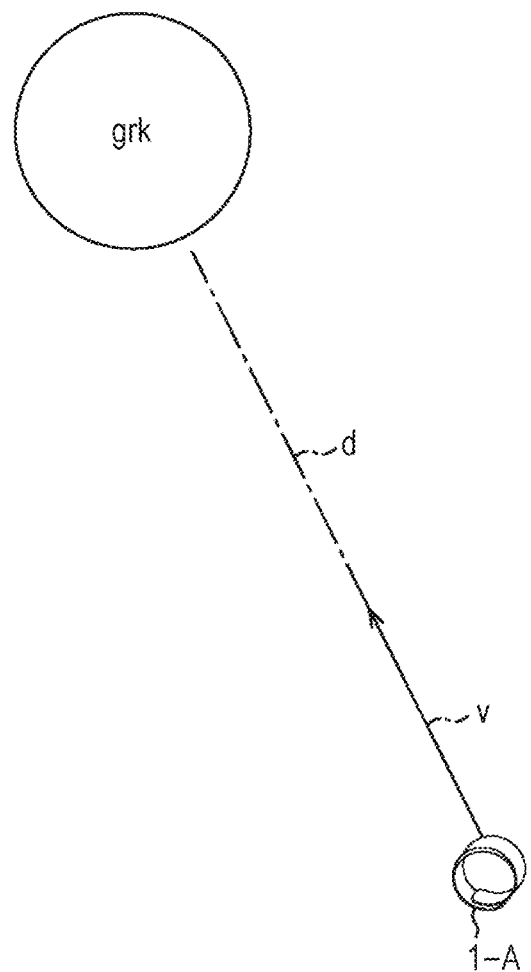
FIG. 12 is a diagram showing identification of a target.

FIG. 12 is a diagram showing identification of a target.

When the artist UA waves the arm on which the ring 1-A is worn, and makes a movement of pointing to a predetermined group grk as a target, the sensor information acquisition unit 81 of the ring 1-A acquires direction information d detected by a geomagnetic sensor, not shown, and movement information v detected by the 3-axis accelerometer 33. That is, the target identification unit 89 of the ring 1-A calculates the direction of the group grk, which is made the target, based on the direction information d acquired by the sensor information acquisition unit 81. Also, the target identification unit 89 of the ring 1-A calculates the distance from the ring 1-A to the group grk, which is made the target, based on the movement information v acquired by the sensor information acquisition unit 81. The distance is longer as the movement information v is greater.

Then, the target identification unit 89 determines the approximate coordinate values of the group grk (hereinafter referred to as target coordinate values) by using the coordinate values of the relative position of the ring 1 stored in the storage unit 88, the direction of the group grk, and the distance to the group grk. Information including the target coordinate values determined in this manner and the action information (hereinafter referred to as appointment information) is transmitted to a plurality of rings 1 present at the venue.

At each of the plurality of rings 1, when the appointment information is received by the communication control unit 84, the group information management unit 91 determines whether the target coordinate values included in the appointment information and the coordinate values of itself (that is, the coordinate values of the group gr) match each other (whether the error is within a predetermined range). With respect to a ring 1 whose coordinate values are determined to have matched and whose leader flag is "leader", among the plurality of rings 1, the action control unit 83 performs the action defined by the action information included in the appointment information which has been received. On the other hand, with respect to a ring 1 whose coordinate values are determined to not match, or a ring 1 whose leader flag is "not leader", among the plurality of rings 1, the communication control unit 84 transfers the appointment information which has been received to another ring 1.

[Process of Information Processing System 100]

Figure 13:
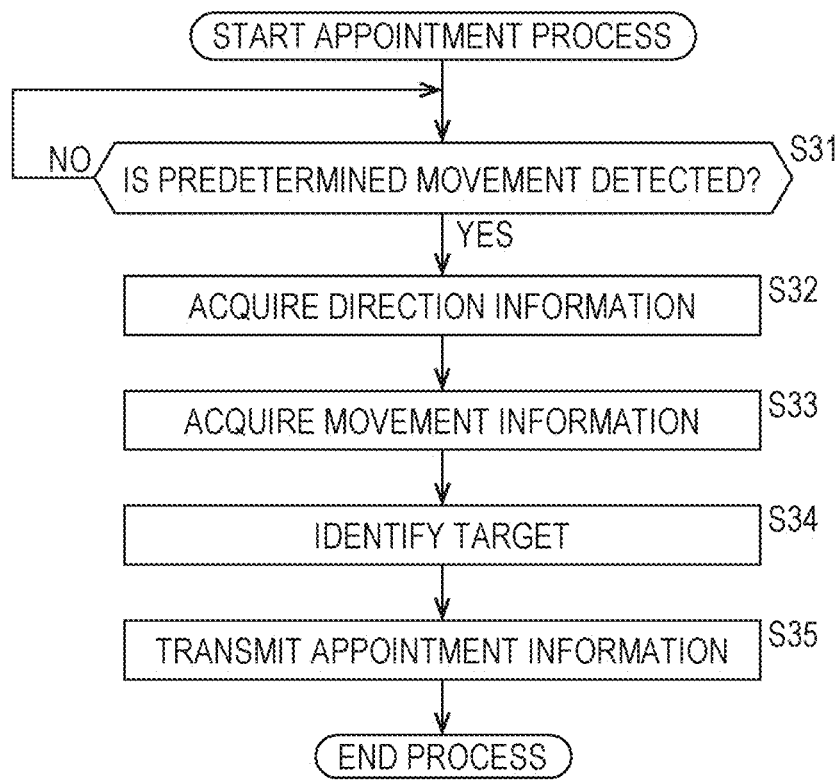
FIG. 13 is a flowchart for describing a flow of an appointment process.
Figure 14:
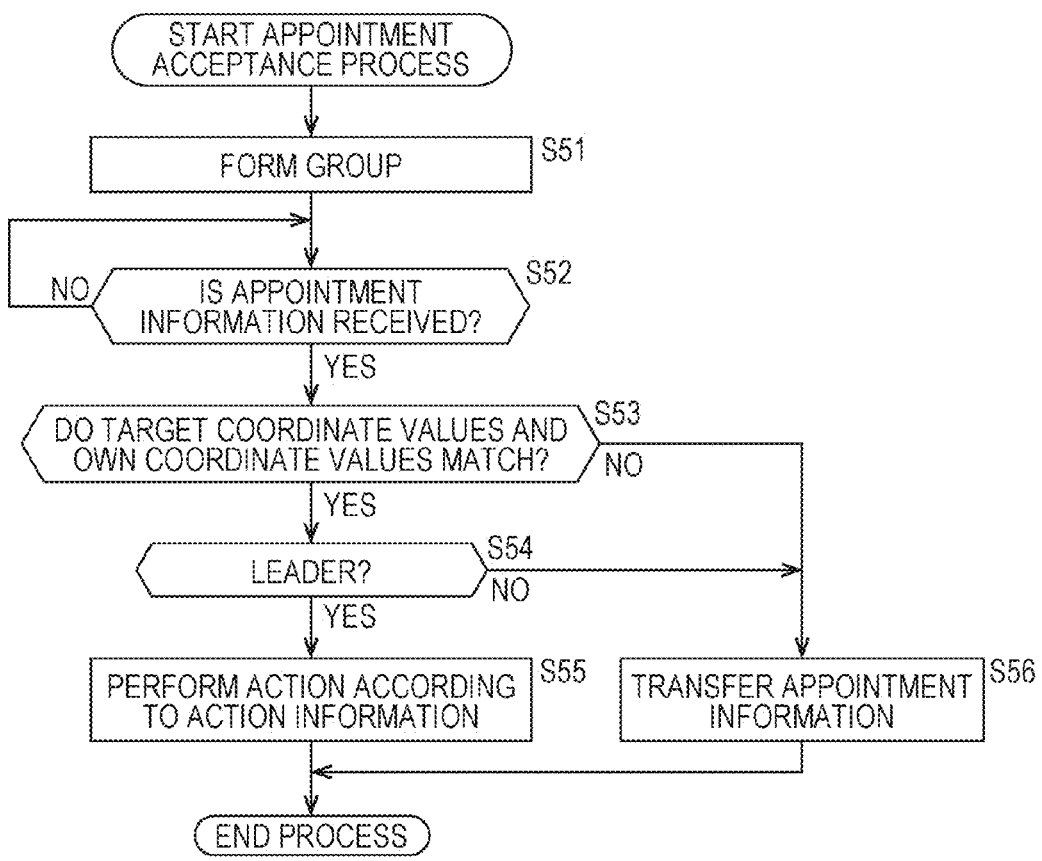
FIG. 14 is a flowchart for describing a flow of an appointment acceptance process.

Next, a flow of a process of the information processing system 100 structured in the above manner will be described with reference to FIGS. 13 and 14. FIG. 13 is a diagram for describing a flow of a process of appointing a target (hereinafter referred to as an appointment process), among processes to be performed by the ring 1-A worn on the arm of the artist UA. FIG. 14 is a diagram for describing a flow of accepting an appointment by the ring 1-A (hereinafter referred to as an appointment acceptance process), among processes to be performed by the ring 1 of an audience.

[Appointment Process]

FIG. 13 is a flowchart for describing a flow of an appointment process to be performed by the ring 1-A.

In step S31 in FIG. 13, the sensor information acquisition unit 81 determines whether a predetermined movement is detected. That is, the sensor information acquisition unit 81 determines whether the arm wearing the ring 1-A is waved, and movement information that occurs according to a movement of pointing to a predetermined group gr is detected by the 3-axis accelerometer 33 sensor.

In the case a predetermined movement is not detected, NO is determined in step S31, the process is returned to step S31, and the determination process of step S31 is repeated until a predetermined movement is detected.

Then, when a predetermined movement is detected, YES is determined in step S31, and the process proceeds to step S32.

In step S32, the sensor information acquisition unit 81 acquires the direction information d detected by a geomagnetic sensor, not shown. The direction of a group gr as the target is thereby determined.

In step S33, the sensor information acquisition unit 81 acquires the movement information v detected by the 3-axis accelerometer 33. The distance from the ring 1-A to the group gr as the target is thereby determined.

In step S34, the target identification unit 89 identifies the predetermined group gr which has been made the target. That is, the target identification unit 89 identifies the target coordinate values of the predetermined group gr which has been made the target, based on the direction information d and the movement information v acquired in steps S32 and S33, and the coordinates of the relative positions of a plurality of rings 1 calculated in advance using the fixed terminal apparatuses cp.

In step S35, the communication control unit 84 transmits the appointment information to the plurality of rings 1 at the venue. Additionally, as described above, the appointment information includes the target coordinate values and the action information. The appointment process is thereby ended.

[Appointment Acceptance Process]

FIG. 14 is a flowchart for describing a flow of an appointment acceptance process to be performed by the ring 1.

In step S51, the group forming unit 90 forms a group gr in which one ring 1 as a leader exists, by the method of forming a group gr described above.

In step S52, the communication control unit 84 determines whether the appointment information is received from the ring 1-A.

In the case the appointment information is not received, NO is determined in step S52, the process is returned to step S52, and the determination process of step S52 is repeated until the appointment information is received.

Then, when the appointment information is received, YES is determined in step S52, and the process proceeds to step S53.

In step S53, the group information management unit 91 determines whether the target coordinate values included in the appointment information match the coordinate values of itself. That is, the group information management unit 91 determines whether the target coordinate values and the coordinate values of itself stored at the time the group gr was formed in the process of step S51 (that is, the coordinate values of the group gr) match each other. Specifically, if the difference between the target coordinate values and the coordinate values of the ring 1 (that is, the coordinate values of the group gr) is within a predetermined range, match is determined.

In the case the target coordinate values and the coordinate values of itself match each other, YES is determined in step S53, and the process proceeds to step S54. On the other hand, in the case the target coordinate values and the coordinate values of itself do not match each other, NO is determined in step S53, and the process proceeds to step S56. Additionally, processes of step S56 and later will be described below.

In step S54, the group information management unit 91 determines whether it is the leader. That is, the group information management unit 91 determines whether the leader flag is "leader".

In the case of being the leader, YES is determined in step S54, and the process proceeds to step S55. On the other hand, in the case of not being the leader, that is, in the case the leader flag is "not leader", NO is determined in step S54, and the process proceeds to step S56. Additionally, processes of step S56 and later will be described below.

In step S55, the action control unit 83 performs an action according to the action information. That is, the action control unit 83 controls the actions of the LED 34 and the vibration mechanism 35 in such a way that the ring 1 emits light and vibrates according to a predetermined pattern defined by the action information included in the appointment information received in the process of step S52.

On the other hand, in the case NO is determined in step S53 or step S54, the process proceeds to step S56.

In step S56, the communication control unit 84 transfers the appointment information received from the ring 1-A in the process of step S52 to other rings 1. The appointment information is thereby reliably transmitted to all the rings 1. Then, the appointment acceptance process is ended.

As described above, for a ring 1 of a user to accept an appointment by the artist UA and to emit light and vibrate, the ring 1 has to be the leader of the group gr. Accordingly, the user actively attempts to perform a behavior whose degree of excitement is high (for example, the arm is waved many times) to make his/her ring 1 the leader. This results in a competition among the users, making the event more exciting. Moreover, with the artist UA on the stage ST appointing a predetermined user in the audience, a sense of unity between the artist UA and the users is established.

Additionally, the shape of the ring 1-A to be worn by the artist UA may be a ring shape, as described above, or it may be a stick shape. In the case the ring 1-A is stick-shaped, it is held by the hand of the artist UA.

In the second example described above, control is performed according to which, when a predetermined group gr is appointed as a target by the artist UA, only the ring 1 which is the leader of the group gr reacts to emit light and vibrate. However, group control of the second example is also allowed according to which the patterns of light emission and vibration of a plurality of rings 1 are switched to patterns according to which the rings 1 emit light and vibrate when there is an instruction from another ring 1 which has already emitted light and vibrated, and then, instruct still other rings 1 to emit light and vibrate. This can realize a so-called wave where light emission and vibration of a plurality of rings 1 are sequentially transferred.

Specifically, the operation of the ring 1-A of the artist UA is basically the same as that described above, but the position information is not used. Also, the operation of the plurality of rings 1 on the audience side is basically the same as that described above, but because of the properties of a wave, there are no concepts of a group gr and a leader.

Here, it is assumed that the scale of the wave, that is, the number of rings 1 that sequentially emit light and vibrate during transfer of light emission and vibration (hereinafter referred to as the number of pops), changes according to the waving of the arm of the artist UA. That is, in the case the artist UA wants a wave of a large scale, the artist UA is to wave the arm greatly. Accordingly, the number of pops is to be determined based on the movement information occurring according to the waving of the arm acquired by the ring 1-A of the artist UA. Also, the direction of the wave of the rings 1 is calculated based on the direction information d acquired by the sensor information acquisition unit 81 of the ring 1-A.

Also, to allow the artist UA to repeatedly cause the wave several times, a unique ID is added to the instruction for each wave by the artist UA (that is, the instruction for light emission and vibration of the rings 1 on the audience side) to distinguish between the instructions for respective times. That is, this ID is to be incremented and added to each wave (that is, each light emission of the ring 1).

Specifically, a wave is performed in the following manner.

First, the ring 1-A of the artist UA transmits to a plurality of rings 1 on the audience side with which communication is possible an instruction including a unique ID and the number of hops.

A ring 1 on the audience side which has received this instruction emits light and vibrates in a predetermined pattern, reduces the number of hops, and transmits, to another ring 1 on the audience side, the instruction including the unique ID and the number of pops.

After receiving this instruction, if the ID is new (for example, if the ID is greater than the ID last received), the other ring 1 emits light and vibrates in a predetermined pattern, reduces the number of hops, and transmits the instruction including the unique ID and the number of pops to still another ring 1 on the audience side.

A wave is realized by the light emission and vibration of the rings 1 being sequentially transferred in this manner until the number of pops becomes zero.

Additionally, the instruction including a unique ID and the number of pops from another ring 1 is sometimes received by a ring 1 which has already emitted light and vibrated. In this case, the received ID is determined to be not new, and the ring 1 which has already emitted light and vibrated does not emit light and vibrate again. The wave is thereby prevented from being disturbed.

[Third Example of Group Control]

Next, a third example of group control using the ring 1 to which the present technique is applied will be described with reference to FIGS. 15 to 21.

Figure 15:
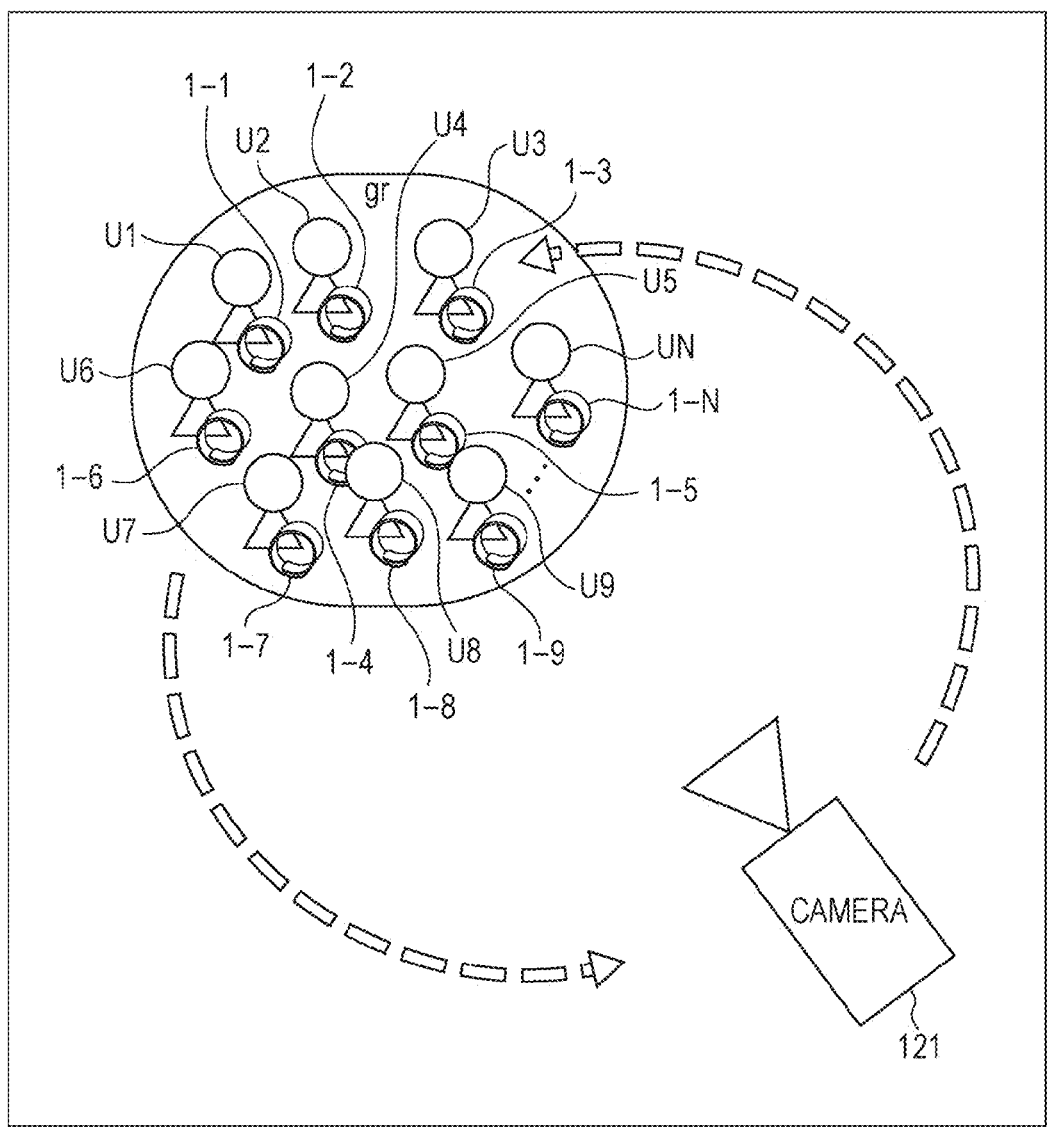
FIG. 15 is a diagram for describing a third example of group control.

FIG. 15 is a diagram for describing the third example of group control.

As the third example of group control in FIG. 15, first, the degree of excitement, at an outdoor venue where a predetermined event is being held, for example, is determined based on a predetermined behavior of a plurality of users wearing the ring 1 on the arm. Here, the predetermined behavior with respect to which the degree of excitement is determined is not particularly restricted, but in the present embodiment, this is a behavior of a plurality of users, present within a specific range, wearing the same type of ring 1 on the arm making a synchronized movement. Additionally, in the third example, it is assumed that a group gr is formed by the plurality of rings 1 present within a specific range.

Next, a request for start of image capturing is transmitted from the ring 1 of a user, in the group gr, determined to be excited, to a camera at the venue or a control device or the like of the camera. Then, image capturing taking the user and the surroundings of the user as the image capturing target is started by the camera, and information indicating the start of image capturing (hereinafter referred to as image capturing start information) is transmitted from the camera or the control device or the like of the camera. Then, a ring 1 which has received the image capturing start information emits light and vibrates.

In the case group control of the third example in FIG. 15 is to be performed, the sensor information acquisition unit 81, the excitement determination unit 82, the action control unit 83, the communication control unit 84, the position information acquisition unit 85, and the storage unit 88 are to function, among the functional structures of the CPU 31 in FIG. 6.

The communication control unit 84 of the ring 1 receives, by the wireless module 32, movement information detected by the sensor information acquisition unit 81 of each of one or more other rings 1 present within a specific range. The excitement determination unit 82 of the ring 1 generates, based on the movement information of each of the one or more rings 1 which has been received, information indicating the degree of relatedness or the degree of difference regarding the synchronicity of movements between a plurality of users (hereinafter referred to as relatedness information).

The degree of relatedness or the degree of difference regarding the synchronicity of movements is the degree of relatedness or the degree of difference in the movements of the bodies or a part of the bodies of a plurality of users. That is, the degree of relatedness regarding the synchronicity of movements is higher (that is, the degree of difference regarding the synchronicity of movements is lower) as the motions of the bodies or a part of the bodies of a plurality of users are more matched. Thus, the relatedness information is information indicating matching or non-matching of the movement of each user. As a synchronized movement, there is a dance by a plurality of users with the same rhythm, tempo, and pattern, for example.

Next, the excitement determination unit 82 of the ring 1 determines, based on the generated relatedness information of a plurality of users present within a specific range, that the degree of excitement is higher as the degree of relatedness regarding the motion of a plurality of users is higher. Additionally, the calculation method of the relatedness information is not particularly restricted, but in the present embodiment, the calculation method described in JP 2011-87794 A is adopted.

Specifically, as shown in FIG. 15, a user U1 wearing a ring 1-1 is assumed to have made a synchronized movement with a plurality of other users present within a specific range. In this case, the excitement determination unit 82 of the ring 1-1 worn by the user U1 generates relatedness information based on pieces of movement information from the other rings 1 within the specific range, perceives the degree of relatedness among the motions of the plurality of users based on the relatedness information, and determines the degree of excitement based on the perceived result. In the case high excitement is determined, the communication control unit 84 of the ring 1-1 transmits a request for start of image capturing to a CCU (Camera Control Unit) controlling a camera 121. Additionally, the request for start of image capturing includes the position information of the ring 1-1 acquired in advance by the position information acquisition unit 85 of the ring 1-1 by an arbitrary method.

The CCU which has received the request for start of image capturing transmits, to the camera 121, an instruction regarding change of an image capturing target and start of image capturing. The camera 121 which has received the instruction from the CCU changes the image capturing target to the ring 1-1 present at the position identified by the position information included in the request for start of image capturing (which is the user U1 wearing the ring 1-1 on the arm and the surrounding users), and starts image capturing. The camera 121 may thereby capture the excited user U1 and his/her surroundings. Then, the CCU transmits, to the ring 1-1, image capturing start information indicating that image capturing is started by the camera 121 with the ring 1-1 as the image capturing target. The action control unit 83 of the ring 1-1 which has received the image capturing start information starts light emission and vibration in a predetermined pattern. The user U1 may thus know that he/she (that is, the ring 1-1) is made the image capturing target of the camera 121.

[System Structure Diagram]

Figure 16:
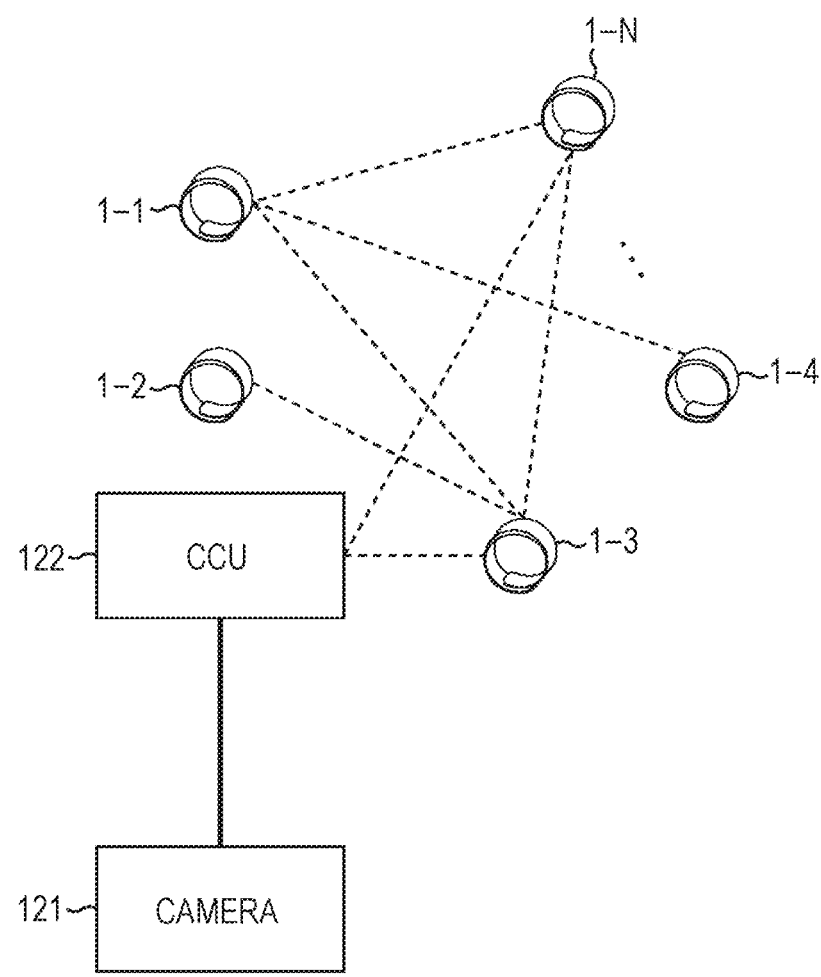
FIG. 16 is a structure diagram of an information processing system according to the third example of group control.

FIG. 16 is a structure diagram of an information processing system according to the third example of group control.

An information processing system 110 is structured from rings 1-1 to 1-N, a camera 121, and a CCU 122.

The plurality of rings 1 and the CCU 122 are interconnected by a multi-hop wireless LAN mesh network, for example. The communication method of the camera 121 and the CCU 122 is not particularly restricted, and it may be wired or wireless.

The camera 121 captures the inside of a venue where a plurality of users each wearing a ring 1 belonging to a group are present. The camera 121 performs, under the control of the CCU 122, image capturing of an image capturing target, change of an image capturing target, and start and end of image capturing. Details of the camera 121 will be given below with reference to FIG. 17.

The CCU 122 controls the camera 121 according to a request from a ring 1. Also, the CCU 122 receives the image capturing start information with respect to a ring 1.

[Example Functional Structure of Camera 121]

Figure 17:
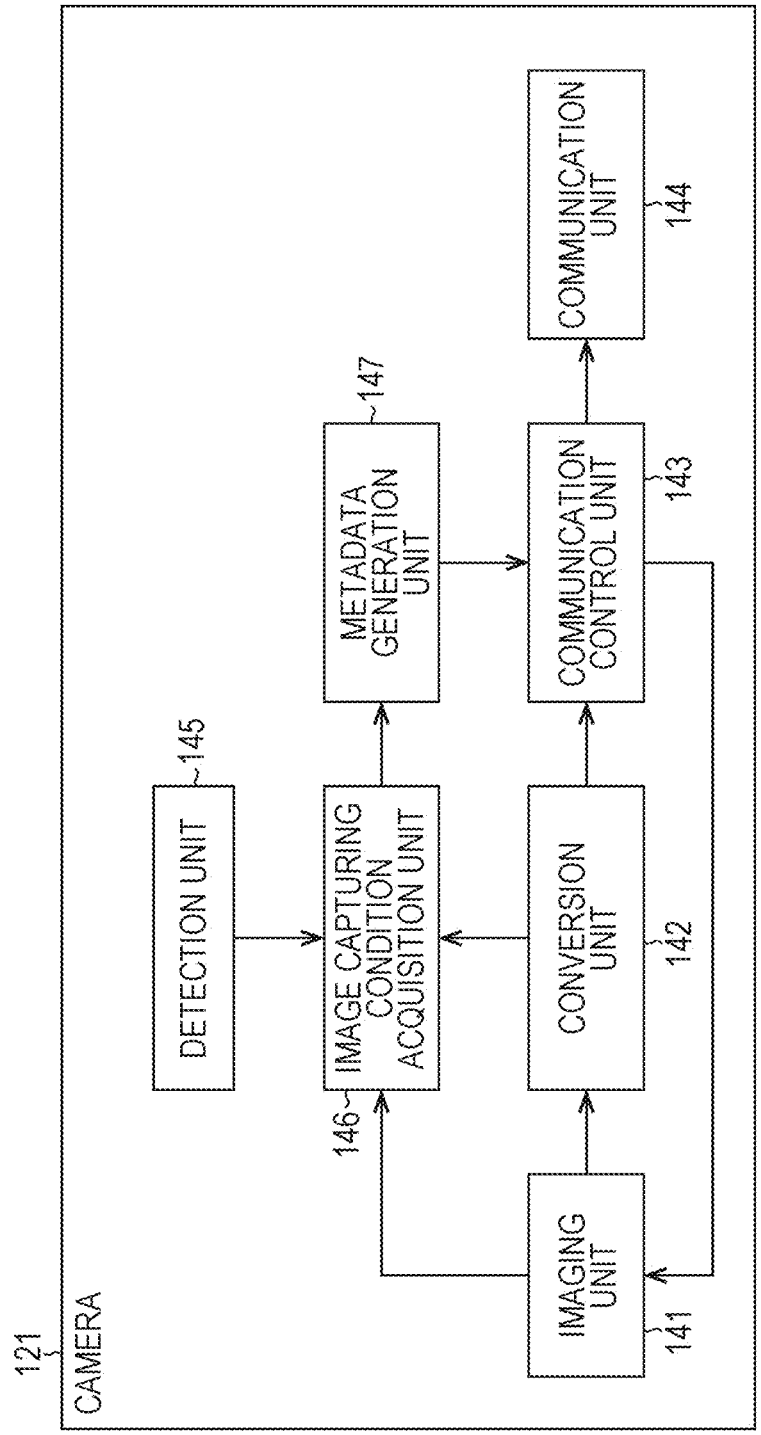
FIG. 17 is a functional block diagram showing a functional structure of a camera.

FIG. 17 is a functional block diagram showing a functional structure of the camera 121.

Functionally, the camera 121 includes an imaging unit 141, a conversion unit 142, a communication control unit 143, a communication unit 144, a detection unit 145, an image capturing condition acquisition unit 146, and a metadata generation unit 147.

In the case group control of the third example in FIG. 15 is to be performed, the imaging unit 141, the conversion unit 142, the communication control unit 143, and the communication unit 144 are to function, among the functional structures in FIG. 17. Other functional structures will be described below with reference to FIGS. 22 to 35, together with a fourth example of group control using the ring 1 to which the present technique is applied.

The imaging unit 141 includes, in addition to an optical system such as a lens and an imaging device, a mechanism for changing the direction of the optical axis (image capturing direction), and when an instruction regarding start of image capturing is issued by the communication control unit 143 described below, the imaging unit 141 changes the direction of the optical axis such that the image capturing target is positioned at the center of the angle of view, for example, and then, starts image capturing. Also, when an instruction regarding change of the image capturing target is issued by the communication control unit 143, the imaging unit 141 changes the direction of the optical axis to the direction where the image capturing target of the instruction is present. The imaging unit 141 supplies the image captured data obtained as a result of image capturing to the conversion unit 142. Moreover, where an instruction regarding stop of image capturing is issued by the communication control unit 143, the imaging unit 141 stops the image capturing of the image capturing target.

The conversion unit 142 converts the image captured data supplied by the imaging unit 141 into a format suitable for communication, and supplies the data to the communication control unit 143.

After controlling the communication unit 144 and receiving an instruction from the CCU 122 regarding change of the image capturing target, the communication control unit 143 instructs the imaging unit 141 to change the image capturing target. Also, after controlling the communication unit 144 and receiving an instruction from the CCU 122 regarding start or end of image capturing, the communication control unit 143 instructs the imaging unit 141 to start or end the image capturing. Furthermore, the communication control unit 143 performs control of transmitting, from the communication unit 144, the image captured data provided by the conversion unit 142 to another information processing apparatus.

[Process of Information Processing System 110]

Figure 18:
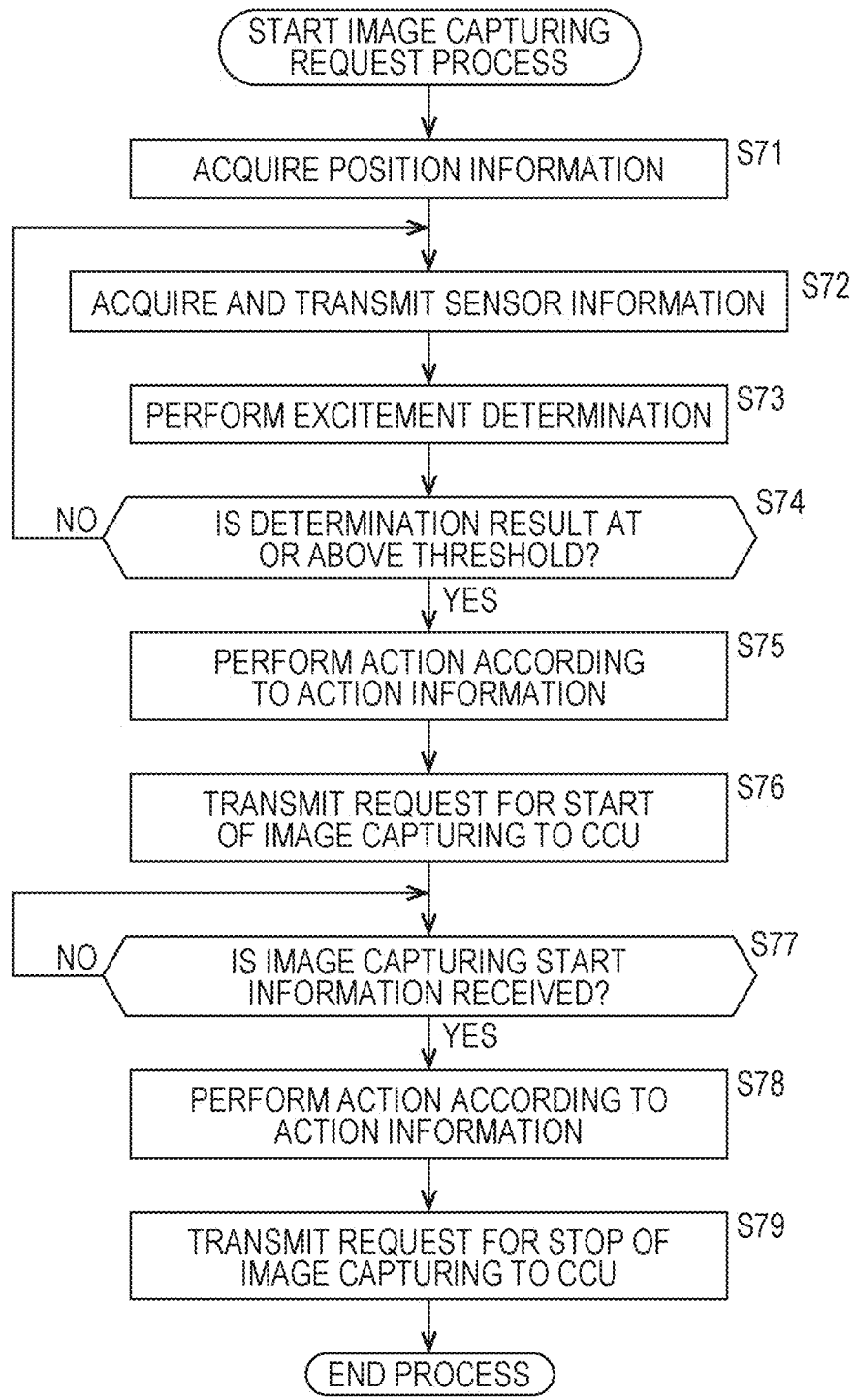
FIG. 18 is a flowchart for describing a flow of an image capturing request process.
Figure 19:
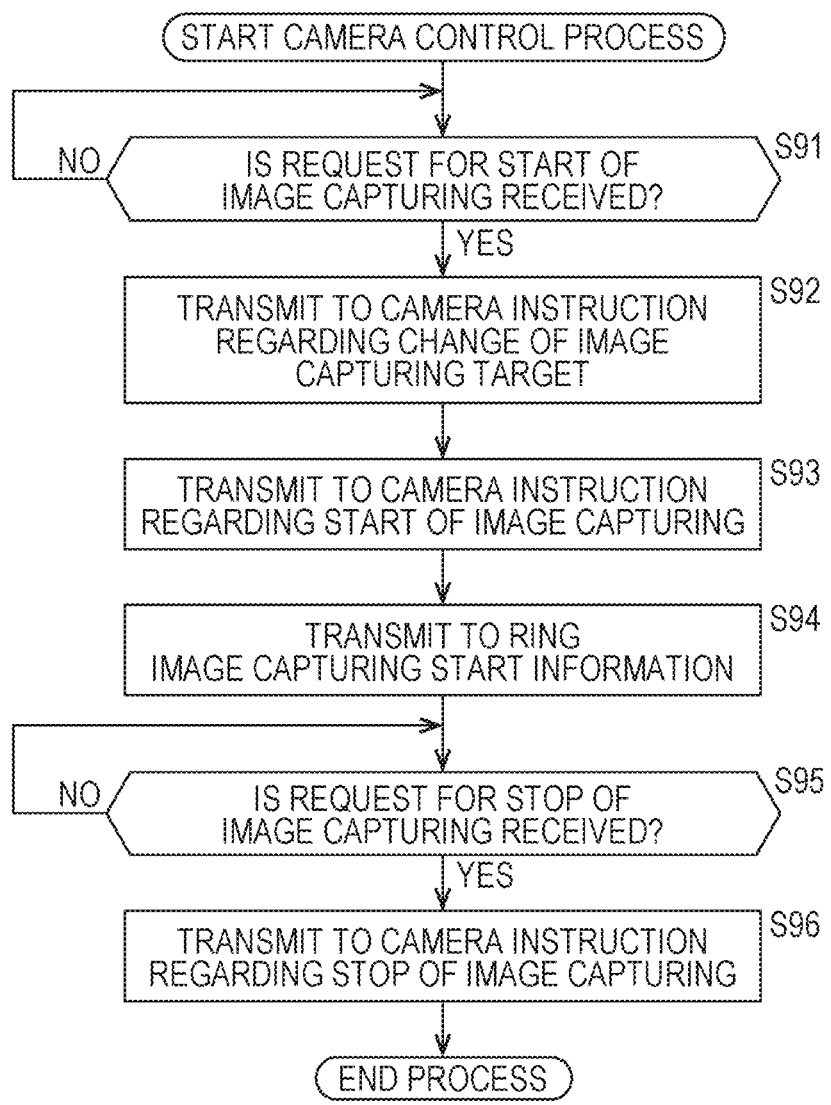
FIG. 19 is a flowchart for describing a flow of a camera control process.
Figure 20:
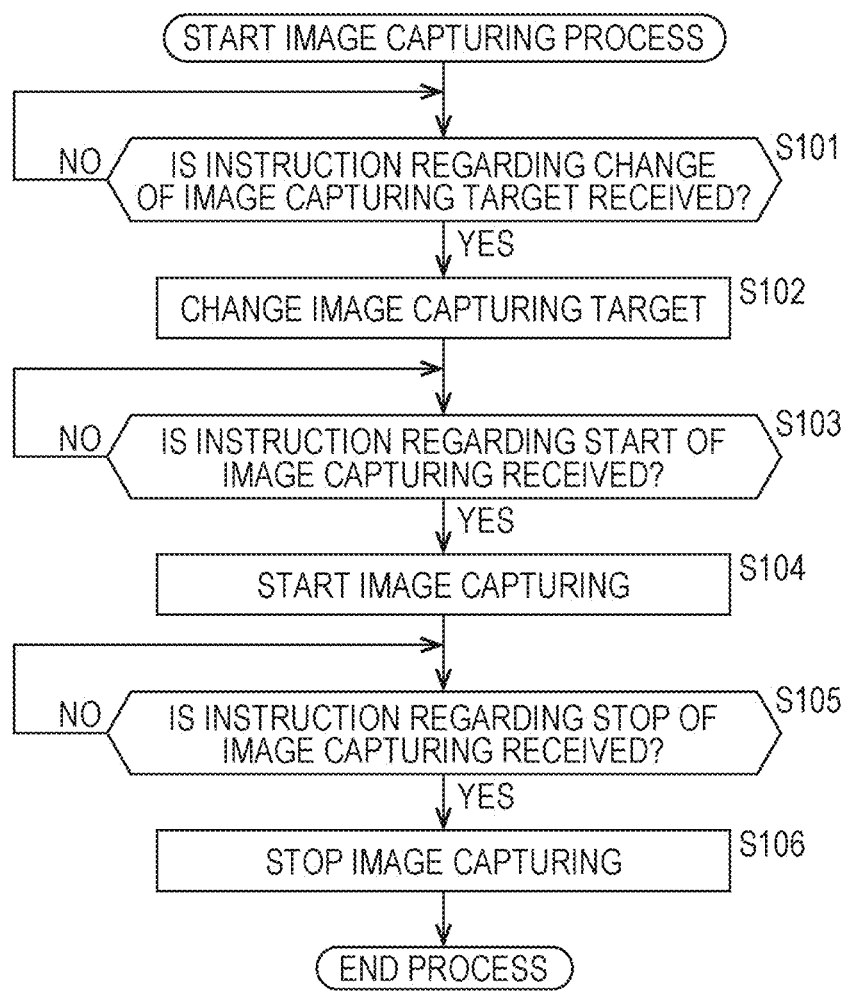
FIG. 20 is a flowchart for describing a flow of an image capturing process.

Next, a flow of the process of the information processing system 110 will be described with reference to FIGS. 18 to 21. FIG. 18 is a diagram for describing a flow of a process, of the processes to be performed by the ring 1, of transmitting an image capturing request so as to be the image capturing target of the camera 121 (hereinafter referred to as an image capturing request process). FIG. 19 is a diagram for describing a flow of a process, of the processes to be performed by the CCU 122, of controlling the camera 121 (hereinafter referred to as a camera control process). FIG. 20 is a diagram for describing a flow of a process, of the processes to be performed by the camera 121, of capturing an image capturing target (hereinafter referred to as an image capturing process).

Figure 21:
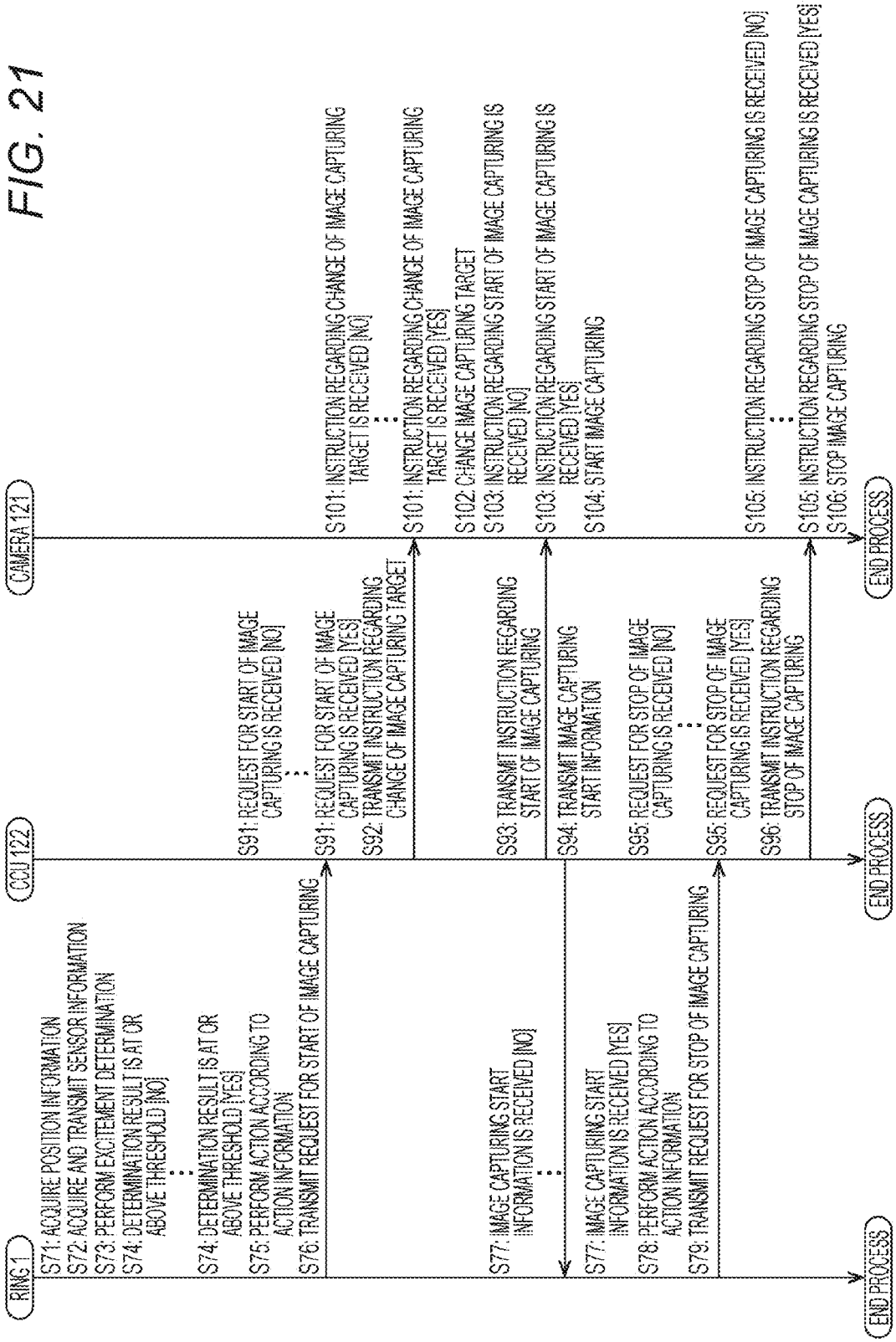
FIG. 21 is a diagram for describing a relationship among processes of the ring, the camera, and a CCU.

Also, FIG. 21 is a diagram for describing a relationship among processes of the ring 1, the camera 121, and the CCU 122 of the information processing system 110. The relationship, in FIG. 21, among processes of the ring 1, the camera 121, and the CCU 122 may be easily grasped by referring to the corresponding steps in FIGS. 18 to 20. In FIG. 21, a flowchart for describing an example of the image capturing request process of the ring 1 (corresponding to FIG. 18) is shown on the left-hand side, a flowchart for describing an example of the camera control process of the CCU 122 (corresponding to FIG. 19) is shown in the middle, and a flowchart for describing an example of the image capturing process of the camera 121 (corresponding to FIG. 20) is shown on the right-hand side.

In step S71 in FIG. 18, the position information acquisition unit 85 of the ring 1 acquires the current position information of itself. The method of acquiring the position information is not particularly restricted, and the current position information of the ring 1 is acquired by using a GPS, for example. The position information which is acquired is stored in the storage unit 88.

In step S72, the communication control unit 84 of the ring 1 acquires sensor information, and transmits the same. That is, the communication control unit 84 receives, by the wireless module 32, and acquires movement information detected by the sensor information acquisition unit 81 of each of one or more other rings 1 present within a specific range. Then, the communication control unit 84 transmits the movement information acquired by its sensor information acquisition unit 81 to the one or more other rings 1 present within the specific range.

In step S73, the excitement determination unit 82 of the ring 1 performs excitement determination. That is, the excitement determination unit 82 generates, based on the pieces of movement information of itself and the one or more other rings 1 acquired in the process in step S72, relatedness information indicating the degree of relatedness regarding the synchronicity of movements between the plurality of users present within the specific range. Then, the excitement determination unit 82 determines the degree of excitement based on the relatedness information.

In step S74, the excitement determination unit 82 of the ring 1 determines whether the determination result is at or above a threshold. That is, the excitement determination unit 82 determines whether the degree of excitement which is the result of the excitement determination is at or above a threshold that is set in advance.

In the case the determination result is not at or above the threshold, NO is determined in step S74, the process is returned to step S72, and the loop process from step S72 to S74 is repeated until the determination result is at or above the threshold.

Then, when the determination result is at or above the threshold, YES is determined in step S74, and the process proceeds to step S75.

In step S75, the action control unit 83 performs an action according to the action information stored in advance in the storage unit 88. That is, the action control unit 83 controls the actions of the LED 34 and the vibration mechanism 35 in such a way that the ring 1 emits light and vibrates in a predetermined pattern defined by the action information stored in the storage unit 88.

In step S76, the communication control unit 84 transmits a request for start of image capturing to the CCU 122. The request for start of image capturing includes the position information of the ring 1 acquired by the position information acquisition unit 85 in the process in step S71.

In step S91 in FIG. 19, the CCU 122 determines whether the request for start of image capturing transmitted from the ring 1 in the process in step S76 in FIG. 18 is received.

In the case the request for start of image capturing is not received, NO is determined in step S91, the process is returned to step S91, and the determination process in step S91 is repeated until the request for start of image capturing is received.

Then, when the request for start of image capturing is received, YES is determined in step S91, and the process proceeds to step S92.

In step S92, the CCU 122 transmits, to the camera 121, an instruction regarding change of the image capturing target. That is, the CCU 122 transmits, to the camera 121, an instruction that the image capturing target is to be changed to the ring 1 indicated by the position information included in the request for start of image capturing received in the process in step S91.

In step S101 in FIG. 20, the communication control unit 143 of the camera 121 determines whether the instruction, regarding change of the image capturing target, transmitted from the CCU 122 in the process in step S92 is received.

In the case the instruction regarding change of the image capturing target is not received, NO is determined in step S101, the process is returned to step S101, and the determination process in step S101 is repeated until the instruction regarding change of the image capturing target is received.

Then, when the instruction regarding change of the image capturing target is received, YES is determined in step S101, and the process proceeds to step S102.

In step S102, the imaging unit 141 of the camera 121 changes the image capturing target to the ring 1 indicated by the position information included in the instruction regarding change of the image capturing target.

After the process in step S92 in FIG. 19, the CCU 122 transmits to the camera 121, in step S93, an instruction regarding start of image capturing.

In step S103 in FIG. 20, the communication control unit 143 of the camera 121 determines whether the instruction regarding start of image capturing transmitted from the CCU 122 in the process in step S93 in FIG. 19 is received.

In the case the instruction regarding start of image capturing is not received, NO is determined in step S103, the process is returned to step S103, and the determination process in step S103 is repeated until the instruction regarding start of image capturing is received.

Then, when the instruction regarding start of image capturing is received, YES is determined in step S103, and the process proceeds to step S104.

In step S104, the imaging unit 141 of the camera 121 starts image capturing of the ring 1 which was made the image capturing target in the process in step S102. The camera 121 may thereby capture a user whose degree of excitement is high and his/her surroundings.

After the process in step S93 in FIG. 19, the CCU 122 transmits, in step S94, the image capturing start information to the ring 1.

In step S77 in FIG. 18, the communication control unit 84 of the ring 1 determines whether the image capturing start information transmitted from the CCU 122 in the process in step S94 in FIG. 19 is received.

In the case the image capturing start information is not received, NO is determined in step S77, the process is returned to step S77, and the determination process in step S77 is repeated until the image capturing start information is received.

Then, when the image capturing start information is received, YES is determined in step S77, and the process proceeds to step S78.

In step S78, the action control unit 83 of the ring 1 performs an action according to the action information. The action at this time is set such that the amount of light emission and the intensity of vibration are increased than for the action that is performed in step S75. The user may thereby know the moment of the highest excitement. Also, the user may grasp that he/she is the image capturing target of the camera 121.

In step S79, the communication control unit 84 of the ring 1 transmits to the CCU 122, at a predetermined timing after image capturing has been performed, a request for stop of image capturing. The image capturing request process of the ring 1 is thereby ended.

In step S95 in FIG. 19, the CCU 122 determines whether the request for stop of image capturing transmitted from the ring 1 in the process in step S79 is received.

In the case the request for stop of image capturing is not received, NO is determined in step S95, the process is returned to step S95, and the determination process in step S95 is repeated until the request for stop of image capturing is received.

Then, when the request for stop of image capturing is received, YES is determined in step S95, and the process proceeds to step S96.

In step S96, the CCU 122 transmits to the camera 121 an instruction regarding stop of image capturing. The camera control process of the CCU 122 is thereby ended.

In step S105 in FIG. 20, the communication control unit 143 of the camera 121 determines whether the instruction regarding stop of image capturing transmitted from the CCU 122 in step S96 in FIG. 19 is received.

In the case the instruction regarding stop of image capturing is not received, NO is determined in step S105, the process is returned to step S105, and the determination process in step S106 is repeated until the instruction regarding stop of image capturing is received.

Then, when the instruction regarding stop of image capturing is received, YES is determined in step S105, and the process proceeds to step S106.

In step S106, the camera 121 stop s image capturing taking the ring 1 as the image capturing target. The image capturing process of the camera 121 is thereby ended.

In this manner, the camera 121 may capture the moment when the excitement of the user is the highest. Also, since the camera 121 is capable of taking a user whose degree of excitement is high and the surrounding users as the image capturing target, the excitement at the venue may be conveyed to viewers through the captured image. Furthermore, the user wearing the ring 1 may know that he/she is the image capturing target of the camera 121 by the light emission and vibration of the ring 1, and thus, may make an appropriate facial expression. Moreover, the user wearing the ring 1 may know that he/she is the image capturing target, and thus, may be conscious of the camera 121 and be more excited.

[Fourth Example of Group Control]

Next, a fourth example of group control using the ring 1 to which the present technique is applied will be described with reference to FIGS. 22 to 35.

Figure 22:
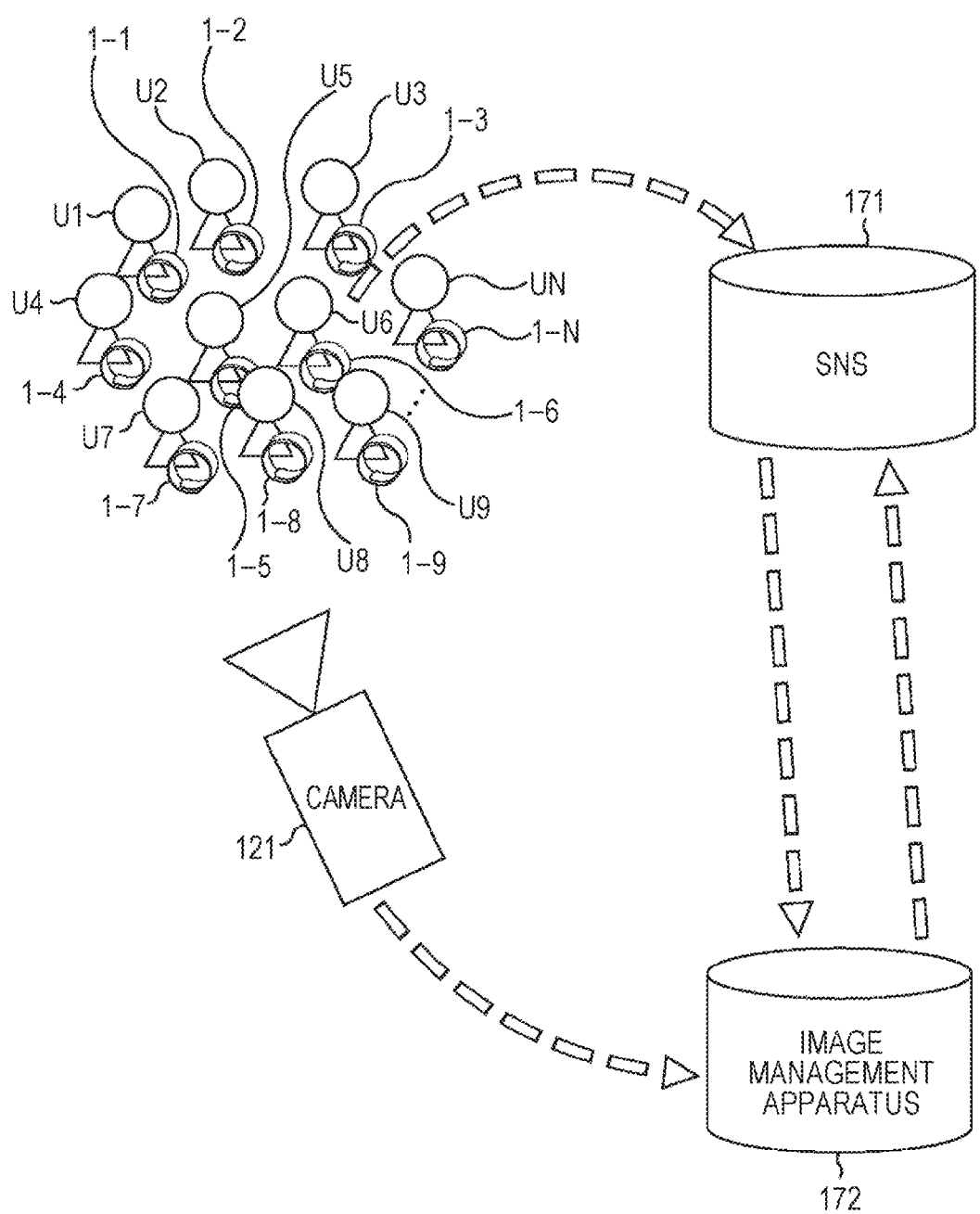
FIG. 22 is a diagram for describing a fourth example of group control.

FIG. 22 is a diagram for describing the fourth example of group control.

The group control of the fourth example in FIG. 22 is roughly divided into control on the side of the ring 1 and control on the side of the camera 121 and an SNS (social network service) 171.

First, as the control on the side of the ring 1, control is performed, at a venue where a predetermined event is being held, for example, of forming one or more groups gr of a plurality of rings 1 worn on the arms of a plurality of users, and determining the degree of excitement for each of the one or more groups gr. The predetermined behavior for which the degree of excitement is determined is not particularly restricted, but in the present embodiment, a behavior of making a synchronized movement by a plurality of users wearing rings 1, of the same type, present in the same group gr is used.

Determination of the degree of excitement of a group gr is repeatedly performed at an appropriate timing during the event for each of a plurality of groups gr, and when the degree of excitement reaches or exceeds a predetermined threshold, the position information of each ring 1 in the group gr, the time information indicating the time of high excitement, and identifiers enabling identification of the rings 1 (hereinafter referred to as ring ID) are transmitted to a server managing the SNS, and storage control is performed at the server of the SNS 171. Additionally, for the sake of simplicity, in the following, the server managing the SNS 171 is referred to simply as the SNS 171.

In the case the control on the side of the ring 1, of the group control of the fourth example in FIG. 22, is to be performed, the sensor information acquisition unit 81, the excitement determination unit 82, the action control unit 83, the communication control unit 84, the position information acquisition unit 85, the time information acquisition unit 86, the storage unit 88, the group forming unit 90, and the group information management unit 91 are to function, among the functional structures of the CPU 31 in FIG. 6.

As shown in FIG. 22, the group forming unit 90 of the ring 1 forms a group gr by a predetermined method. Additionally, the method of forming the group gr will be described below in detail. A user Uk wearing a ring 1-$k$ belonging to a group gr which has been formed is assumed to make a movement that is synchronized with that of other users present in the same group gr. In this case, the excitement determination unit 82 of the ring 1-$k$ determines the degree of excitement in the same manner as in the third example of group control, and determines that the group gr is excited when the determination result is at or above a threshold. When the group gr is determined to be excited, the position information acquisition unit 85 of the ring 1-$k$ acquires the current position information of the ring 1-$k$, and the time information acquisition unit 86 acquires information indicating the time when high excitement was determined (that is, the time of high excitement). The communication control unit 84 of the ring 1-$k$ transmits, to the SNS 171, the position information of the ring 1-$k$, the time information indicating the time of high excitement, and the ring ID of the ring 1-$k$ (hereinafter, these pieces of information are referred to as ring information).

Next, of the group control of the fourth example, the control on the side of the camera 121 and the SNS 171 will be described.

First, during an event, the SNS 171 stores as appropriate ring information every time ring information is transmitted from the ring 1.

The camera 121 captures images of a large number of locations in the venue during the event (including locations where groups gr are present), and transmits image data obtained as a result of image capturing to the image management apparatus 172 after superimposing thereon metadata such as the image capturing location, image capturing time, and the like.

Here, the image data that is transmitted from the camera 121 to the image management apparatus 172 during the event is managed as a plurality of pieces of partitioned data. This partitioning may be performed during image capturing on the side of the camera 121, or may be performed after the image capturing on the side of the image management apparatus 172 or an editing device (not shown). That is, the image data of during an event is configured from a plurality of pieces of partitioned data. A plurality of pieces of partitioned data here not only refer to respective pieces of actual data being separated and stored as separate files, but also to a case where the actual data is stored without being separated, but a plurality of pieces of virtual partitioned data are structured by the data being partitioned in the manner of a playlist, for example.

Since position information of the seating of the venue or the like (image capturing location information described below) is stored in advance, the image management apparatus 172 identifies, based on the metadata of image data transmitted from the camera 121, the image capturing target such as a user (or the ring 1) seated at a predetermined seat of the venue. The image management apparatus 172 stores information about the image capturing target which has been identified and the image data in association for each piece of partitioned data.

After the event is over, if a member or the like belonging to the SNS 171 desires to view an image showing the excited state of the event in which the image capturing target is shown, the member issues an acquisition request to the SNS 171 for the partitioned data using a terminal (not shown) of the member, with the image capturing target and the time of high excitement as the search conditions, for example.

When this acquisition request is received, the SNS 171 transfers this request to the image management apparatus 172. Then, the image management apparatus 172 extracts the partitioned data corresponding to the request, and transmits the data to the SNS 171. The SNS 171 transmits this partitioned data to the terminal which has issued the acquisition request.

[System Structure Diagram]

Figure 23:
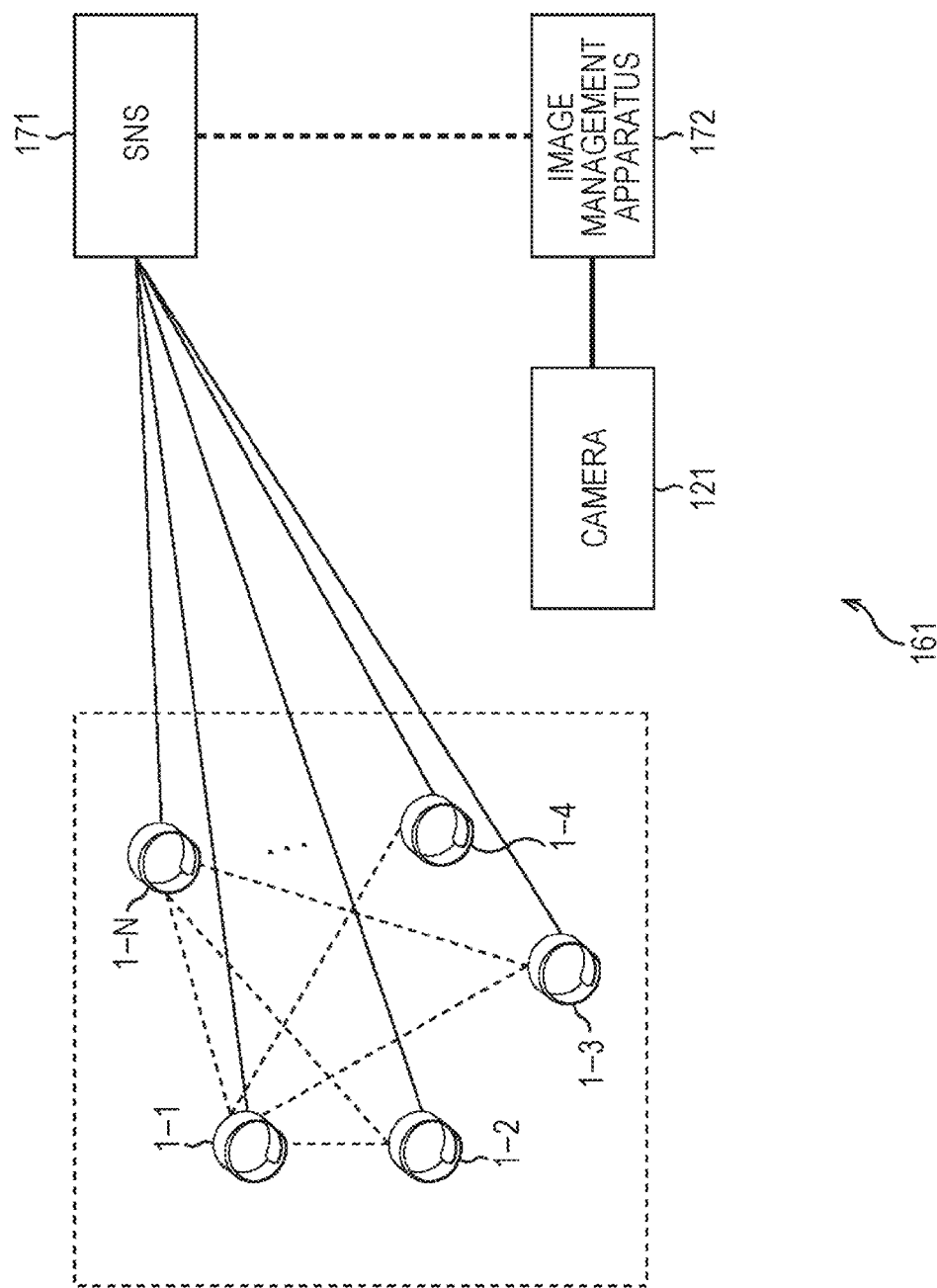
FIG. 23 is a structure diagram of an information processing system according to the fourth example of group control.

FIG. 23 is a structure diagram of an information processing system of the fourth example of group control.

An information processing system 160 is structured from rings 1-1 to 1-N, the SNS 171, the camera 121, and the image management apparatus 172. Additionally, the rings 1-1 to 1-N form a group gr.

The plurality of rings 1 and the SNS 171 are interconnected by a multi-hop wireless LAN mesh network, for example. The communication method of the SNS 171 and the image management apparatus 172 is not particularly restricted, and they may be connected over the Internet, for example. Also, the communication method of the image management apparatus 172 and the camera 121 is not particularly restricted, and it may be wired or wireless.

The SNS 171 manages account information of a user registered in advance. Details of the SNS 171 will be given below with reference to FIG. 24.

The camera 121 captures the inside of a venue. Details of the camera 121 will be given below.

The image management apparatus 172 manages image data obtained as a result of image capturing by the camera 121 on a per partitioned data basis. Details of the image management apparatus 172 will be given below with reference to FIG. 25.

Here, details of the method of forming the group gr of the fourth example will be given.

The group forming unit 90 of the ring 1 stores the ring ID of itself in the group information management unit 91 as an initial value of a group ID of a group gr. Additionally, the group ID is an identifier enabling identification of a group gr. Also, the group forming unit 90 stores a belong flag in the group information management unit 91. Additionally, the initial value of the belong flag is "do not belong".

The group forming unit 90 of the ring 1 searches for another ring 1 with which pairing is possible, and performs a process, as described below, of changing the flag and the group ID with the other ring 1.

The group forming unit 90 of the ring 1 compares, in the case the belong flags of itself and the other ring 1 match each other by both being "do not belong" or "belong", their group IDs. If, as a result of comparison of the group IDs, the group ID of itself is greater, for example, the group forming unit 90 of the ring 1 changes the group ID of itself to the group ID of the other ring 1 (that is, the other ring 1 with a smaller group ID). Moreover, in the case the belong flag is "do not belong", the group forming unit 90 of the ring 1 changes the belong flag to "belong".

Also, in the case the belong flag of itself is "do not belong", but the belong flag of the other ring 1 is "belong", the group forming unit 90 of the ring 1 changes the group ID of itself to the group ID of the other ring 1 (that is, the ring 1 whose belong flag is "belong"), and also, changes the belong flag to "belong". A group gr is formed by such a process being repeated among a plurality of rings 1 present within a specific range.

[Example Functional Structure of SNS 171]

Figure 24:
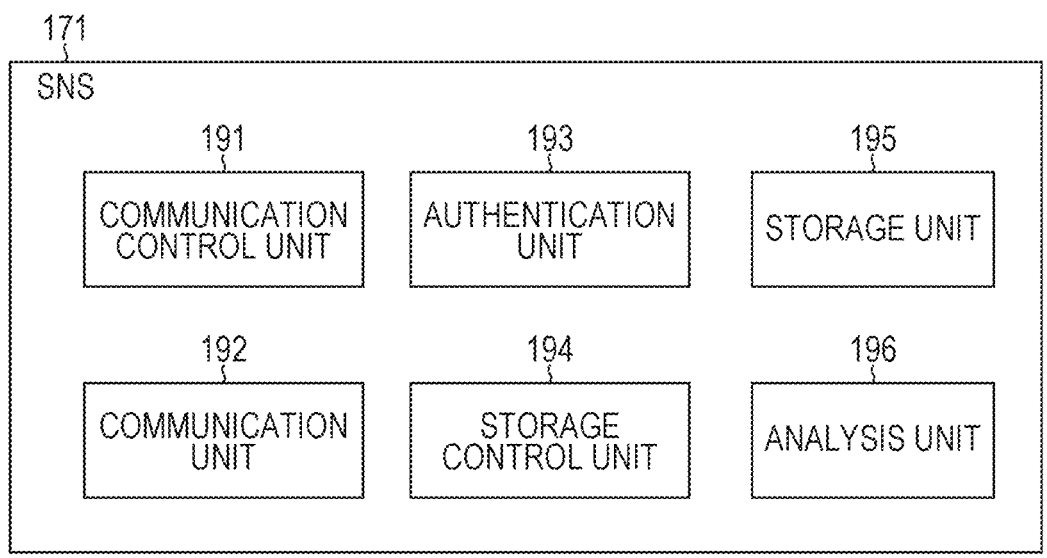
FIG. 24 is a functional block diagram showing an example functional structure of an SNS.

FIG. 24 is a functional block diagram showing an example functional structure of the SNS 171.

The SNS 171 includes a communication control unit 191, a communication unit 192, an authentication unit 193, a storage control unit 194, a storage unit 195, and an analysis unit 196.

The communication control unit 191 controls wireless communication that is performed between the communication unit 192 such as a modem, and the ring 1 and the image management apparatus 172.

The authentication unit 193 performs a predetermined authentication process for authenticating the ring 1, and in the case authentication is successful, wireless communication between the communication unit 192 and the ring 1 is started.

The storage control unit 194 controls storage of various types of information in the storage unit 195.

The analysis unit 196 interprets or analyzes information that is exchanged between the ring 1 and the image management apparatus 172, such as a command such as an acquisition request for image data described below.

[Example Functional Structure of Camera 121]

In the case group control of the fourth example is to be performed, all of the functional structures in FIG. 17 are to function. That is, the imaging unit 141, the conversion unit 142, the communication control unit 143, the communication unit 144, the detection unit 145, the image capturing condition acquisition unit 146, and the metadata generation unit 147 are to function. Additionally, the imaging unit 141, the conversion unit 142, the communication control unit 143, and the communication unit 144 have already been described with reference to FIG. 17, and only the differences will be described.

The detection unit 145 includes a GPS, a real-time clock, a gyro sensor, a distance sensor, and the like, for example, and detects an image capturing condition at the time of capturing of an image capturing target by the imaging unit 141.

The image capturing condition acquisition unit 146 acquires the image capturing condition detected by the detection unit 145 for each frame or a field, for example. Also, image data captured by the imaging unit 141 (for example, data of a moving image including a plurality of frames or fields) is organized into files in predetermined units (for example, a unit of image capturing by one camera 121 from a start instruction to an end instruction for image capturing), and IDs enabling identification of the files are generated. Additionally, in the following, such an ID enabling identification of a file will be referred to as an UMID (Unique Material Identifier).

The metadata generation unit 147 generates metadata including the image capturing condition acquired by the image capturing condition acquisition unit 146 and the UMID generated by the image capturing condition acquisition unit 146 in a format suitable for communication.

The communication control unit 143 performs control of superimposing, on a per file basis, the metadata (including the image capturing condition and the UMID) generated by the metadata generation unit 147 on the image data supplied by the conversion unit 142, and of transmitting the data to the image management apparatus 172 from the communication unit 144.

[Example Functional Structure of Image Management Apparatus 172]

Figure 25:
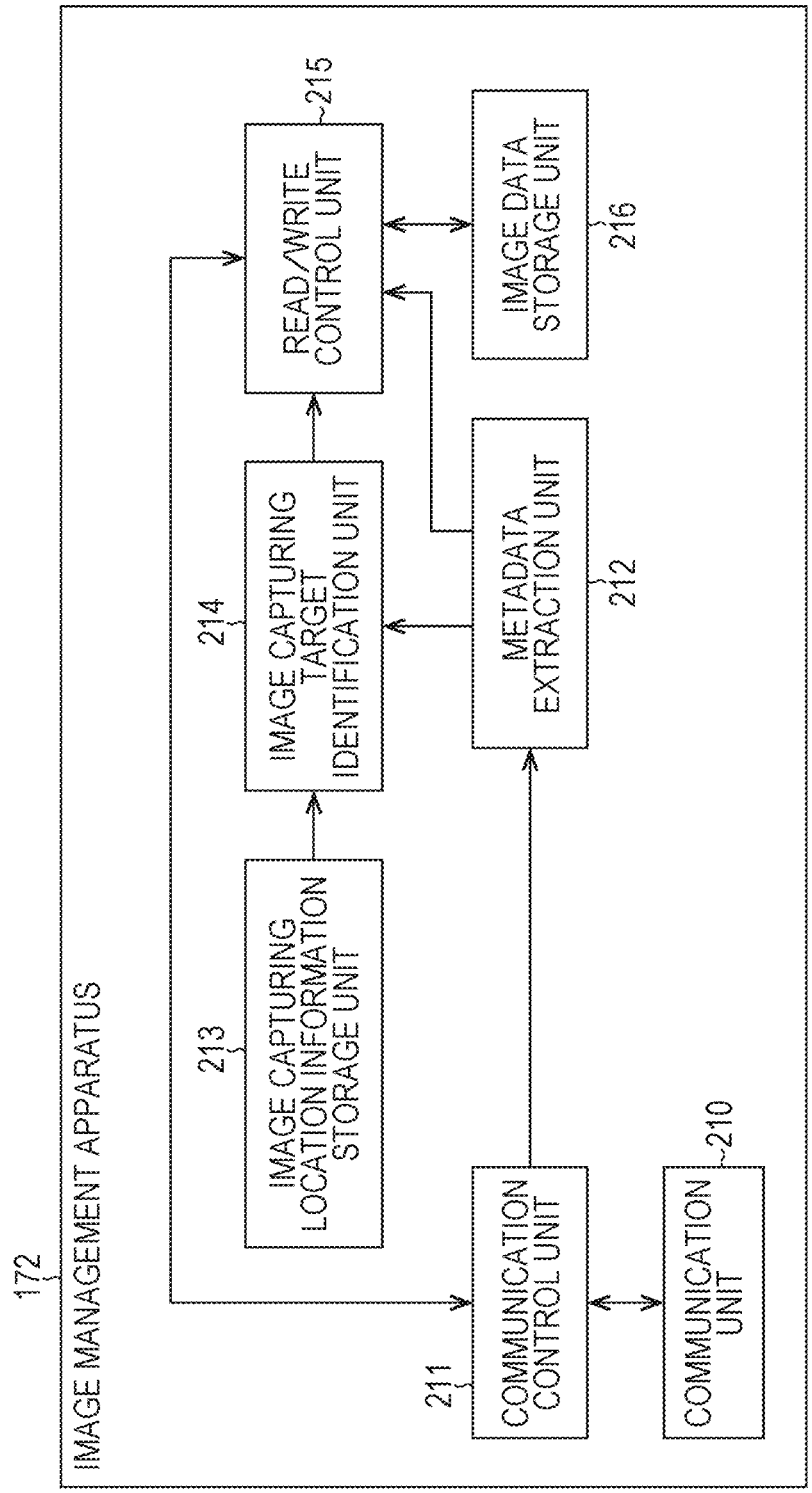
FIG. 25 is a functional block diagram showing an example functional structure of an image management apparatus.

FIG. 25 is a functional block diagram showing an example functional structure of the image management apparatus 172.

The image management apparatus 172 includes a communication unit 210, a communication control unit 211, a metadata extraction unit 212, an image capturing location information storage unit 213, an image capturing target identification unit 214, a read/write control unit 215, and an image data storage unit 216.

The communication control unit 211 controls communication that is performed between the communication unit 210 such as a modem, and the camera 121 and the SNS 171. For example, in the case image data on which metadata is superimposed is transmitted from the camera 121, the communication control unit 211 causes the communication unit 210 to receive the image data.

The metadata extraction unit 212 extracts metadata from image data that is received by the communication unit 210. The metadata extraction unit 212 supplies the extracted metadata to the image capturing target identification unit 214, and supplies the image data to the read/write control unit 215.

The image capturing location information storage unit 213 stores image capturing location information. The image capturing location information is information indicating locations whose images may be captured by the camera (for example, each location in a venue of an event), and in the present embodiment, since a user (or the ring 1 worn on the user's arm) at a venue where a predetermined event is held may be an image capturing target, position information of each seat (seat number and latitude/longitude information) where each user is seated is used, for example. In the following, details of the image capturing location information will be given with reference to FIG. 26.

[Image Capturing Location Information]

FIG. 26 is a diagram showing a structure of a list of the image capturing location information.

As shown in FIG. 26, the image capturing location information includes the seat number of a seat at the venue, and the latitude/longitude information of the seat.

For example, it can be seen from the first row in FIG. 26 that a location in the venue which is "around seat A15" in terms of the seat number is at "latitude=+34.44.36.02, longitude=+135.26.44.35" in terms of the latitude/longitude information. Also, it can be seen from the second row in FIG. 26 that a location in the venue which is "around seat B37" in terms of the seat number is at "latitude=+34.44.36.11, longitude=+135.26.44.36" in terms of the latitude/longitude information. Furthermore, it can be seen from the third row in FIG. 26 that a location in the venue which is "around seat C22" in terms of the seat number is at "latitude=+34.44.36.22, longitude=+135.26.44.33" in terms of the latitude/longitude information.

Referring back to FIG. 25, the image capturing target identification unit 214 identifies the image capturing target for each partitioned data based on the metadata supplied by the metadata extraction unit 212 and the image capturing location information stored in the image capturing location information storage unit 213. Additionally, identification of the user or the ring 1 itself shown in the partitioned data based on only the metadata and the image capturing location information is difficult, and the seat number where the user is expected to be seated is identified as the image capturing target.

The read/write control unit 215 writes (i.e., stores) the image data supplied by the metadata extraction unit 212 to the image data storage unit 216 in units of files (in units that may be identified by the UMIDs) in association with the image capturing target identified by the image capturing target identification unit 214. Also, the read/write control unit 215 searches the image data storage unit 216 and reads corresponding partitioned data in response to a request from the SNS 171 for acquisition of partitioned data, and transmits the data to the SNS 171 via the communication unit 210.

The image data storage unit 216 stores image data associated with an image capturing target in units of files. Management information of image data to be stored will be described with reference to FIG. 27.

[Image Data]

FIG. 27 is a diagram showing management information of image data to be stored in the image data storage unit 216.

Image data stored in the image data storage unit 216 is managed in units of files that are uniquely identified by UMIDs. A file of a predetermined UMID includes one or more pieces of partitioned data. Here, a file of an UMID includes one piece of actual data of an image, and management information for partitioning the actual data into one or more pieces of partitioned data and enabling reading on a per partitioned data basis is separately stored in the image data storage unit 216.

An example of this management information is shown in FIG. 27. The management information in FIG. 27 includes an UMID, a time code, and an image capturing target.

Here, the time code is time information that is added to each of a plurality of frames or fields structuring the actual data of an image included in a file identified by an UMID, and indicates a time relative to a reference time where the reference time is the time of the beginning frame or field of the file.

That is, in the example in FIG. 27, the partitioned data in a file is managed by the time code.

Specifically, for example, it can be seen from FIG. 27 that, in a file whose UMID is "X", an image capturing target at "around seat A15" is captured at a position with a time code "00:01:00:05", an image capturing target at "around seat B37" is captured at a position with a time code "00:20:30:20", and an image capturing target at "around seat C22" is captured at a position with a time code "01:10:00:17".

Accordingly, it can be seen from these three time codes that the following first partitioned data to third partitioned data are included in the file whose UMID is "X". That is, when taking the image capturing start time of the file whose UMID is "X" as a reference time 0, the first partitioned data is image data capturing "around seat A15" at a time "00: 01:00:05" in terms of relative time with respect to the reference time. The second partitioned data is image data capturing "around seat B37" at a time "00:20:30:20". The third partitioned data is image data capturing "around seat C22" at a time "01:10:00:17".

Also, for example, it can be seen that, in a file whose UMID is "Y", an image capturing target at "around seat Z33" is captured at a position with a time code "01:01:01: 15", an image capturing target at "around seat Y21" is captured at a position with a time code "01:02:20:21", and an image capturing target at "around seat X56" is captured at a position with a time code "01:10:01:12".

Accordingly, it can be seen from these three time codes that the following first partitioned data to third partitioned data are included in the file whose UMID is "Y". That is, when taking the image capturing start time of the file whose UMID is "X" as a reference time 0, the first partitioned data is image data capturing "around seat Z33" at a time "01: 01:01:15" in terms of relative time with respect to the reference time. The second partitioned data is image data capturing "around seat Y21" at a time "01:02:20:21". The third partitioned data is image data capturing "around seat X56" at a time "01:10:01:12".

The SNS 171 requests the image management apparatus 172 storing such management information for acquisition of predetermined partitioned data including an image of an excited user. That is, the SNS 171 requests the image management apparatus 172 for acquisition of the partitioned data with the time and date of capturing of the image capturing target and the image capturing location (seat number) as the search keys.

Then, the read/write control unit 215 of the image management apparatus 172 extracts the corresponding partitioned data from the image data stored in the image data storage unit 216 with the time and date and the image capturing location as the search keys. Additionally, the time and date of capturing of an image capturing target may be calculated from an 8-byte timestamp recorded in the UMID, and the time code or the number of frames from the beginning of the file, for example.

[Process of Information Processing System 160]

Figure 28:
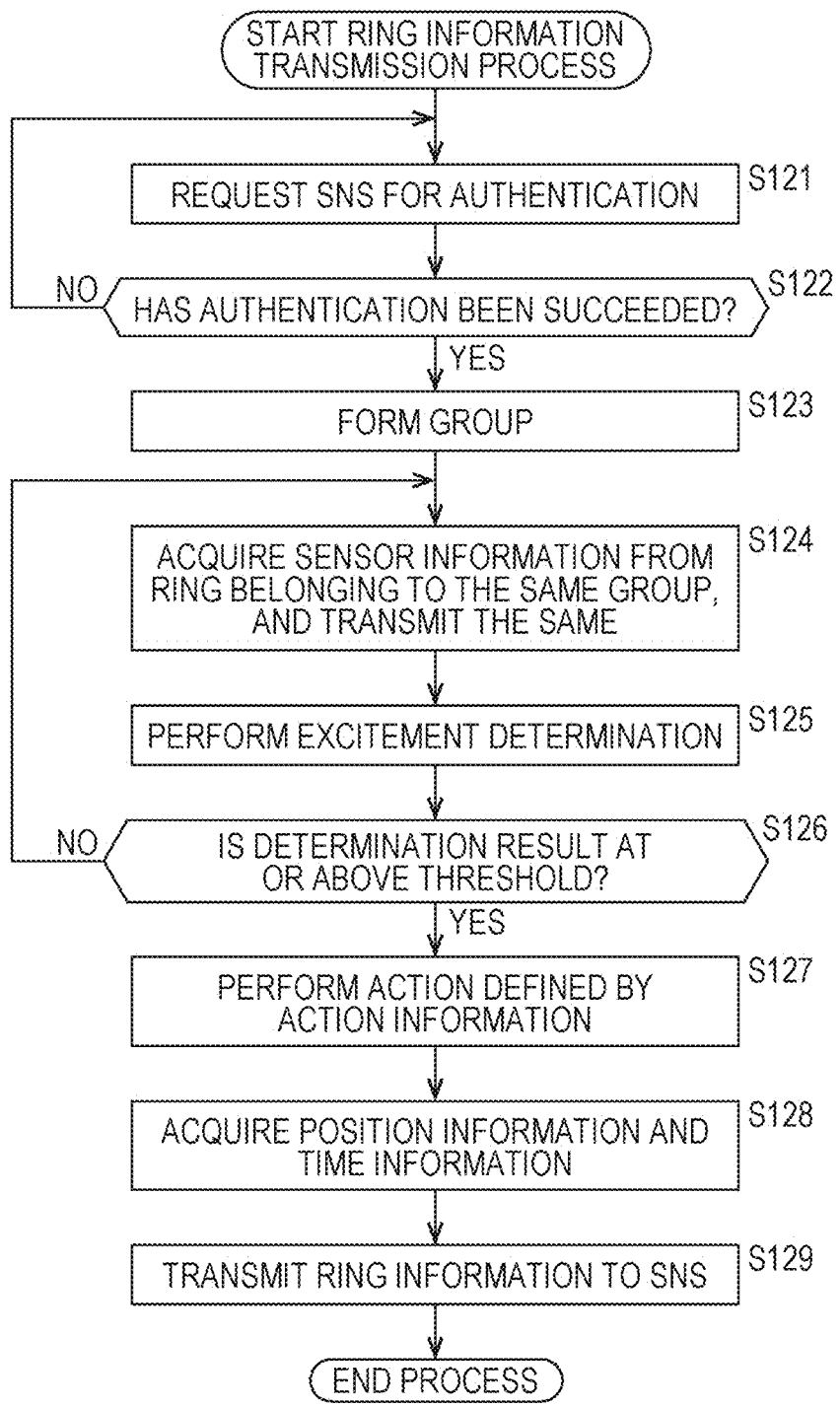
FIG. 28 is a flowchart for describing a flow of a ring information transmission process.
Figure 29:
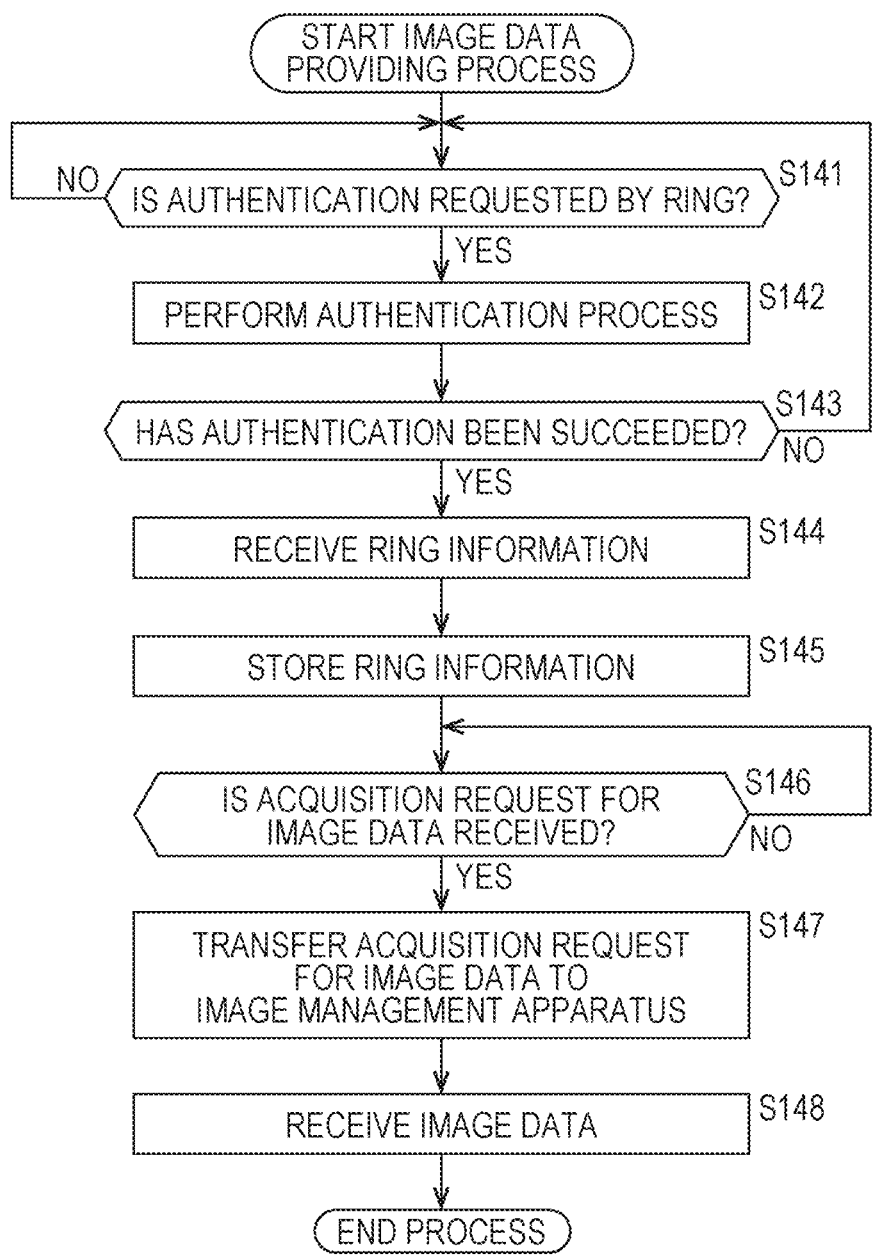
FIG. 29 is a flowchart for describing a flow of an image data providing process.
Figure 30:
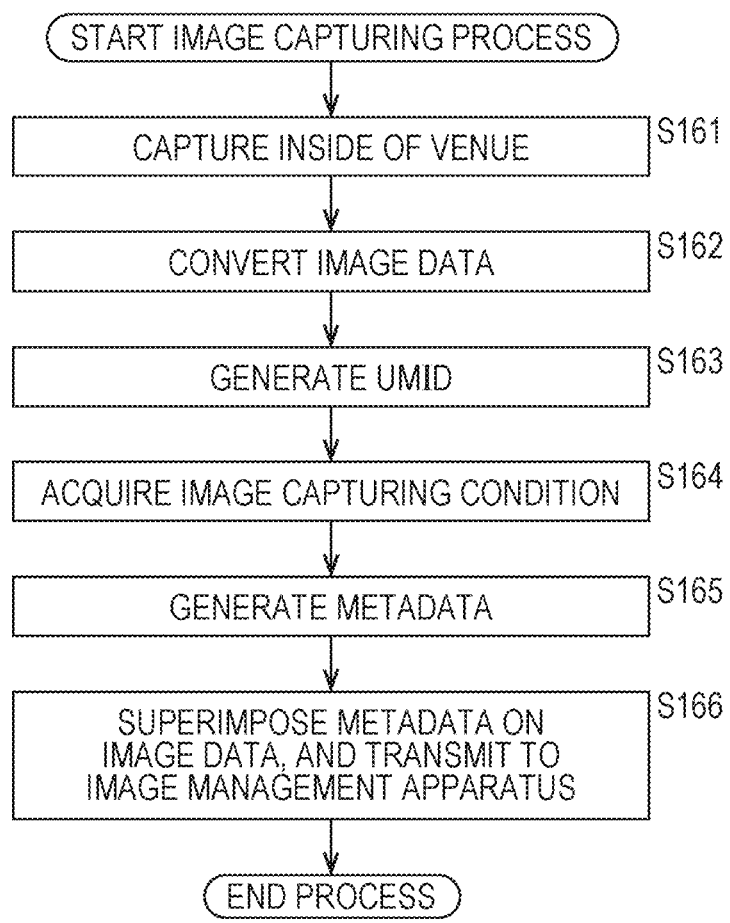
FIG. 30 is a flowchart for describing a flow of an image capturing process.
Figure 31:
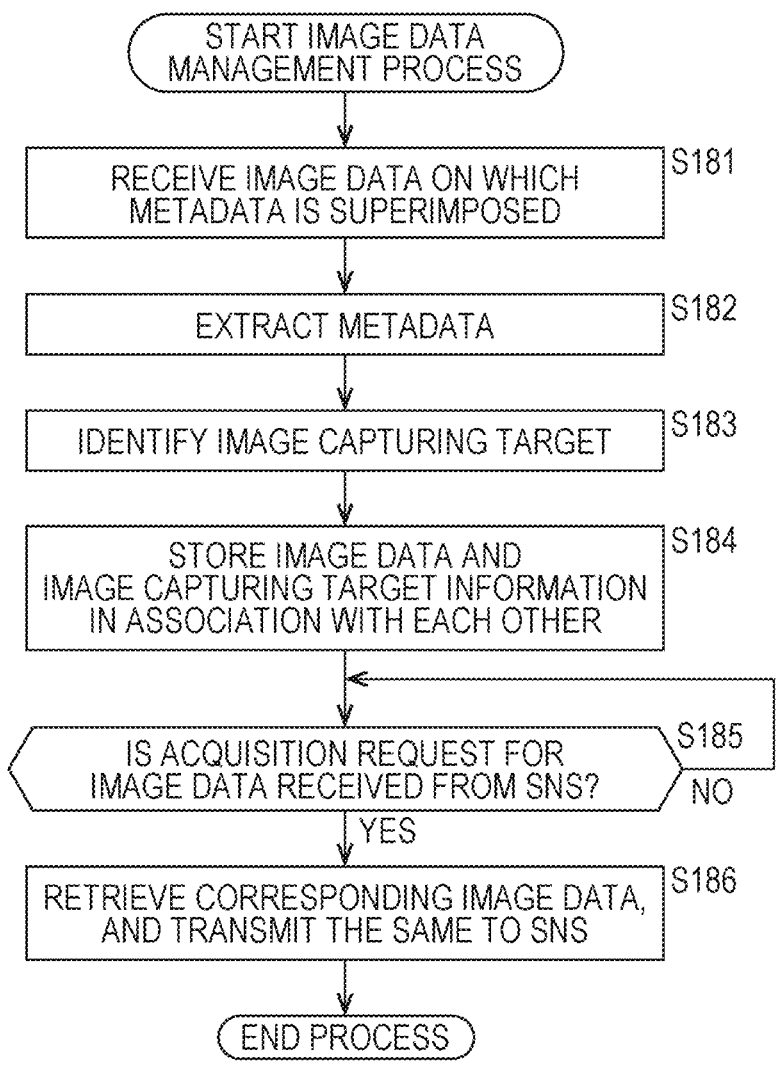
FIG. 31 is a flowchart for describing a flow of an image data management process.

Next, a flow of the process of the information processing system 160 will be described with reference to FIGS. 28 to 32. FIG. 28 is a diagram for describing a flow of a process, of the processes to be performed by the ring 1, of transmitting ring information to the SNS 171 (hereinafter referred to as a ring information transmission process). FIG. 29 is a diagram for describing a flow of a process, of the processes to be performed by the SNS 171, of providing image data (hereinafter referred to as an image data providing process). FIG. 30 is a diagram for describing a flow of a process, of the processes to be performed by the camera 121, of capturing an image capturing target (hereinafter referred to as an image capturing process). FIG. 31 is a diagram for describing a flow of a process of management of image data by the image management apparatus 172 (hereinafter referred to as an image data management process).

Figure 32:
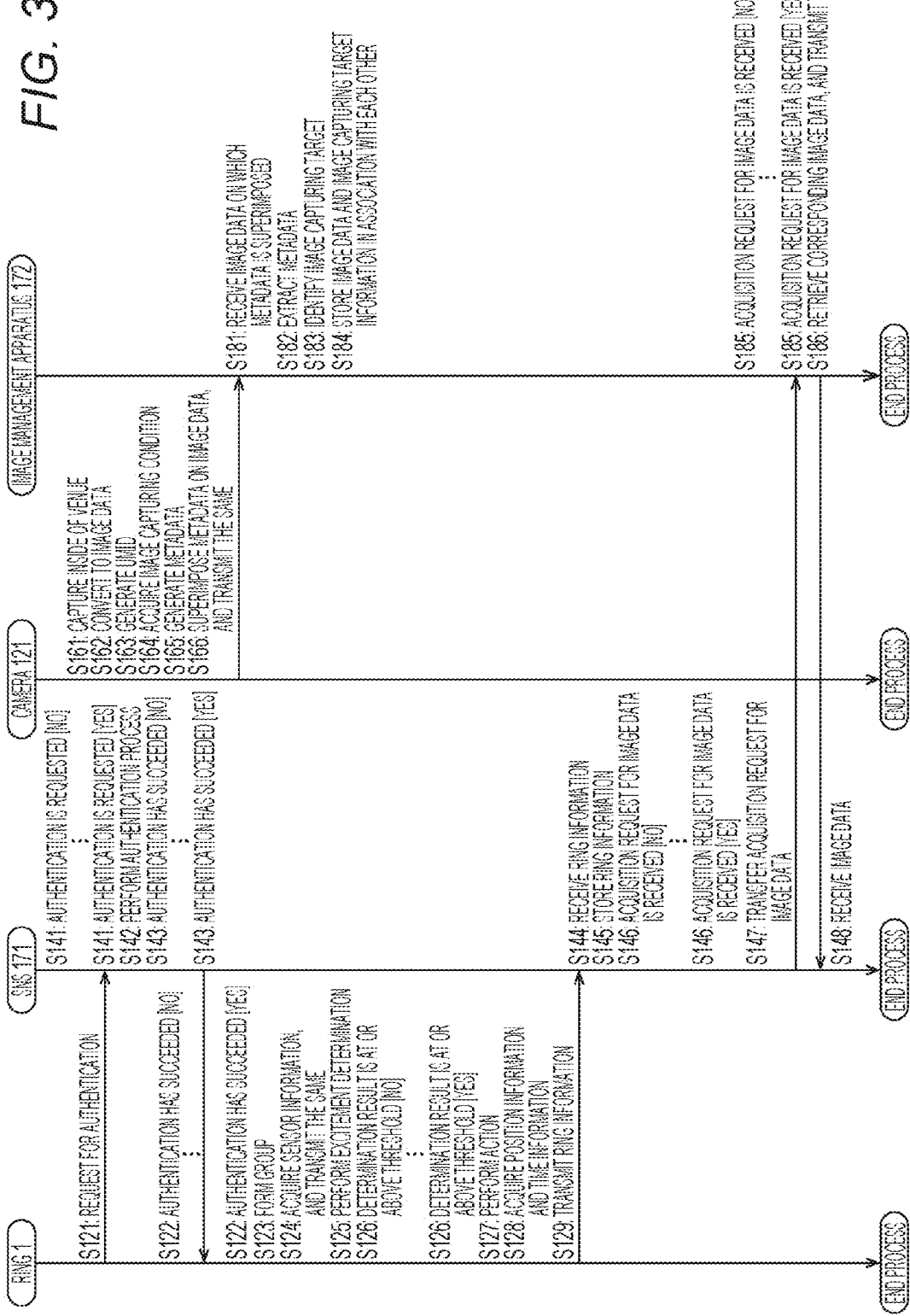
FIG. 32 is a diagram showing a relationship among processes of the ring, the SNS, the camera, and the image management apparatus.

Also, FIG. 32 is a diagram showing a relationship among processes of the ring 1, the SNS 171, the camera 121, and the image management apparatus 172 of the information processing system 160. The relationship, in FIG. 32, among processes of the ring 1, the SNS 171, the camera 121, and the image management apparatus 172 may be easily grasped by referring to the corresponding steps in FIGS. 28 to 31. In FIG. 32, a flowchart for describing an example of the ring information transmission process of the ring 1 (corresponding to FIG. 28) is shown on the left-hand side, and on the second from the left, a flowchart for describing an example of the image data providing process of the SNS 171 (corresponding to FIG. 29) is shown. Also, on the third from the left in FIG. 32, a flowchart for describing an example of the image capturing process of the camera 121 (corresponding to FIG. 30) is shown, and on the right-hand side, a flowchart for describing an example of the image data management process of the image management apparatus 172 (corresponding to FIG. 31) is shown.

In step S121 in FIG. 28, the communication control unit 84 of the ring 1 requests the SNS 171 for authentication.

In step S141 in FIG. 29, the communication control unit 191 of the SNS 171 determines whether authentication is requested by the ring 1 in the process in step S121 in FIG. 28.

In the case there is no authentication request, NO is determined in step S141, the process is returned to step S141, and the determination process in step S141 is repeated until authentication is requested.

Then, when authentication is requested by the ring 1, YES is determined in step S141, and the process proceeds to step S142.

In step S142, the authentication unit 193 performs an authentication process for the ring 1.

In step S143, the authentication unit 193 determines whether authentication of the ring 1 has succeeded.

In the case of failure of authentication, NO is determined in step S143, and the process is returned to step S141 to be repeated therefrom. That is, the loop process from step S141 to S143 is repeated until authentication has succeeded.

Then, when authentication has succeeded, YES is determined in step S143, and the process proceeds to step S144. Additionally, in the case of success of authentication, information indicating that authentication has succeeded is transmitted to the ring 1.

In step S122 in FIG. 28, the communication control unit 84 of the ring 1 determines whether authentication by the SNS 171 has succeeded.

In the case of failure of authentication, that is, in the case information indicating that authentication has succeeded from the SNS 171 is not received, NO is determined in step S122, and the process is returned to step S121 to be repeated therefrom. That is, the loop process of steps S121 and S122 is repeated until authentication has succeeded.

Then, in the case authentication has succeeded, that is, in the case information indicating that authentication has succeeded transmitted from the SNS 171 in the process in step S143 is received, YES is determined in step S122, and the process proceeds to step S123.

In step S123, the group forming unit 90 of the ring 1 forms a group gr by the method of forming a group gr described above.

In step S124, the sensor information acquisition unit 81 of the ring 1 acquires sensor information from a ring 1 belonging to the same group, and transmits the same. That is, the communication control unit 84 receives and acquires, by the wireless module 32, movement information detected by the sensor information acquisition unit 81 of each of one or more other rings 1 belonging to the same group. Then, the communication control unit 84 transmits the movement information acquired by the sensor information acquisition unit 81 of itself to the one or more other rings 1 belonging to the same group.

In step S125, the excitement determination unit 82 of the ring 1 performs excitement determination. That is, the excitement determination unit 82 generates, based on the movement information of itself and of the one or more other rings 1 acquired in the process in step S124, the relatedness information indicating the degree of relatedness regarding the synchronicity of movements between a plurality of users belonging to the same group. Then, the excitement determination unit 82 determines the degree of excitement based on the relatedness information.

In step S126, the excitement determination unit 82 of the ring 1 determines whether the determination result is at or above a threshold. That is, the excitement determination unit 82 determines whether the degree of excitement which is the result of the excitement determination is at or above a threshold that is set in advance.

In the case the determination result is not at or above the threshold, NO is determined in step S126, the process is returned to step S124, and the loop process from step S124 to S126 is repeated until the determination result is at or above the threshold.

Then, when the determination result reaches or exceeds the threshold, YES is determined in step S126, and the process proceeds to step S127.

In step S127, the action control unit 83 performs an action that is defined by the action information that is stored in advance in the storage unit 88.

In step S128, the position information acquisition unit 85 acquires current position information of the ring 1, and the time information acquisition unit 86 acquires information indicating the time when the determination result has reached or exceeded the threshold (that is, the time of high excitement).

In step S129, the communication control unit 84 transmits the ring information to the SNS 171. That is, the position information and the time information acquired in the process in step S128, and the ring ID are transmitted to the SNS 171. The ring information transmission process of the ring 1 is thereby ended.

In step S144 in FIG. 29, the communication control unit 191 of the SNS 171 controls the communication unit 192, and receives the ring information transmitted from the ring 1 in the process in step S129 in FIG. 28.

In step S145, the storage control unit 194 of the SNS 171 controls the storage unit 195, and stores the ring information received in the process in step S144.

Here, the image capturing process in FIG. 30 will be described.

In step S161 in FIG. 30, the imaging unit 141 of the camera 121 captures the inside of the venue where an event is being held.

In step S162, the conversion unit 142 of the camera 121 converts the image captured data that is obtained as a result of image capturing in the process in step S161 into image data of a format suitable for communication.

In step S163, the image capturing condition acquisition unit 146 generates the UMID of a file of the image data.

In step S164, the image capturing condition acquisition unit 146 of the camera 121 acquires the image capturing condition detected by the detection unit 145.

In step S165, the metadata generation unit 147 of the camera 121 generates metadata including the UMID generated in the process in step S163 and the image capturing condition acquired in the process in step S164.

In step S166, the communication control unit 143 of the camera 121 performs control of superimposing the metadata generated in the process in step S165 on the image data obtained by conversion in the process in step S162, and of transmitting the data from the communication unit 144 to the image management apparatus 172.

The image capturing process of the camera 121 is thereby ended.

On the other hand, in step S181 in FIG. 31, the communication control unit 211 of the image management apparatus 172 causes the communication unit 210 to receive the image data, on which the metadata is superimposed, transmitted from the camera 121 in the process in step S166 in FIG. 30.

In step S182, the metadata extraction unit 212 of the image management apparatus 172 extracts the metadata from the image data received in the process in step S181. The metadata extraction unit 212 supplies the extracted metadata to the image capturing target identification unit 214, and supplies the image data to the read/write control unit 215.

In step S183, the image capturing target identification unit 214 of the image management apparatus 172 identifies the image capturing target for each piece of partitioned data, based on the metadata supplied by the metadata extraction unit 212 and the image capturing location information stored in the image capturing location information storage unit 213. That is, a seat number is identified as an image capturing target.

In step S184, the read/write control unit 215 of the image management apparatus 172 stores the image data supplied by the metadata extraction unit 212 in the image data storage unit 216 in association with the image capturing target identified in the process in step S183.

In step S146 in FIG. 29, the communication control unit 191 of the SNS 171 determines whether an acquisition request for predetermined image data is received from a terminal, not shown, of a member or the like belonging to the SNS 171.

In the case an acquisition request for predetermined image data is not received, NO is determined in step S146, the process is returned to step S146, and the determination process in step S146 is repeated until an acquisition request for predetermined image data is received.

Then, when an acquisition request for predetermined image data is received, YES is determined in step S146, and the process proceeds to step S147.

In step S147, the communication control unit 191 of the SNS 171 transfers the acquisition request for image data to the image management apparatus 172.

In step S185 in FIG. 31, the communication control unit 211 of the image management apparatus 172 determines whether the acquisition request for image data transmitted from the SNS 171 in the process in step S147 in FIG. 29 is received.

In the case the acquisition request for image data is not received, NO is determined in step S185, the process is returned to step S185, and the determination process in step S185 is repeated until the acquisition request for image data is received.

Then, when the acquisition request for image data is received, YES is determined in step S185, and the process proceeds to step S186.

In step S186, the read/write control unit 215 of the image management apparatus 172 searches for, and acquires, corresponding image data (that is, partitioned data) in response to the acquisition request received in the process in step S186, and transmits the data to the SNS 171 through the communication unit 210.

The image data management process of the image management apparatus 172 is thereby ended.

In step S148 in FIG. 29, the communication control unit 191 of the SNS 171 receives the image data transmitted from the image management apparatus 172 in the process in step S186 in FIG. 31.

The image data providing process of the SNS 171 is thereby ended.

Additionally, in the example described above, the cooperation between the SNS 171 and the image management apparatus 172 is performed based on the time and the location for identifying a scene of high excitement during an event, but this is not restrictive. For example, by taking a keyword or the like indicating a scene of high excitement during an event as a tag, the cooperation between the SNS 171 and the image management apparatus 172 may be achieved based on this tag.

In this case, management information shown in FIG. 33 is held by the SNS 171, and management information shown in FIG. 34 is held by the image management apparatus 172.

FIG. 33 shows an example of the structure of a list of management information held by the SNS 171.

In the list of management information in FIG. 33, a predetermined row includes management information indicating a scene of high excitement during an event. That is, one row is added every time one piece of ring information is supplied by the ring 1, and management information that is generated based on this ring information is written to the row which has been added.

Specifically, when a new piece of ring information is supplied, and one row is added, the time identified by the time information included in the ring information, that is, the time (the time and date) of high excitement, is stored under the item "timestamp" in the row which has been added. Also, the position (latitude/longitude) identified by the position information included in the ring information is stored under the item "GPS information" in the row which has been added. Additionally, the SNS account of each user belonging to the group to which the ring 1 which has transmitted the ring information belongs is stored under the item "SNS account", but the storage method itself is not particularly restricted, and a method of manual input, or a method of automatic input based on the ring ID or the like of the ring 1 belonging to the group may be used.

Also, a keyword which allows a member of the SNS to recall a scene of high excitement corresponding to such a row is added as a tag by the administrator of the SNS or a user, for example. This tag is stored under "TAG information" of the corresponding row.

FIG. 34 shows an example of the structure of a list of management information held by the image management apparatus 172.

The list of management information in FIG. 34 is a list where only the item "TAG information" is added to each item in the list of management information in FIG. 27. Thus, items other than "TAG information" have already been described with reference to FIG. 27, and a redundant description thereof is omitted.

The item "TAG information" in FIG. 34 corresponds to "TAG information" included in the management information in FIG. 33 managed by the SNS 171 in FIG. 33. Accordingly, a notification regarding the stored content of "TAG information" is transmitted from the SNS 171 at an appropriate timing, and the item "TAG information" in FIG. 34 is updated manually or automatically according to the notified content. Cooperation between the SNS 171 and the image management apparatus 172 may thereby be achieved based on the respective "TAG information".

[Process Using Tag]

Figure 35:
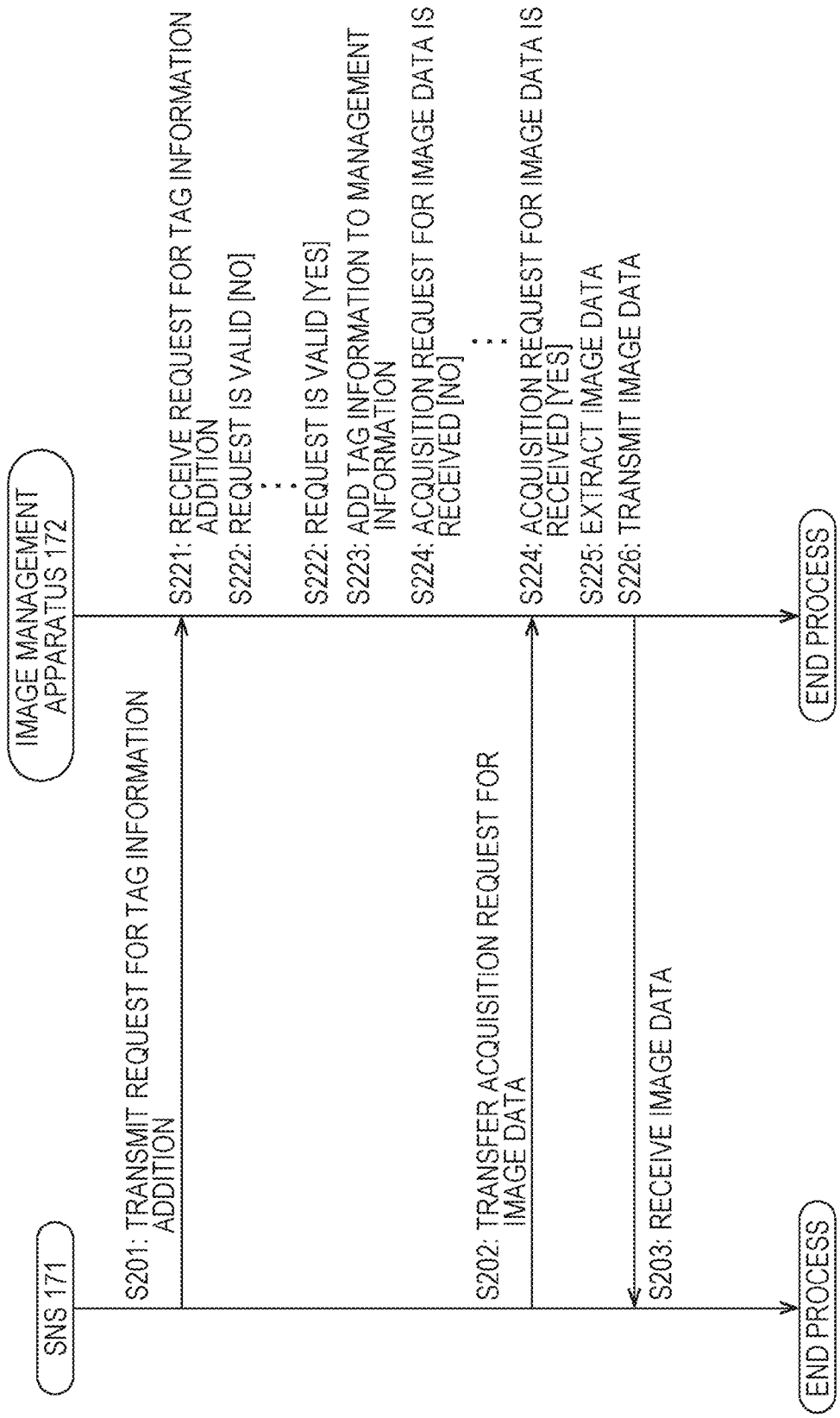
FIG. 35 is a flowchart for describing a flow of a process performed by cooperation between the SNS and the image management apparatus.

FIG. 35 is a flowchart of a process performed by cooperation between the SNS 171 and the image management apparatus 172 by using the pieces of management information in FIGS. 33 and 34 as described above. A flowchart for describing an example of a process of the SNS 171 is shown on the left-hand side of FIG. 35, and a flowchart for describing an example of a process of the image management apparatus 172 is shown on the right-hand side of FIG. 35.

In step S201, the communication control unit 191 of the SNS 171 transmits to the image management apparatus 172 a request for TAG information addition.

Then, in step S221, the communication control unit 211 of the image management apparatus 172 receives the request for TAG information addition which has been transmitted in the process in step S201 from the SNS 171.

In step S222, the communication control unit 211 of the image management apparatus 172 determines whether the request for TAG information addition is valid.

In the case the request for TAG information addition is not valid, NO is determined in step S222, and the process is returned to step S221 to be repeated therefrom. That is, the loop process of steps S221 and S222 is repeated until there is a valid request for TAG information addition.

Then, when a valid request for TAG information addition is made, YES is determined in step S222, and the process proceeds to step S223.

In step S223, the read/write control unit 215 adds TAG information to the management information.

In step S202, if an acquisition request for predetermined image data is issued by a terminal of a member or the like belonging to the SNS 171, the communication control unit 191 of the SNS 171 transfers the request to the image management apparatus 172.

Then, in step S224, the communication control unit 211 of the image management apparatus 172 receives the acquisition request for predetermined image data which has been transmitted from the SNS 171 in the process in step S202.

In step S225, the read/write control unit 215 of the image management apparatus 172 extracts the predetermined image data corresponding to the request.

In step S226, the communication control unit 211 of the image management apparatus 172 transmits the predetermined image data which has been extracted in the process in step S225 to the SNS 171.

Then, in step S203, the communication control unit 191 of the SNS 171 receives the predetermined image data which has been transmitted from the image management apparatus 172 in the process in step S226. The communication control unit 191 of the SNS 171 transmits the predetermined image data to the terminal of the member or the like belonging to the SNS 171 which has issued the acquisition request. The process performed by cooperation between the SNS 171 and the image management apparatus 172 is thereby ended.

In this manner, the image data stored in the SNS and the image data stored in the image management apparatus are associated with each other, and thus, the image data of a scene of high excitement may be easily retrieved.

Additionally, in the example described above of the method of forming a group gr, a group gr is formed by only a plurality of rings 1. However, a group gr may also be formed by the SNS 171. A method of forming a group gr by the SNS 171 will be described.

First, the communication control unit 84 of the ring 1 transmits, to the SNS 171, the position information of itself acquired by the position information acquisition unit 85.

The SNS 171 perceives, based on pieces of position information received from a plurality of rings 1, neighboring rings 1, that is, a plurality of rings 1 present within a specific range, and forms one group gr consisting of the plurality of rings 1 present within the specific range. Then, the SNS 171 generates a group ID of the group gr, and transmits the group ID to the plurality of rings 1 included in the group gr.

One group gr is formed from neighboring rings 1 by the SNS 171 in the above manner, but this is not particularly restrictive. For example, in the case a predetermined event is a sport played by teams, a group gr may formed for the rings 1 worn by users supporting a predetermined team. That is, the rings 1 worn by users supporting the same team may form one group gr. Also, one group gr may be formed by the rings 1 worn by users in favor of a predetermined player or a predetermined singer, for example.

[Fifth Example of Group Control]

Next, a fifth example of group control using the ring 1 to which the present technique is applied will be described with reference to FIGS. 36 and 37.

Figure 36:
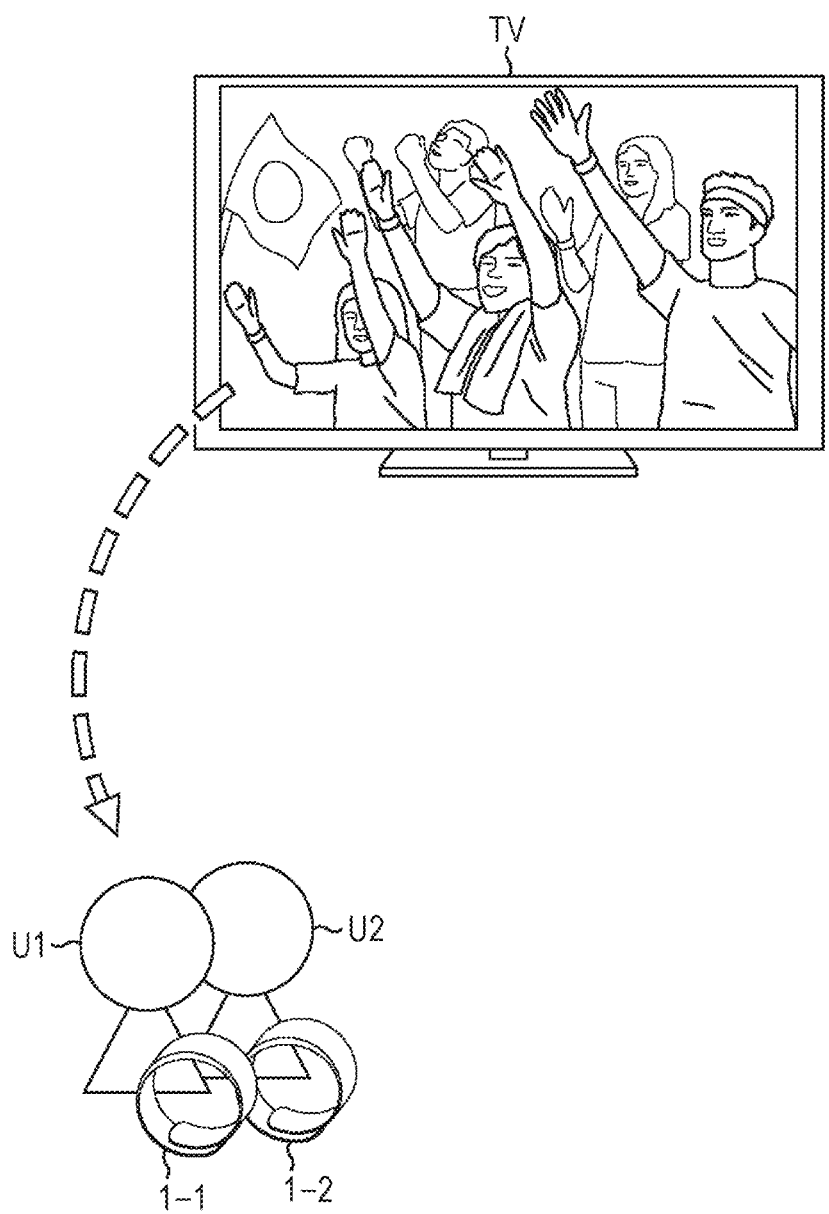
FIG. 36 is a diagram for describing a fifth example of group control.

FIG. 36 is a diagram for describing the fifth example of group control.

In the fifth example in FIG. 36, for example, even if a user cannot directly participate in an event, the user may simply wear the ring 1 on the arm and view an image of a TV program about the event on a television receiver or the like, and the ring 1 will form a virtual group with a plurality of other rings 1, worn by a plurality of other users, included in the image of the event displayed on the television receiver. Control of causing a ring 1 belonging to such a virtual group (that is, a ring 1 present outside the venue of an event) to, for example, emit light and vibrate in synchronization with other rings 1 present inside the venue of the event displayed on a television receiver is performed as an example of group control.

For example, it is assumed that a user Uk wearing a ring 1-*k* is viewing an image of an event displayed on a television receiver. In this case, the image of the event includes an image of rings 1 worn by a plurality of users emitting light and vibrating in a predetermined pattern. In this case, the ring 1-*k* of the user Uk also emits light and vibrates in the same predetermined pattern as the rings 1 of the users included in the image of the event.

In the case group control of the fifth example in FIG. 36 is to be performed, the action control unit 83, the communication control unit 84, and the storage unit 88 are to function, among the functional structures of the CPU 31 in FIG. 6.

Specifically, the communication control unit 84 of the ring 1-*k* receives information (hereinafter referred to other-ring-pattern identification information) enabling identification of the pattern of the light emission and the vibration of other rings 1 of other users shown on a television receiver TV by communicating with the television receiver TV. That is, in this case, the other-ring-pattern identification information is broadcast. The action control unit 83 of the ring 1-*k* identifies the pattern of the light emission and the vibration of other rings 1 by analyzing the other-ring-pattern identification information, and controls the ring 1-*k* to emit light and vibrate in the same pattern as the identified pattern.

The mode of the other-ring-pattern identification information (including the mode of transmission) and the analysis method thereof are not particularly restricted.

For example, the other-ring-pattern identification information may be transmitted through a transmission channel (not shown) for other than broadcasting. However, in this case, a mechanism allowing broadcasting and communication through the other transmission channel to be synchronized becomes necessary.

Also, for example, the other-ring-pattern identification information may be superimposed on a broadcast signal. However, in this case, the broadcast specification may have to be changed.

Furthermore, for example, in the case a broadcast signal may be transferred to the ring 1 from the television receiver TV, the communication control unit 84 may communicate with the television receiver TV, and receive the broadcast signal as the other-ring-pattern identification information. In this case, the action control unit 83 may perform analysis by applying various types of image processing on an image signal which is the other-ring-pattern identification information, identify the pattern of the light emission and the vibration of other rings 1 based on the analysis result, and control the ring 1-*k* to emit light and vibrate in the same pattern as the pattern which has been identified.

[Action Control Process]

Next, of processes to be performed by the ring 1 in the fifth example of group control, the flow of a process of controlling an action in synchronization with other rings 1 belonging to a virtual group (hereinafter referred to as an action control process) will be described.

Figure 37:
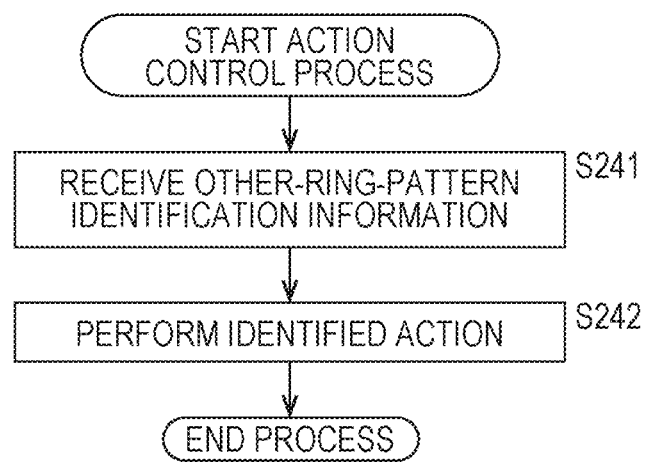
FIG. 37 is a flowchart for describing a flow of an action control process.

FIG. 37 is a flowchart for describing a flow of the action control process.

In step S241, the communication control unit 84 of the ring 1 receives other-ring-pattern identification information of other rings 1.

In step S242, the action control unit 83 of the ring 1 performs an action which has been identified. That is, the action control unit 83 analyzes the other-ring-pattern identification information which has been received in the process in step S241, identifies the pattern of the light emission and the vibration of the other rings 1 based on the analysis result, and performs an action of the same pattern as the identified pattern.

The action control process is thereby ended.

In this manner, a user may see the ring 1 worn on the arm performing the same action as users at a venue, by viewing an image of an event displayed on the television receiver. Accordingly, the user may feel a sense of unity with the users at the venue without going to the venue where the event is being held. Also, the user may feel a sense of reality in the same way as the users at the venue, even when cheering or watching at a location other than the venue.

Additionally, the rings 1 worn on the arms of respective users Uk in front of the television receiver may form one group, and may influence the event at the venue through the television receiver and a network. In this case, for example, when a user Uk viewing an image of the event displayed on the television receiver cheerleads by waving the arm wearing the ring 1, the result influences the display at the venue where the event is being held.

Also, the rings 1 worn on the arms of respective users Uk in front of the television receiver may form one group, and receive a signal from the venue of the event. Each user Uk may thereby receive the appointment by an artist UA described in the second example of group control, while being in front of the television receiver.

[Method of Selecting Leader]

In the second example of group control described above, a leader is selected from a group formed of a plurality of rings 1. In this case, as the method of selecting a leader, a method of detecting, by each of a plurality of rings 1 in a group, a behavior capable of representing high excitement, and selecting a leader based on the detection results is applied. However, the method of selecting a leader is not particularly restricted, and methods described with reference to FIGS. 38 to 40 may also be applied.

Figure 38:
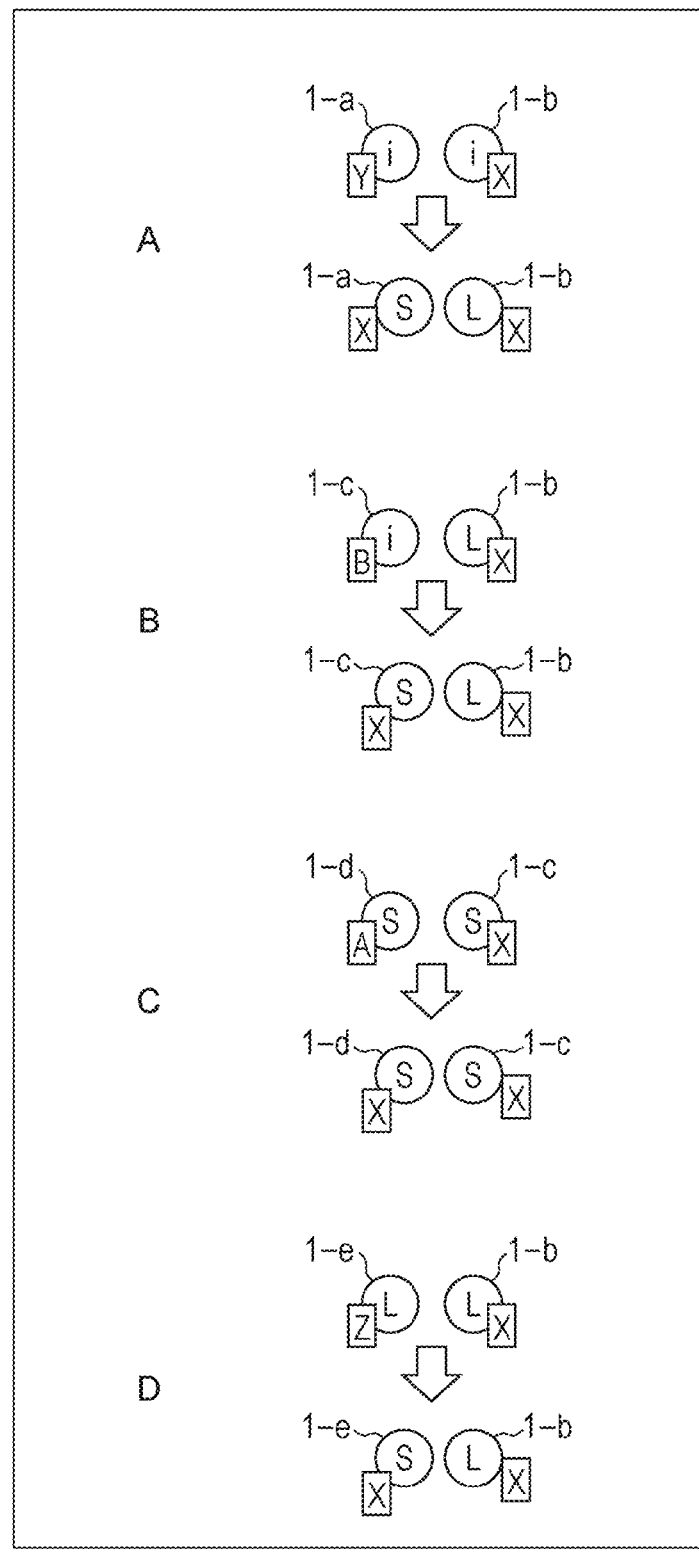
FIG. 38 is a diagram showing a method of selecting a leader.

FIG. 38 is a diagram showing a method of selecting a leader.

In FIG. 38, one ring 1 is expressed by one circle, and the reference sign inside the circle indicates the state of the ring 1. As this state, there are the following first to third states. That is, the first state is an initial state, and is expressed by a reference sign i. The second state is a leader state, and is expressed by a reference sign L. It is assumed that only one ring 1, in a group gr, can be in the leader state. The third state is a slave state, and is expressed by a reference sign S. Rings 1 which has come out of the initial state but cannot be in the leader state all fall into the slave state.

Also, a rectangle superimposed on the circle indicating the ring 1 shows a value indicating sensor information (hereinafter referred to as a sensed value) of a sensor embedded in the ring 1. Although not particularly restricted, here, the sensed value is the movement information detected by the 3-axis accelerometer 33. The level of the sensed value corresponds to the level of the movement information described above. Moreover, the level of the movement information corresponds to the degree of excitement. Accordingly, the degree of excitement is higher as the sensed value is greater. If a user with a higher degree of excitement is more qualified as a leader, it can be said that one is more qualified to be a leader as the sensed value is greater.

Accordingly, two rings 1 compare the sensed values of the two 3-axis accelerometers 33 embedded in the respective rings 1, and determine that the ring 1 with the greater sensed value is qualified to be the leader. More accurately, the user wearing the corresponding ring 1 on the arm is determined to be qualified as the leader, that is, the user is determined to be a leader candidate. In this case, the ring 1 worn on the arm of the user who is the leader candidate falls in the leader state L, and the ring 1 worn on the arm of the user rejected as the leader candidate falls in the slave state S. Such comparison of the sensed values of two rings 1 is performed within a range taken as a group gr in a so-called round-robin manner. Then, as the comparison proceeds, the leader candidates are narrowed down, and in the end, only one leader candidate will remain, and the leader candidate will be the leader.

Specifically, as shown in A of FIG. 38, for example, first, a ring 1-a in the initial state i and a ring 1-b in the initial state i are compared with each other. Here, the sensed value of the ring 1-a is a value Y, and the sensed value of the ring 1-b is a value X. Also, the value X is assumed to be a greater value than the value Y.

In this case, as a result of comparison of the ring 1-a and the ring 1-b, the state of the ring 1-b having the greater sensed value X transitions from the initial state i to the leader state L, and the state of the ring 1-a having the smaller sensed value Y transitions from the initial state i to the slave state S. Then, the sensed value of the ring 1-a which has transitioned to the slave state S is changed to the value X, which is the sensed value of the ring 1-b which has been made the leader candidate.

That is, in the case both of two rings 1 are in the initial state i, the sensed values of the two are compared with each other. Then, as a result of comparison, the state of the ring 1 with the greater sensed value transitions to the leader state L, and the state of the ring 1 with the smaller sensed value transitions to the slave state S. Then, the sensed value of the ring 1 in the slave state S is changed to the sensed value of the ring 1 in the leader state L.

Next, as shown in B of FIG. 38, a ring 1-c in the initial state i and the ring 1-b in the leader state L, which is a leader candidate, are compared with each other. Here, the sensed value of the ring 1-c is a value B, and the sensed value of the ring 1-b is the value X.

In this case, as a result of comparison of the ring 1-c and the ring 1-b, the state of the ring 1-c in the initial state i transitions from the initial state i to the slave state S. Then, the sensed value of the ring 1-c in the slave state S is changed to the value X, which is the sensed value of the ring 1-b which is a leader candidate.

That is, in the case a ring 1 is in the initial state i, regardless of the state of another (that is, regardless of whether the state of another is the leader state L or the slave state S), comparison of the sensed values of the two is not performed. Then, the state of the ring 1 in the initial state i transitions to the slave state S, and its sensed value is changed to the sensed value of the other ring 1.

Next, as shown in C of FIG. 38, a ring 1-d in the slave state S and the ring 1-c in the slave state S are compared with each other. Here, the sensed value of the ring 1-d is a value A, and the sensed value of the ring 1-c is the value X. Also, the value X is assumed to be a greater value than the value A.

In this case, as a result of comparison of the ring 1-d and the ring 1-c, the sensed value of the ring 1-d having the smaller sensed value A is changed to the value X, which is the sensed value of the ring 1-c having the greater sensed value X.

That is, in the case one ring 1 is in the slave state S, and the state of the other is in the slave state S, the sensed values of the two are compared with each other. Then, as a result of comparison, the sensed value of the ring 1 with the smaller sensed value is changed to the sensed value of the ring 1 with the greater sensed value. Additionally, the states of the two do not transition.

Additionally, although not shown, also in the case where the state of a ring 1 is the slave state S, and the state of the other is the leader state L, the sensed values of the two are compared with each other, and as a result of comparison, the sensed value of the ring 1 with the smaller sensed value is changed to the sensed value of the ring 1 with the greater sensed value. Also, the state of the ring 1 with the smaller sensed value transitions to the slave state S.

Next, as shown in D of FIG. 38, a ring 1-e in the leader state, which is a leader candidate, and the ring 1-b in the leader state L, which is a leader candidate, are compared with each other. Here, the sensed value of the ring 1-e is a value Z, and the sensed value of the ring 1-b is the value X. Also, the value X is assumed to be a greater value than the value Z.

In this case, as a result of comparison of the ring 1-e and the ring 1-b, the state of the ring 1-e with the smaller sensed value Z transitions from the leader state L to the slave state S. Then, the sensed value of the ring 1-e, which has transitioned to the slave state S, is changed to the value X, which is the sensed value of the ring 1-b in the leader state L.

That is, in the case one ring 1 is in the leader state L, and the state of the other is the leader state L, the sensed values of the two are compared with each other. Then, in the case where, as a result of comparison, the score value of the other ring 1 is greater, the state of the ring 1 in the leader state L transitions to the slave state S, and its sensed value is changed to the sensed value of the other ring 1.

Additionally, although not shown, also in the case where the state of a ring 1 is the leader state L, and the state of the other is the slave state S, the sensed values of the two are compared with each other, and as a result of comparison, the sensed value of the ring 1 with the smaller sensed value is changed to the sensed value of the ring 1 with the greater sensed value. Also, the state of the ring 1 with the smaller sensed value transitions to the slave state S.

Each ring 1 regularly repeats such change of the state and the sensed value with respect to a ring 1 in a specific range.

First, a ring 1 detects another ring 1 in proximity, and establishes a connection to at least one other ring 1 which has been detected. When the connection is successfully established, the ring 1 exchanges predetermined information including the state and the sensed value with the at least one other ring 1 with which the connection is successfully established, and respective states and sensed values are updated in the manner described above.

When a specific period of time has elapsed after the update, the ring 1 again detects another ring 1 in proximity, and starts an attempt of establishing a connection to at least one ring 1 which has been detected. When the connection is successfully established, the ring 1 exchanges predetermined information with the at least one other ring 1 in the manner described above, and respective states and sensed values are updated in the manner described above. On the other hand, in the case the connection is not successfully established within a specific period of time, the ring 1 abandons the attempt of the communication connection.

When the comparison as described above is repeated, a plurality of groups gr each formed of one ring 1 in the leader state L and a plurality of rings 1 in the slave state S are formed. Also, all the sensed values of a plurality of rings 1 in the same group gr will be the same value. Additionally, the sensed value of a plurality of rings 1 in the same group gr will be referred to as a group sensed value.

Furthermore, when the comparison as described above is repeated, a predetermined group is expanded while taking in a group in proximity. Additionally, each ring 1 is assumed to be capable of simultaneously connecting to a plurality of rings 1 present within a communication range. In this case, the number of rings 1 to which connection is possible is dependent on the storage capacity and the like of the ring 1, and the restriction on the system.

Figure 39:
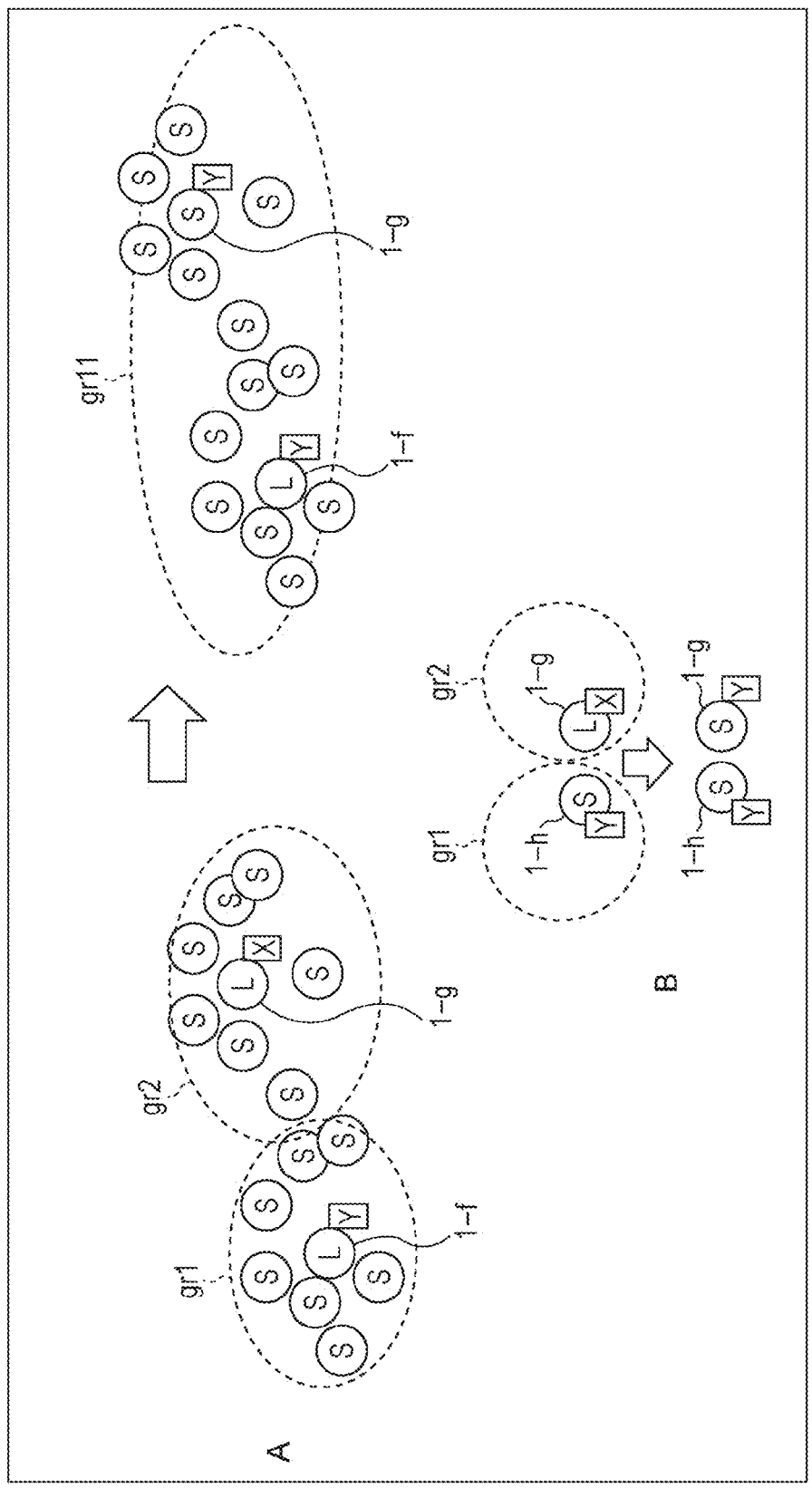
FIG. 39 is a diagram showing expansion of a group.

FIG. 39 is a diagram showing expansion of a group.

As shown on the left-hand side of A of FIG. 39, it is assumed that a group gr1 and a group gr2 are formed close to each other by repetition of comparison of sensed values of a plurality of rings 1. The group gr1 includes a ring 1-$f$ in the leader state L, and a plurality of rings 1 in the slave state S. The group gr2 includes a ring 1-$g$ in the leader state L, and a plurality of rings 1 in the slave state S. Here, the group sensed value of the group gr1 is a value Y, and the group sensed value of the group gr1 is a value X. Also, the value Y is assumed to be a greater value than the value X.

In this case, the group sensed values of the group gr1 and the group gr2 are compared with each other. Specifically, for example, as shown in B of FIG. 39, the sensed values of a ring 1-$h$ which is included in the group gr1 and which is in the slave state S and the ring 1-$g$ which is included in the group gr2 and which is in the leader state L are compared with each other. Here, the value Y, which is the sensed value of the ring 1-$h$, is the group sensed value of the group gr1, and the value X, which is the sensed value of the ring 1-$g$, is the group sensed value of the group gr2.

As a result of comparison of the sensed values of the ring 1-$h$ and the ring 1-$g$, since the value Y, which is the sensed value of the ring 1-$h$ (that is, the group sensed value of the group gr1), is greater than the value X, which is the sensed value of the ring 1-$g$ (that is, the group sensed value of the group gr2), the state of the ring 1-$g$ transitions from the leader state L to the slave state S. Then, the sensed value of the ring 1-$g$ which has transitioned to the slave state S is changed from the value X to the value Y.

In this manner, in the case where another group gr having a greater group sensed value (in this case, the group gr1) than a predetermined group gr (in this case, the group gr2) is in proximity, the leader of the predetermined group gr (in this case, the group gr2) is cancelled. Then, the group sensed value of the predetermined group gr with the smaller group sensed value (in this case, the value X) is changed to the group sensed value of the other group gr (in this case, the value Y).

As a result of comparison of B of FIG. 39, a new group gr11 is formed by the group gr1 and the group gr2 being combined, as shown on the right-hand side of A of FIG. 39. In this case, the leader of the group gr1 becomes the leader of the new group gr11, and the value Y, which is the group sensed value of the group gr1, is made the group sensed value of the new group gr11. In this manner, a predetermined group is expanded while taking in a group in proximity.

[State Transition Diagram]

Figure 40:
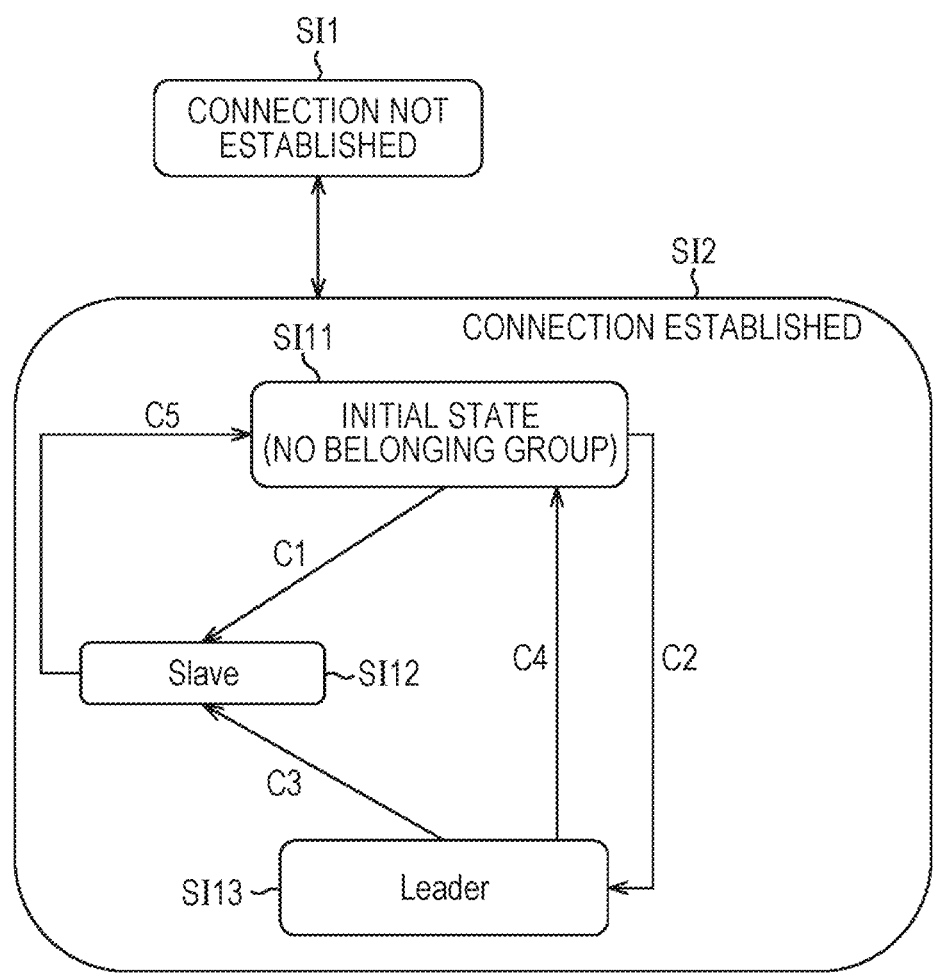
FIG. 40 is a state transition diagram showing an example of possible states of the ring.

FIG. 40 is a state transition diagram showing an example of possible states of the ring 1 in the comparison of the score values described above.

In FIG. 40, each state is shown within the frame of one rectangle with round corners, and is identified by a reference sign including "SI" drawn from the frame. State transition from one state to another state (including a case of remaining in the same state) is performed when a predetermined condition (hereinafter referred to as a state transition condition) is satisfied. Such a state transition condition is shown in FIG. 40 at an arrow indicating transition from one state to another state, by being denoted with a reference sign including "C".

In the comparison of the score values, each ring 1 includes the following information. That is, the ring 1 includes information about the ring ID of another ring 1 (maximum N rings) with which connection is currently established, the group ID of the group gr to which it belongs, and the state of itself (that is, the initial state i, the slave state S, or the leader state). Also, in the case the state of itself has transitioned to the leader state L, the ring 1 includes information indicating the time from the transition to the leader state L. Furthermore, the ring 1 includes, as information about the sensor value of itself, a first sensor value and a second sensor value. The first sensor value is a sensor value disclosed to other rings 1, and the second sensor value is a sensor value that is updated in itself. That is, the second sensor value is updated after a lapse of a specific period of time, and is used as the first sensor value in the initial state.

As shown in FIG. 40, a state SI1 is a state where connection is not established between the ring 1 and another ring 1. When connection to another ring 1 is successfully established, the state of the ring 1 transitions to a state SI2.

The state SI2 is a state where connection is established between the ring 1 and another ring 1.

In the case the state of the ring 1 is the initial state i, transition to a state SI11 takes place. In this case, the ring 1 does not belong to any group gr.

In the state SI11, in the case where the state of the other ring 1 to which connection has been established is the slave state S or the leader state L, comparison of the sensed values of the two is not performed, and the state of the ring 1 in the initial state i transitions to the slave state S. Furthermore, the sensed value and the group ID of the ring 1 are changed to the sensed value and the group ID of the other ring 1.

In the present case, that a state transition condition C1 that the state of the other ring 1 is the slave state S or the leader state L is determined to have been satisfied, and the state of the ring 1 transitions from the state SI11, which is the initial state i, to a state SI12 which is the slave state S.

On the other hand, in the case the state of the other ring 1 to which connection has been established is the initial state i, the sensed values of the two are compared. As a result of comparison, the state of the ring 1 with the greater sensed value transitions from the initial state i to the leader state L. On the other hand, the state of the ring 1 with the smaller sensed value transitions from the initial state i to the slave state S. Furthermore, the sensed value and the group ID of the ring 1 with the smaller sensed value are changed to the sensed value and the group ID of the ring 1 with the greater sensed value. A ring 1 in the leader state L is thereby generated.

In the present case, that a state transition condition C2 that the state of the other ring 1 is the initial state i, and the sensed value of the ring 1 is greater than the sensed value of the other ring 1 is determined to have been satisfied, and the state of the ring 1 transitions from the state SI11, which is the initial state i, to a state SI13 which is the leader state L.

Additionally, also in the case where the state of the other ring 1 is the initial state i, and the sensed value of the ring 1 is smaller than the sensed value of the other ring 1, the state transition condition C1 is determined to have been satisfied, and the state of the ring 1 transitions from the state SI11, which is the initial state i, to the state SI12, which is the slave state S. That is, the state transition condition C1 includes two conditions.

The state SI12 is a state where the ring 1 is in the slave state S.

In the state SI12, in the case the state of the other ring 1 to which connection has been established is the slave state S or the leader state L, the sensed values of the two are compared. As a result of comparison, the sensed value and the group ID of the ring 1 with the smaller sensed value are changed to the sensed value and the group ID of the ring 1 with the greater sensed value. Additionally, the state of the ring 1 is still in the slave state S. In this case, the state of the ring 1 stays in the state SI12.

On the other hand, in the case the state of the other ring 1 to which connection has been established is the initial state i, comparison of the sensed values of the two is not performed, and the sensed value and the group ID of the other ring 1 are changed to the sensed value and the group ID of the ring 1. In this case, the state of the ring 1 stays in the state SI12.

The state SI13 is a state where the ring 1 is in the leader state L.

In the state SI13, in the case the state of the other ring 1 to which connection has been established is the slave state S or the leader state L, the sensed values of the two are compared. As a result of comparison, in the case the sensed value of the ring 1 is smaller than the sensed value of the other ring 1, the state of the ring 1 transitions from the leader state L to the slave state S. Also, the sensed value and the group ID of the ring 1 are changed to the sensed value and the group ID of the other ring 1. The leader is thereby cancelled. On the other hand, as a result of comparison, in the case the sensed value of the ring 1 is greater than the sensed value of the other ring 1, the state of the ring 1 stays in the leader state L. At this time, the sensed value and the group ID of the other ring 1 are changed to the sensed value and the group ID of the ring 1.

In the present case, that a state transition condition C3 that the sensed value is smaller than that of the other ring 1 is determined to have been satisfied, and the state of the ring 1 transitions from the state SI13, which is the leader state L, to the state SI12, which is the slave state.

On the other hand, in the case the state of the other ring 1 to which connection has been established is the initial state i, comparison of the sensed values of the two is not performed, and the sensed value and the group ID of the other ring 1 are changed to the sensed value and the group ID of the ring 1. In the present case, the state of the ring 1 stays in the state SI13.

In the state SI13, in the case a specific period of time has elapsed from the transition of the ring 1 to the leader state L, or the power of the ring 1 is turned off, the state of the ring 1 transitions to the initial state i. In this case, all of a plurality of other rings 1 having the same group ID (that is, other rings 1 in the slave state S) are notified of the cancellation of the group gr. The group gr having a leader is thereby cancelled.

In the present case, that a state transition condition C4 that a specific period of time has elapsed from the transition of the ring 1 to the leader state L, or that the power is turned off is determined to have been satisfied, and the state of the ring 1 transitions from the state SI13, which is the leader state L, to the state SI11, which is the initial state i.

Also, in the state SI12, a state transition condition C5 that a notification of cancellation of the group gr has been issued is determined to have been satisfied, and the state of the ring 1 transitions from the state SI12, which is the slave state S, to the state SI11, which is the initial state i. The sensed value and the group ID of the rings 1 included in the group gr are thereby initialized, and the group gr is cancelled.

In the state SI2, in the case where connection between the ring 1 and the other ring 1 is disconnected, transition from the state SI2 to the state SI1 takes place.

Next, state transition until the cancellation of a group described with reference to FIG. 40 will be concretely described.

[Cancellation of Group gr]

FIG. 41 is a diagram showing state transition until the cancellation of a group gr.

In a state SI21, a plurality of rings 1 are gathered. All of the plurality of rings 1 are in the initial state i.

In a state SI22, each ring 1 starts establishment of connection to another ring 1, and repeats comparison of sensed values. As a result of repetition of comparison, in the state SI22, a ring 1-$i$ and a ring 1-$j$ which are in the leader state L are generated. Here, the sensed value of the ring 1-$i$ is assumed to be 15, and the sensed value of the ring 1-$j$ is assumed to be 10.

As a result of comparison of the ring 1-$i$ and the ring 1-$j$, since the sensed value of the ring 1-$i$ is greater, the state of the ring 1-$j$ transitions to the slave state S. Then, the sensed value of the ring 1-$j$, which has transitioned to the slave state S, is changed to 15.

In a state SI23, a group gr21 having the ring 1-$i$ as the leader is formed. Also, a group gr22 having a ring 1-$k$ in the leader state L is formed at a position close to the group gr21. Here, it is assumed that the group sensed value of the group gr21 is 15, and the group sensed value of the group gr22 is 9.

In this case, the group sensed values of the group gr21 and the group gr22 are compared with each other. As a result of comparison, since the group sensed value of the group gr22 is smaller than the group sensed value of the group gr21, the leader of the group gr22 is cancelled, and the group sensed value of the group gr22 is changed to 15, which is the group sensed value of the group gr21.

In a state SI24, a group gr31 which has expanded by taking in the other group is formed. Additionally, the leader of the group gr31 is the ring 1-*i*, and the group sensed value is 15.

In the state SI24, in a case a specific period of time has elapsed since the state of the ring 1-*i*, which is the leader of the group gr31, has been changed to the leader state L, or the power of the ring 1-*i* is turned off, the sensed value of the ring 1-*i* is initialized to the initial state i. The group gr31 is thereby cancelled, and transition from a state SI25 to the state SI21 takes place.

Additionally, the specific period of time until the cancellation of a group is not particularly restricted, and is set in units of minutes, for example.

[Application of Present Technique to Program]

The above described series of processes can be performed by hardware, and can also be performed by software. When the series of processes are to be performed by software, the programs forming the software are installed into a computer. Here, the computer may be a computer incorporated into special-purpose hardware, or may be a general-purpose personal computer that can execute various kinds of functions as various kinds of programs are installed thereinto.

The programs to be executed by the computer (the CPU 31 in FIG. 6) may be provided by being recorded in a removable medium, not shown, as a package medium or the like, for example. Alternatively, the programs can be provided via a wired or wireless transmission medium such as a local area network, the Internet, or digital satellite broadcasting. The programs may, of course, also be provided by other information processing apparatuses or other rings 12.

At the computer, the programs may be installed into the storage unit 88 by attaching the removable medium to the drive of another information processing apparatus and receiving the programs by the wireless module 32 via a wireless transmission medium. Alternatively, the programs may be installed into the storage unit 88 in advance.

The programs to be executed by the computer may be programs for performing processes in chronological order in accordance with the sequence described in this specification, or may be programs for performing processes in parallel or performing a process when necessary, such as when there is a call.

It should be noted that embodiments of the present technique are not limited to the above described embodiment, and various modifications may be made to it without departing from the scope of the present technique.

For example, the present technique can be embodied in a cloud computing structure in which one function is shared among apparatuses via a network, and processing is performed by the apparatuses cooperating with one another.

Moreover, in the examples described above, the ring 1 itself performs actions such as light emission and vibration, but the manner of action is not restricted to the examples described above. That is, the object to perform the action may be the ring 1 itself worn by a user, as in the examples described above, or it may be the communication counterpart of the ring 1, such as an electrical appliance such as a television receiver, a videocassette recorder, a game console, a lamp or an electric shade, or equipment at a facility such as a personal home, a shop, a hall or a stadium. Also, the type of action may be light emission and vibration as in the examples described above, or may be other than these two, such as an image or sound, for example. Furthermore, if the ring 1 includes a soft actuator, a change in the intensity of tightening around the arm may also be used as a type of action. Moreover, in this case, a plurality of arbitrary types may be combined.

Also, in the examples described above, a description has been given for cases where the movement information, the number of rings 1 present within a specific range, and the degree of relatedness of a plurality of users present within a specific range are used as the excitement information, but the excitement information is not restricted to the above.

For example, in the case of a ring 1 provided with a sensor for acquiring biological information, a detection result enabling determination of excitement, of a user regarding an event, in terms of physical reactions, such as heartbeat, blood pressure, and body temperature of the user, may be used as the excitement information.

Furthermore, in the examples described above, a predetermined behavior to be performed by the user of the ring 1 may be announced in advance by the host of the event to each user by an arbitrary notification method, or may be stored in advance in the ring 1.

Moreover, in the third example of group control described above, the position information of the ring 1 itself is acquired by the position information acquisition unit 85 of the ring 1 by an arbitrary method. The acquired position information is transmitted to the CCU 122 by being included in a request for start of image capturing, and is used for identifying the image capturing target of the camera 121. However, by storing, together with the acquired position information, the image capturing time of the camera 121 in association in a predetermined file, cooperation with the SNS 171 described in the fourth example of group control is enabled.

Also, in the examples described above, the position information of the ring 1 is acquired using the GPS. However, in the case the GPS cannot be used, the position may be acquired by using Wi-Fi (wireless fidelity), for example. The method of acquiring the position information using the Wi-Fi is not particularly restricted, and for example, there is a method of acquiring the position information using PlaceEngine (registered trademark of Koozyt, Inc.).

Furthermore, the position information of the ring 1 using the GPS or the Wi-Fi may be acquired by a terminal apparatus capable of wireless communication with the ring 1, such as a smartphone. Additionally, this terminal apparatus is assumed to be held by the user wearing the ring 1. The position information acquired by the terminal apparatus may be transmitted to the ring 1 or other information processing apparatuses.

In the examples described above, at least a part of the processes performed by the ring 1 may be performed by another information processing apparatus capable of wireless communication with the ring 1. The processing load on the ring 1 is thereby reduced. Also, all the pieces of information regarding the processes in the examples described above may be set in advance in the ring 1. In this case, the ring 1 may select, and perform, information from pieces of information set in advance as appropriate.

Additionally, as the information processing apparatus to which the present technique is to be applied, a mobile terminal capable of performing the processes described in the present embodiment may be used. In this case, a mode according to which a user holds the mobile terminal in his/her hand and performs communication is desirable.

The respective steps described with reference to the above described flowcharts can be carried out by one apparatus or can be shared among apparatuses.

In a case where more than one process is included in one step, the processes included in the step can be performed by one apparatus or can be shared among apparatuses.

The present technique may also be embodied in the structures described below.

(1)

An information processing apparatus comprising:

a light emission unit for emitting light according to a light emission pattern identified based on a set of light emission parameters indicating characteristics of light emission; and a control unit for controlling the light emission pattern of the light emission unit based on a relationship between the self apparatus and a group to which the self apparatus and at least one other information processing apparatus including the light emission unit belong, or a relationship between the other information apparatus and the self apparatus belonging to the group.

(2)

The information processing apparatus according to (1) described above, further including:

a communication control unit for controlling wireless communication with the at least one other information processing apparatus, wherein the control unit controls the light emission pattern of the light emission unit based on the relationship identified based on a result of control by the communication control unit.

(3)

The information processing apparatus according to (1) or (2) described above, further including:

a vibration unit for vibrating according to a vibration pattern identified based on a set of vibration parameters indicating characteristics of vibration, wherein the control unit controls the vibration pattern of the vibration unit based on the relationship.

(4)

The information processing apparatus according to any one of (1) to (3) described above, wherein the control unit controls the light emission pattern of the light emission unit, further taking into account an influence of an external object other than the group.

(5)

The information processing apparatus according to any one of (1) to (4) described above, further including:

a distance calculation unit for calculating, as the external object, in a course of a plurality of users wearing the information processing apparatus and the at least one information processing apparatus belonging to the group gathering at a predetermined location, a distance between the predetermined location and an existing location of the information processing apparatus, wherein the communication control unit identifies, as the relationship, the number of the information processing apparatuses present within a specific range, based on position information of the other information processing apparatus, and wherein the control unit controls the light emission pattern of the light emission unit to change with the distance calculated by the distance calculation unit and the number identified by the communication control unit as parameters.

(6)

The information processing apparatus according to any one of (1) to (5) described above, wherein the communication control unit controls wireless communication with the external object while taking another apparatus not belonging to the group as the external object, and wherein the control unit controls the light emission pattern of the light emission unit based on a result of the wireless communication with the external object based on control by the communication control unit.

(7)

The information processing apparatus according to any one of (1) to (6) described above, further including:

a sensor unit for detecting a change in a physical quantity caused by a motion of a user; and an excitement determination unit for determining a degree of excitement of the user based on a detection result of the sensor unit, wherein the communication control unit performs control so as to transmit the degree of excitement to the at least one other information processing apparatus, and to receive the degree of excitement of at least one user of the at least one other information processing apparatus, and wherein the control unit controls the light emission pattern of the light emission unit based on the relationship indicated by the degree of excitement of at least one of the self apparatus and the at least one other information processing apparatus.

(8)

The information processing apparatus according to any one of (1) to (7) described above, wherein the external object is another information processing apparatus not belonging to the group, including at least the light emission unit and the sensor unit, and wherein the control unit takes a condition that the group to which the self apparatus belongs is made a target by the external object based on a detection result of the sensor unit of the external object, as a condition for the influence of the external object, and controls the light emission pattern of the light emission unit by determining whether the condition for the influence of the external object and a condition regarding the relationship are satisfied.

(9)

The information processing apparatus according to any one of (1) to (8) described above, wherein the condition regarding the relationship is a condition that the degree of excitement of the self apparatus is highest among the group.

(10)

The information processing apparatus according to any one of (1) to (9) described above, wherein the external object is an imaging apparatus for capturing a plurality of users of the self apparatus and the at least one other information processing apparatus belonging to the group, and wherein, in a case where the degree of excitement determined by the excitement determination unit is at or above a threshold, the communication control unit transmits a request for start of image capturing to the imaging apparatus such that image capturing by the imaging apparatus taking a user of the self apparatus as an image capturing target is started.

(11)
The information processing apparatus according to any one of (1) to (10) described above,
wherein the communication control unit receives information indicating that image capturing is started by the imaging apparatus according to the request for start of image capturing from the self apparatus, and
wherein the control unit controls the light emission pattern of the light emission unit based on the information received by the communication control unit.

(12)
The information processing apparatus according to any one of (1) to (11) described above, wherein the excitement determination unit determines the degree of excitement based on information, generated based on a detection result of the sensor unit, indicating a degree of relatedness or a degree of difference regarding synchronicity of motions of bodies or parts of bodies of a plurality of users.

(13)
The information processing apparatus according to any one of (1) to (12) described above,
wherein the external object is
an imaging apparatus for capturing a location where a group exists, and
an external apparatus for acquiring an image capturing result showing a user of the information processing apparatus or of the at least one other information processing apparatus belonging to the group in a predetermined time slot, from image capturing results of the imaging apparatus, and
wherein the communication control unit transmits, to the external apparatus, a time when the degree of excitement determined by the excitement determination unit has reached or exceeded a threshold as information for acquisition to be used at a time of acquiring an image capturing result showing a user of the self apparatus in a time slot including the time.

(14)
The information processing apparatus according to (13) described above, wherein the communication control unit also transmits a position of the self apparatus to the external apparatus as the information for acquisition.

(15)
The information processing apparatus according to (13) or (14) described above, wherein the communication control unit also transmits an ID of the self apparatus to the external apparatus as the information for acquisition.

(16)
The information processing apparatus according to any one of (1) to (15) described above,
wherein the communication control unit receives information enabling identification of the light emission pattern of the light emission unit of the other information processing apparatus belonging to the group, and
wherein the control unit controls the light emission pattern of the light emission unit based on the light emission pattern identified by the information enabling identification of the light emission pattern received by the communication control unit.

(17)
The information processing apparatus according to any one of (1) to (16) described above,
wherein the information processing apparatus includes a ring-shaped portion wearable on an arm of the user, and
wherein the portion is provided with a joining portion for releasing or connecting a part of the portion.

(18)
The information processing apparatus according to any one of (1) to (17) described above, wherein the joining portion includes a magnet and an attraction plate for connecting the part of the portion.

(19)
The information processing apparatus according to any one of (1) to (18) described above, wherein the joining portion connects the part of the portion by elastic deformation of material.

The present technique may be applied to an information processing apparatus used as a communication tool.

REFERENCE SIGNS LIST

1 Ring
21 Substrate
22 Joining portion
31 CPU
32 Wireless module
33 3-axis accelerometer
34 LED
35 Vibration mechanism
43 Attraction plate
44 Magnet
81 Sensor information acquisition unit
82 Excitement determination unit
83 Action control unit
84 Communication control unit
85 Position information acquisition unit
86 Time information acquisition unit
87 Distance calculation unit
88 Storage unit
89 Target identification unit
90 Group forming unit
91 Group information management unit 91
121 Camera
122 CCU
171 SNS
172 Image management apparatus

The invention claimed is:
1. A first information processing apparatus, comprising:
a first light emission unit configured to emit light based on a light emission pattern, wherein the light emission pattern is identified based on a set of light emission parameters indicating characteristics of light emission;
a control unit configured to:
control the light emission pattern of the first light emission unit based on one of a first relationship between the first information processing apparatus and a group to which the first information processing apparatus and at least one second information processing apparatus belong, or a second relationship between the at least one second information processing apparatus and the first information processing apparatus belonging to the group, wherein the at least one second information processing apparatus includes a second light emission unit, and
control the light emission pattern of the first light emission unit based on an influence of an external object other than the group;
a communication control unit configured to control wireless communication with the at least one second information processing apparatus;
a sensor configured to detect a change in a physical quantity caused by a motion of a first user; and an excitement determination unit configured to determine a degree of excitement of the first user based on the detected change,
  wherein the external object is an imaging apparatus that captures a plurality of users of the first information processing apparatus and the at least one second information processing apparatus belonging to the group, and
  wherein, based on a determination that the degree of excitement determined by the excitement determination unit is at or above a threshold, the communication control unit is configured to transmit a request to the imaging apparatus to start an image capture such that the image capture by the imaging apparatus is started with a second user of the first information processing apparatus taken as an image capturing target.

2. The first information processing apparatus according to claim 1,
  wherein the control unit is further configured to control the light emission pattern of the first light emission unit based on a third relationship identified based on a result of control by the communication control unit.

3. The first information processing apparatus according to claim 1, further comprising:
  a vibration unit configured to vibrate based on a vibration pattern, wherein the vibration pattern is identified based on a set of vibration parameters indicating characteristics of vibration,
  wherein the control unit is further configured to control the vibration pattern of the vibration unit based on a third relationship.

4. The first information processing apparatus according to claim 2, further comprising:
  a distance calculation unit configured to calculate, as the external object, based on a determination that each of the plurality of users of the first information processing apparatus and the at least one second information processing apparatus belonging to the group gathers at a determined location, a distance between the determined location and a current location of the first information processing apparatus,
  wherein the communication control unit is further configured to identify, as the third relationship, a number of information processing apparatuses present within a specific range, based on position information of the at least one second information processing apparatus, and
  wherein the control unit is further configured to control the light emission pattern of the first light emission unit to change based on the distance calculated by the distance calculation unit and the number identified by the communication control unit.

5. The first information processing apparatus according to claim 2,
  wherein the communication control unit is further configured to control wireless communication with the external object, and
  wherein the control unit is further configured to control the light emission pattern of the first light emission unit based on a result of the wireless communication with the external object based on control by the communication control unit.

6. The first information processing apparatus according to claim 5,
  wherein the communication control unit is further configured to transmit the degree of excitement to the at least one second information processing apparatus, and to receive the degree of excitement of at least one user of the at least one second information processing apparatus, and
  wherein the control unit is further configured to control the light emission pattern of the first light emission unit based on a fourth relationship indicated by the degree of excitement of at least one of the first information processing apparatus and the at least one second information processing apparatus.

7. The first information processing apparatus according to claim 6,
  wherein the control unit is further configured to:
  take a first condition that the group to which the first information processing apparatus belongs is made a target by the external object based on a detection result of a sensor unit of the external object, and
  control the light emission pattern of the first light emission unit based on a determination that the first condition for the influence of the external object and a second condition related to the fourth relationship are satisfied.

8. The first information processing apparatus according to claim 7, wherein the second condition related to the fourth relationship is a condition that the degree of excitement of the first information processing apparatus is highest among the group.

9. The first information processing apparatus according to claim 6,
  wherein the communication control unit is further configured to receive information indicating that the image capture is started by the imaging apparatus based on the request for the start of the image capture from the first information processing apparatus, and
  wherein the control unit is further configured to control the light emission pattern of the first light emission unit based on the information received by the communication control unit.

10. The first information processing apparatus according to claim 9, wherein the excitement determination unit is further configured to determine the degree of excitement based on information, generated based on a detection result of the sensor, indicating a degree of relatedness or a degree of difference regarding synchronicity of motions of bodies or parts of bodies of the plurality of users.

11. The first information processing apparatus according to claim 6,
  wherein the imaging apparatus further captures a location where the group exists, and
  acquires an image capturing result that shows the second user of the first information processing apparatus or of the at least one second information processing apparatus belonging to the group in a determined time slot, from a plurality of image capturing results of the imaging apparatus, and
  wherein the communication control unit is further configured to transmit as acquisition information, to an external apparatus, a time based on a determination that the degree of excitement determined by the excitement determination unit has reached or exceeded the threshold, wherein the acquisition information is used at a time the image capturing result is acquired, wherein the image capturing result shows the second user of the first information processing apparatus.

12. The first information processing apparatus according to claim 11, wherein the communication control unit is further configured to transmit a position of the first information processing apparatus to the external apparatus as the acquisition information.

13. The first information processing apparatus according to claim 12, wherein the communication control unit is further configured to transmit an identifier (ID) of the first information processing apparatus to the external apparatus as the acquisition information.

14. The first information processing apparatus according to claim 2,
wherein the communication control unit is further configured to receive information that enables identification of the light emission pattern of the second light emission unit of the at least one second information processing apparatus belonging to the group, and
wherein the control unit is further configured to control the light emission pattern of the first light emission unit based on the light emission pattern identified by the information that enables the identification of the light emission pattern received by the communication control unit.

15. The first information processing apparatus according to claim 1,
wherein the first information processing apparatus includes a ring-shaped portion wearable on an arm of the first user, and
wherein the ring-shaped portion includes a joining portion configured to release or connect a part of the ring-shaped portion.

16. The first information processing apparatus according to claim 15, wherein the joining portion includes a magnet and an attraction plate configured to connect the part of the ring-shaped portion.

17. The first information processing apparatus according to claim 16, wherein the joining portion is further configured to connect the part of the ring-shaped portion by elastic deformation of a material of the ring-shaped portion.

18. The first information processing apparatus according to claim 1,
wherein the characteristics of light emission indicate an amount of light emitted from the first light emission unit of the first information processing apparatus, and
wherein the amount of light emitted increases based on a distance between the first information processing apparatus and the at least one second information processing apparatus that is below a determined threshold.

19. An information processing method, comprising:
in a first information processing apparatus including a first light emission unit:
emitting light based on a light emission pattern of the first light emission unit, wherein the light emission pattern is identified based a set of light emission patterns indicating characteristics of light emission; and
controlling the light emission pattern of the first light emission unit based on a first relationship between the first information processing apparatus and a group to which the first information processing apparatus and at least one second information processing apparatus including a second light emission unit belong, or a second relationship between the at least one second information processing apparatus and the first information processing apparatus belonging to the group;
controlling the light emission pattern of the first light emission unit based on an influence of an external object other than the group;
controlling wireless communication with the at least one second information processing apparatus;
detecting a change in a physical quantity caused by a motion of a first user;
determining a degree of excitement of the first user based on the detected change,
wherein the external object is an imaging apparatus that captures a plurality of users of the first information processing apparatus and the at least one second information processing apparatus belonging to the group; and
based on the determination that the degree of excitement is at or above a threshold, transmitting a request to the imaging apparatus to start image capture such that the image capture by the imaging apparatus is started taking a second user of the first information processing apparatus as an image capturing target.

* * * * *